(12) United States Patent
Palanisamy et al.

(10) Patent No.: US 10,136,284 B2
(45) Date of Patent: Nov. 20, 2018

(54) COORDINATED GROUPING FOR MACHINE TYPE COMMUNICATIONS GROUP BASED SERVICES

(71) Applicant: Convida Wireless, LLC, Wilmington, DE (US)

(72) Inventors: Suresh Palanisamy, Namakkal District (IN); Michael F Starsinic, Newtown, PA (US); Prashanth Murthy, Karnataka (IN); Anoop Singh, Karnataka (IN)

(73) Assignee: Convida Wireless, LLC, Wilmington, DE (US)

( * ) Notice: Subject to any disclaimer, the term of this patent is extended or adjusted under 35 U.S.C. 154(b) by 0 days.

(21) Appl. No.: 14/793,072

(22) Filed: Jul. 7, 2015

(65) Prior Publication Data

US 2016/0007138 A1 Jan. 7, 2016

Related U.S. Application Data

(60) Provisional application No. 62/021,369, filed on Jul. 7, 2014.

(51) Int. Cl.
*H04W 4/00* (2018.01)
*H04W 4/08* (2009.01)
(Continued)

(52) U.S. Cl.
CPC .............. *H04W 4/70* (2018.02); *H04L 12/28* (2013.01); *H04L 67/1044* (2013.01);
(Continued)

(58) Field of Classification Search
CPC combination set(s) only.
See application file for complete search history.

(56) References Cited

U.S. PATENT DOCUMENTS 9,960,964 B2* 5/2018 Alam .................... H04L 41/082
2011/0140846 A1* 6/2011 Blanz .................... H04W 60/04
340/7.1
(Continued)

FOREIGN PATENT DOCUMENTS

JP 2013-110550 A 6/2013
JP WO 2014002351 A1 * 1/2014 ............ H04W 4/005
(Continued)

OTHER PUBLICATIONS

Aboba et al, "The Network Access Identifier", Network Working Group, RFC# 4282, Dec. 2005, 16 pages.
(Continued)

*Primary Examiner* — Nay A Maung
*Assistant Examiner* — Erica Fleming-Hall
(74) *Attorney, Agent, or Firm* — Baker & Hostetler, LLP

(57) ABSTRACT

A system is disclosed for the coordinated grouping of devices for receipt of network layer group based services. A service layer system such as an SCS generates a request to generate a group of devices to receive network layer services. The request is received at a network layer system such as, for example, an MTC-IWF. Network layer systems such as, for example, an HSS, identifies a manner of communicating the requested service to identified devices and communicates with the devices to provision the devices so as to be included in the requested group. The network layer systems communicate an identifier to the service layer system which the service layer may subsequently use to request execution of the service by the identified group of devices.

14 Claims, 26 Drawing Sheets

(51) Int. Cl.

| | |
|---|---|
| *H04L 12/28* | (2006.01) |
| *H04L 29/08* | (2006.01) |
| *H04W 4/70* | (2018.01) |
| *H04W 4/50* | (2018.01) |
| *H04W 88/02* | (2009.01) |
| *H04W 88/08* | (2009.01) |
| *H04W 88/16* | (2009.01) |
| *H04W 84/22* | (2009.01) |

(52) U.S. Cl.
CPC ............... *H04W 4/08* (2013.01); *H04W 4/50* (2018.02); *H04W 84/22* (2013.01); *H04W 88/02* (2013.01); *H04W 88/08* (2013.01); *H04W 88/16* (2013.01)

(56) References Cited

U.S. PATENT DOCUMENTS

| | | | |
|---|---|---|---|
| 2011/0268047 A1* | 11/2011 | Nath | H04W 4/005 370/329 |
| 2013/0013555 A1* | 1/2013 | Foti | H04W 4/08 707/609 |
| 2013/0088956 A1* | 4/2013 | Zhou | H04W 4/08 370/230 |
| 2013/0232218 A2* | 9/2013 | Bell | B60R 25/00 709/217 |
| 2013/0303206 A1* | 11/2013 | Starsinic | H04W 4/12 455/466 |
| 2015/0031335 A1* | 1/2015 | Dong | H04W 4/70 455/411 |
| 2015/0063193 A1* | 3/2015 | Veerepalli | H04W 48/16 370/312 |
| 2015/0111533 A1* | 4/2015 | Chandramouli | H04W 12/12 455/410 |
| 2015/0230063 A1* | 8/2015 | Chandramouli | H04W 4/005 455/466 |
| 2015/0245162 A1* | 8/2015 | Chao | H04L 12/189 370/312 |
| 2015/0341851 A1* | 11/2015 | Cai | H04W 4/08 455/434 |
| 2015/0358874 A1* | 12/2015 | Ahn | H04L 12/66 370/331 |
| 2016/0007137 A1* | 1/2016 | Ahn | H04L 12/6418 370/254 |
| 2017/0372091 A1* | 12/2017 | Lacey | G06F 17/30011 |

FOREIGN PATENT DOCUMENTS

| | | |
|---|---|---|
| WO | WO 2014-002351 | 1/2014 |
| WO | WO 2014-049418 | 4/2014 |

OTHER PUBLICATIONS

European Telecommunications Standards Institute (ETSI Draft), TS 102 690, V0.14.2, "Machine-to-Machine communications (M2M); Functional Architecture";, Sep. 26, 2011, 288 pages.

3rd Generation Partnership Project (3GPP); TR 22.853 V13.0.0; 3rd Generation Partnership Project; Technical Specification Group Services and System Aspects; Study on Service Exposure and Enablement Support (SEES), Requirements (Release 13), Jun. 2014, 24 pages.

3rd Generation Partnership Project (3GPP); TR 23.887 V12.0.0, 3rd Generation Partnership Project; Technical Specification Group Services and System Aspects; Study on Machine-Type Communications (MTC) and other mobile data applications communications enhancements (Release 12), Dec. 2013, 151 pages.

3rd Generation Partnership Project (3GPP); TS 23.003 V12.3.1; 3rd Generation Partnership Project; Technical Specification Group Core Network and Terminals; Numbering, Addressing and Identification (Release 12), Jul. 2014, 90 pages.

3rd Generation Partnership Project (3GPP); TS 23.041 V12.6.0; 3rd Generation Partnership Project; Technical Specification Group Core Network and Terminals; Technical Realization of Cell Broadcast Service (CBS) (Release 12), Jun. 2014, 68 pages.

3rd Generation Partnership Project (3GPP); TS 23.246 V12.2.0; 3rd Generation Partnership Project; Technical Specification Group Services and System Aspects; Multimedia Broadcast/Multicast Service (MBMS); Architecture and Functional Description (Release 12), Jun. 2014, 67 pages.

3rd Generation Partnership Project; (3GPP); TS 23.401 V12.5.0, 3rd Generation Partnership Project; Technical Specification Group Services and System Aspects; General Packet Radio Service (GPRS) enhancements for Evolved Universal Terrestrial Radio Access Network (E-UTRAN) access (Release 12), Jun. 2014, 305 pages.

3rd Generation Partnership Project; (3GPP); TS 23.682 V12.2.0, 3rd Generation Partnership Project; Technical Specification Group Services and System Aspects; Architecture enhancements to facilitate communications with packet data networks and applications (Release 12, Jun. 2014, 32 pages.

3rd Generation Partnership Project; (3GPP); TS 29.061 V12.6.0, 3rd Generation Partnership Project; Technical Specification Group Core Network and Terminals; Interworking between the Public Land Mobile Network (PLMN) supporting packet based services and Packet Data Networks (PDN) (Release 12), Jun. 2014, 164 pages.

3rd Generation Partnership Project; (3GPP); TS 29.214 V12.4.0, 3rd Generation Partnership Project; Technical Specification Group Core Network and Terminals; Policy and Charging Control over Rx reference point (Release 12), Jun. 2014, 61 pages.

3rd Generation Partnership Project; (3GPP); TS 29.229 V12.2.0, 3rd Generation Partnership Project; Technical Specification Group Core Network and Terminals; Cx and Dx interfaces based on the Diameter protocol; Protocol details (Release 12), Jun. 2014, 37 pages.

3rd Generation Partnership Project; (3GPP); TS 29.368 V12.1.0, 3rd Generation Partnership Project; Technical Specification Group Core Network and Terminals; Tsp interface protocol between the MTC Interworking Function (MTC-IWF) and Service Capability Server (SCS) (Release 12), Jun. 2014, 28 pages.

International Application No. PCT/US2015/039354: International Search Report and the Written Opinion dated Sep. 24, 2015, 13 pages.

Machine-to-Machine Communications (M2M); TS-0001 oneM2M Functional Architecture—V-0.0.3, Jun. 8, 2013, 11 pages.

* cited by examiner

COORDINATED GROUPING FOR MACHINE TYPE COMMUNICATIONS GROUP BASED SERVICES

CROSS REFERENCE TO RELATED APPLICATIONS

This application claims benefit under 35 U.S.C. § 119(e) of Provisional U.S. Patent Application No. 62/021,369, filed on Jul. 7, 2014, the contents of which are hereby incorporated herein by reference in its entirety.

BACKGROUND

Machine type communications (MTC) refers to machines, or devices, communicating with each other over a network. Machine type communications have wide applicability in diverse functional areas including, for example, in connection with surveillance, asset tracking, fleet tracking, remote sensing, vehicle diagnostics, and digital metering, to name a few areas. Communications between machines may be made over any suitable transport technology including, for example, fixed networks, wireless networks, or a combination of both. In one common embodiment, devices communicate over a wireless cellular network such as a 3rd Generation Partnership Project (3GPP) network.

The ability of 3GPP networks to provide features, which may be referred to as services, to each of several devices in a group of devices has proven particularly useful in connection with machine to machine communications. For example, the 3GPP network core provides services whereby the same message is distributed to a defined group of devices which may be, for example, user equipment (UE). Similarly, the 3GPP network provides a service whereby a defined group of devices or UEs may be policed in order to enforce a policy for a defined group of devices. In another example, the 3GPP network provides a service whereby records of chargeable events for a defined group of UEs are collected rather than being collected individually.

3GPP's capabilities in providing services to defined groups of devices has applicability to a wide variety of device installations. For example, a group of devices that run the same application or exhibit a similar behavior are often good candidates for receiving group based services. Similarly, devices that are housed in the same facility or group of facilities lend themselves to receiving services as a group. Likewise, a plurality of devices that are owned or operated by the same entity may benefit from being grouped together for purposes of receiving services. Still further, it may be operationally efficient to use 3GPP services in connection with several devices that are housed in or traveling in the same vehicle. From both a customer and network operator point of view, there is benefit in optimized handling of groups of MTC devices.

Accordingly, it is frequently the case that devices lend themselves to being serviced as a group. Furthermore, the expanded deployment of machine to machine communications in 3GPP networks will inevitably lead to the greater utilization to existing group based services and the deployment of new group based services.

Creating groups of devices for purposes of receiving services is typically accomplished by manual intervention. For example, each of the relevant machines and servicing core network devices must be individually provisioned with the appropriate information so that the relevant devices may be serviced as a group. Similarly, when modifications to an existing group of devices are needed, the impacted devices must be individually provisioned in order to implement the modifications.

SUMMARY

Applicants have developed systems and methods for the coordinated grouping of machine devices for receipt of group based services. In the disclosed systems and methods, service layer systems such as, for example, server capability servers (SCS) manage the creation and modification of device groupings and coordinate with network layer systems, i.e., 3GPP systems, to implement the necessary grouping operations at the appropriate UEs. The service layer systems are positioned close to end user applications from a network architecture perspective and, therefore, are well situated to determine which devices should be grouped for purposes of receiving services. The network layer systems, i.e., 3GPP systems, maintain current information regarding the UEs and are able to use this information to determine whether the requested grouping may be made and, if so, the most efficient manner to physically implement the required provisioning.

In an example embodiment, a service layer system such as, for example, an SCS determines that it would be useful to create a grouping of devices or modify an existing group of devices. The SCS may determine that the grouping operation is needed in response to activities at the service layer or the application layer. For example, the SCS may receive an indication, perhaps from a user application, that a large number of sensor devices have been deployed to control and monitor an automated manufacturing line. In such a scenario, the SCS may determine that it would be useful to create a grouping of the devices for purposes of generating common communications to all devices. In alternative example, the SCS may receive information from a user application that a new sensor device is to be added to an existing manufacturing line. In such a scenario, the SCS may determine that it would be useful to add the new sensor device to an existing grouping for devices situated on the particular manufacturing line.

The SCS generates a group request for purposes of implementing the group operation. The request may be, for example, a request to create a new group of devices that may be serviced as a group. In another example embodiment, the request may be to modify an existing group of devices to add a new device. The SCS includes in the generated request any information that is needed by the network layer to perform the operation. For example, in the scenario where the request is to create a group of devices that are accessible using the 3GPP messaging service, the request may identify the particular 3GPP service that is requested along with information identifying the particular devices that are to be included in the group. In the scenario where the request is to modify an existing group of devices, the request may identify the particular group as well as the identity of the particular devices that are to be added or removed from the group. The SCS transmits the generated group request to the network layer.

The group request is received at the 3GPP network system. Processing of the request at the 3GPP network may vary depending upon the request and the configuration of the network system. Generally, however, a system within the 3GPP core network, which may be, for example, a home subscriber server (HSS) and/or machine type communication-inter-working function (MTC-IWF), determines whether the particular SCS is authorized to use the requested services and whether the UEs or devices identified in the request may be provisioned to receive the requested service.

In the instance that the appropriate 3GPP system determines that the requested service is available for use with the identified devices, the 3GPP core network system generates and transmits a group request to provision to each of the UEs that are relevant to the request. For example, in the scenario where the request is to create a new grouping of devices, the core network system transmits a provisioning request to each of the UEs that are to be included in the group. In the scenario where the request is to modify an existing group of devices, the core network system may transmit requests to only those devices that are impacted by the request such as the UEs that are being added or removed from the group. A response or answer may be received from each of the UEs to which a group provisioning request was made.

In the instance a confirmation is received from the UEs, and the initial request was to create a new group, the 3GPP system assigns a group identifier to the group. The 3GPP system then transmits a response to the service level system from which the request originated. The response includes an indication of whether the request from the service level system was successfully implemented and any information pertinent to the request such as, for example, the group identifier where the request was to create a new group.

The disclosed systems and methods contemplate that in some instances, modifications to existing groups of devices may be initiated by the network system, as opposed to in response to a request from the service layer. For example, the network system may determine that a UE that is a member of an existing group is no longer reachable, perhaps because it has been deactivated or detached from the network. The UEs, when provisioned with information creating a group, may have received data identifying events which if they were to occur should cause the UE to notify a particular system, e.g., HSS or IWF, in the network layer. Accordingly, when a UE detects an event such as the UE being detached from the network or the UE is experiencing congestion, the UE communicates the event to the designated system in the network layer.

In response to receiving notification of the event, the network layer system, e.g., HSS or IWF, sends an acknowledgment. The network layer system then determines the modifications that should be made in response to the event. The network layer system may rely upon data identifying policies for responding to the particular event. The policies may identify whether UEs should be added to or removed from the group and how to select UEs for addition or removal from the group. Upon identifying the UEs and the actions to be taken, the network layer system prepares and transmits a group provisioning requests to each of the UEs that have been identified. The network layer system receives responses from the UEs to which provisioning requests were transmitted.

Upon receiving the responses from the UEs, the network layer system determines whether a service layer system should be notified of any modifications. For example, the network layer system may determine that because the members of the group of devices have changed, the service layer system should be notified. If so, the service layer system prepares and transmits a notification to the appropriate service level system, e.g., SCS.

The disclosed systems and methods also provide for executing the group based services. Accordingly, after the service layer has communicated with the network layer to create and/or modify groups of devices for receiving particular services, the service layer may then request that the network layer actually execute the service. In an example embodiment, a service layer system such as a SCS prepares and transmits a request to execute a particular service with a particular group of devices. The request may comprise, for example, a group identifier associated with a particular service and a particular group of devices.

Upon receipt of the request, the network layer system retrieves information regarding the handling of the service specified in the request. For example, the network layer system may retrieve information regarding the UEs that are associated with the group. Using the retrieved information, the network layer system prepares and transmits requests to the UEs that are identified in the group. The UEs that receive the request respond with an answer reporting on the execution of the service at the particular UE. The network layer system aggregates the information reported by the UEs and transmits the aggregated data to the service level system from which the request originated.

This Summary is provided to introduce a selection of concepts in a simplified form that are further described below in the Detailed Description of Illustrative Embodiments. This Summary is not intended to identify key features or essential features of the claimed subject matter, nor is it intended to be used to limit the scope of the claimed subject matter. Other features are described below.

BRIEF DESCRIPTION OF THE DRAWINGS

The foregoing summary and the following additional description of the illustrative embodiments may be better understood when read in conjunction with the appended drawings. It is understood that potential embodiments of the disclosed systems and methods are not limited to those depicted.

DETAILED DESCRIPTION OF ILLUSTRATIVE EMBODIMENTS

Example Communication Architecture

Figure 1:
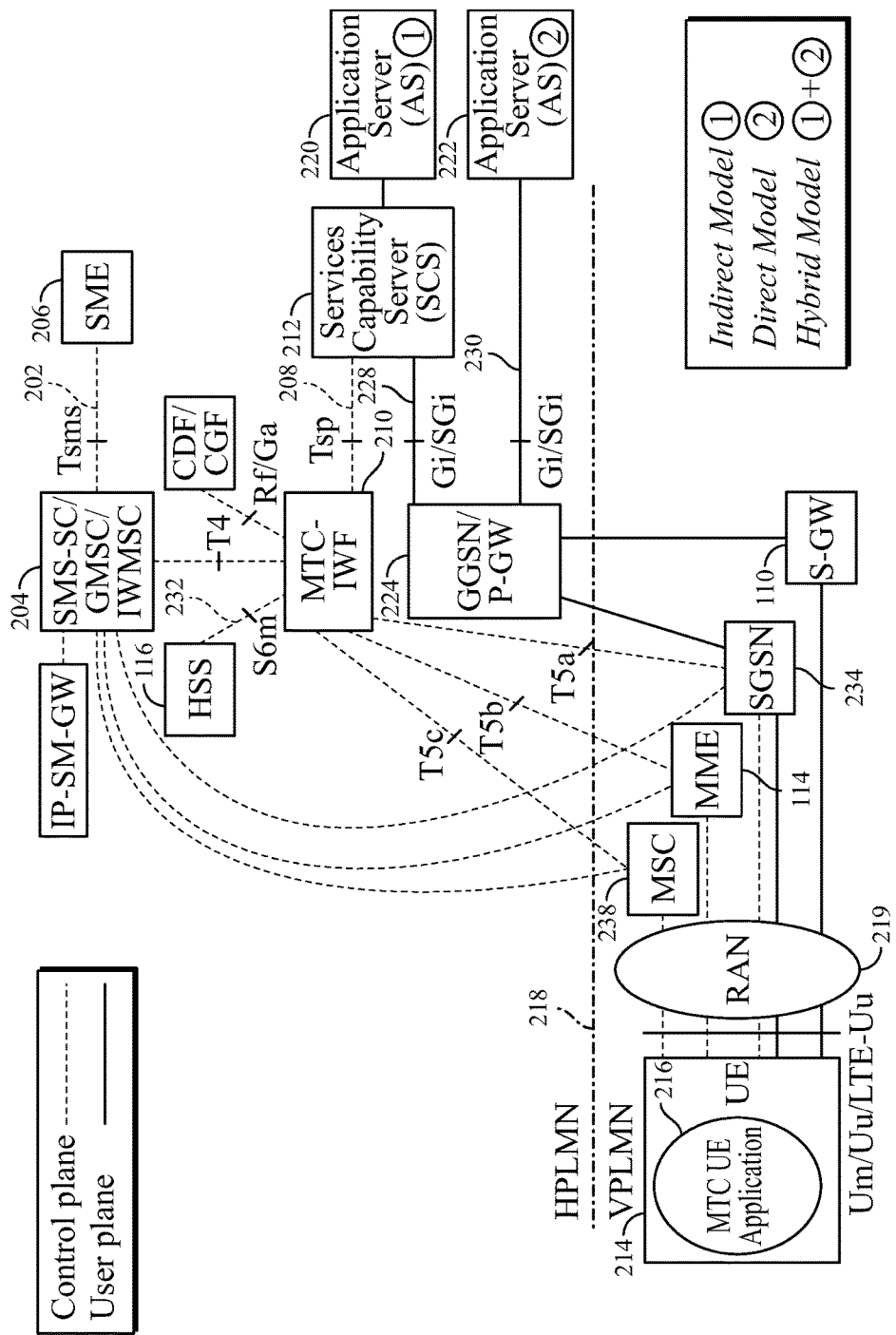
FIG. 1 depicts an example machine type communication architecture suitable for coordinated grouping of machines for machine type group based services.

FIG. 1 illustrates an example machine type communication architecture suitable for coordinated grouping of machines for machine type group based services. In the example embodiment of FIG. 1, a 3GPP based communication architecture interfaces with service level components to provide coordinated grouping of machines for group based services.

As illustrated in FIG. 1, components from the service level including a service capability server (SCS) 212 provide services to the core 3GPP network, devices, and applications. The SCS 212 may also be called an M2M Server, MTC Server, a Service Capability Layer, or a Common Services Entity (CSE). An SCS 212 may be controlled by the operator of the home public land mobile network (HPLMN) or by an MTC service provider. An SCS 212 may be deployed inside or outside the operator domain. In the scenario that an SCS 212 is deployed inside the operator domain, the SCS 212 may be an internal network function and may be controlled by the operator. In the scenario where the SCS 212 is deployed outside the operator domain, the SCS 212 may be controlled by a MTC service provider.

An SCS 212 may communicate with a machine type communication (MTC) interworking function (MTC-IWF) 210 via a Tsp reference point (i.e., interface) 208. The Tsp reference point 208 is an example of an interface that is used for interworking with the 3GPP evolved packet core network. Interworking refers to interfacing to the core network for purposes of exchanging information, controlling devices, monitoring devices, or communicating with devices. For example, interworking may refer to the interfacing between the SCS 212 and the core network for purposes of grouping devices and modifying existing groupings.

As further illustrated in FIG. 1, the reference point (i.e., interface) Tsms 202 may connect a short message service (SMS) service center (SMS-SC) 204 to a short message entity (SME) 206. The Tsms reference point 202 is another example of an interface that is used for interworking with the core network. The SMS-SC 204 communicates with the MTC-IWF 210 over a T4 reference point.

The SCS 212 may connect to a 3GPP network to communicate with user equipment 214, which may comprise MTC (MTC UE) application 216, the MTC-IWF 210 in the HPLMN (e.g., as defined by the boundary 218), or a SMS-SC 204 for device triggering. The SCS 212 may offer capabilities for use by one or more MTC applications on application server 220. In connection with the processing disclosed herein, the SCS 212 may communicate with MTC-IWF 210 in connection with requests to group devices for purposes of receiving 3GPP services. As discussed below, in some example embodiments, MTC-IWF 210 may communicate with home subscriber server (HSS) 116 as part of processing requests received from SCS 212. As shown, HSS 115 and MTC-IWF 210 may be communicatively coupled via S6m interface 232. The HSS 116 comprises a database that contains user-related and subscriber-related information. It also provides support functions in mobility management, call and session setup, user authentication and access authorization.

UE 214 may communicate through the public land mobile network (PLMN), which may include radio access network (RAN) 219, with SCS(s) 212 and/or other MTC UE(s). An MTC UE 214 may host one or more MTC applications 216. The MTC applications 216 may also be hosted on one or more ASs 220/222. The MTC application 216 executing on the UE 214 may be a MTC communication endpoint that may interact with SCSs 212, AS MTC applications, or other UE MTC applications. While FIG. 1 illustrates only one instance of MTC UE 214, it will be appreciated that numerous UEs 214 may exist and be addressable via the 3GPP network.

An application server (AS) 220/222 may also host one or more MTC applications. The MTC applications executing on an AS 220/222, which may interface with SCS(s) 212 and/or GGSN/P-GW 224 (via interfaces 228, 230), may interact with SCSs 212, MTC applications operating on UE 214, and/or other MTC applications.

The MTC inter working function (MTC-IWF) 210 provides a level of abstraction such that the SCS 212 does not need to address the internal PLMN topology. The MTC-IWF 210 may relay and/or translate signaling protocols used between itself and the SCS 212 (e.g., over the Tsp reference point 208) to support MTC functionality (e.g., MTC UE triggering) in the PLMN. For example, the SCS 212 may request that the MTC-IWF 210 send a trigger to a MTC device, which may be, for example, UE device 214. The MTC-IWF 210 may deliver the MTC trigger to the MTC device 214 via SMS. The MTC device 214, and in particular, the MTC UE application 216, based on the trigger may respond to the SCS 212. The MTC device 214 may, for example, respond with a sensor reading. In an example scenario, when the MTC device 214 responds to the SCS 212, the MTC device 214 may use a packet data network (PDN)/packet data protocol (PDP) connection to communicate with the SCS 212. The MTC device 214 may connect with the SCS 212 using an IP connection.

In an example embodiment, the MTC-IWF 210 may need to authorize an SCS 212 before the SCS 212 may establish communication with a 3GPP network. For example, when the SCS 212 makes a trigger request on the Tsp reference point 208, the MTC-IWF 210 may check whether the SCS 212 is authorized to send the trigger request and that the SCS 212 has not exceeded its quota or rate of trigger submissions.

A mobile switching center (MSC) 238 is the primary service delivery node for GSM/CDMA and is responsible for routing voice calls and SMS as well as other services (such as conference calls, FAX and circuit switched data). The MSC 238 sets up and releases the end-to-end connection, handles mobility and hand-over requirements during the call, and takes care of charging and real time pre-paid account monitoring.

A serving general packet radio service (GPRS) support node (SGSN) 234 is responsible for the delivery of data packets from and to mobile devices within its geographical service area. Its tasks include packet routing and transfer, mobility management (attach/detach and location management), logical link management, and authentication and charging functions. The location register of the SGSN stores location information (e.g., current cell, current VLR) and user profiles (e.g., IMSI, address(es) used in the packet data network) of all GPRS users registered with it.

M2M/MTC communications differ from traditional data communications that involve human interaction. For example, M2M/MTC applications that require data communication do not all have the same characteristics. Each different type of M2M/MTC application may require different types of communication services. 3GPP TS 22.368, the contents of which are hereby incorporated by reference in its entirety, identifies these different service requirements and lists different MTC features to provide these services. For example, the MTC feature 'Low Mobility' is intended for use with MTC devices that do not move, move infrequently, or move only within a certain region. The MTC Feature 'Time Controlled' is intended for use with MTC applications that can tolerate to send or receive data only during defined time intervals and avoid unnecessary signaling outside these defined time intervals. The MTC feature 'Small Data Transmissions' is intended for use with MTC devices that send or receive small amounts of data. The MTC feature 'Infrequent Mobile Terminated' is intended for use with MTC devices that mainly utilize mobile originated communications. The MTC feature 'MTC Monitoring' is intended for monitoring MTC device-related events. The MTC feature 'Secure Connection' is intended for use with MTC devices that require a secure connection between the MTC device and MTC server/MTC application server. Lastly, the MTC feature 'Group Based' applies to a group of MTC devices, and includes group based policy, group based addressing, etc.

In existing 3GPP networks, application layer data communication is mainly supported through the packet domain and through SMS. Several different transport mechanisms are available for use, including (i) packet domain (via the SGi and Gi reference points), (ii) short message service (SMS), (iii) multimedia messaging service (MMS), and (iv) the Non-Access Stratum (NAS).

With respect to packet domain messaging, the PGW/GGSN 224 act as the anchor point for data communication and they route user plane data through the GTP-U tunnels (PMIP may also be used in S5/S8 interfaces) within the core network. 3GPP TS 23.401, the contents of which are hereby incorporated by reference herein in its entirety, defines this EPC architecture. A GTP-U tunnel provides common QoS treatment to the IP flows transported through them. Packet filters dictate the flows that are to be transported through a specified GTP-U tunnel.

SMS provides the means to transfer short text messages between a MS/UE and a SME (Short Message Entity) via a SC (Service Centre), as described in 3GPP TS 23.040, the contents of which are hereby incorporated by reference in its entirety. SMS is mainly used to exchange short text messages between users. However SMS can also be used by some higher layer applications for short data communication. SMS can also provide a store and forward mechanism. SMS is routed differently than regular user plane data and does not generally use the SGi/Gi interface path.

MMS is a service that is used to provide a rich set of content to subscribers in a multimedia messaging context. It provides a store-and-forward usage paradigm similar to SMS. However, MMS uses the packet domain user plane (SGi/Gi) to transport the multimedia messages. MMS can be considered an application level service running over the user plane. 3GPP TS 23.140, the contents of which are hereby incorporated herein by reference in its entirety, describes the MMS architecture. MMS supports the use of email addresses (RFC 2822) or MSISDN (E.164) or both to address the recipient of a multimedia message. MMS may also support the use of service provider specific addresses to address the recipient of a multimedia message.

With respect to NAS, the MTC-IWF 210 may use the T5 interface to send small data messages to the SGSN/MME and then use a NAS or RRC message to send the data to the UE.

Another existing mechanism for data transport in a 3GPP network is device triggering. Device Triggering is the means by which an SCS 212 sends information to a UE 214 via the 3GPP network to trigger the UE 214 to perform application specific actions that include initiating communication with the SCS 212. 3GPP TS 23.682, the contents of which are hereby incorporated by reference in its entirety, defines the device triggering mechanism supported by 3GPP networks. Device Triggering may be used when an IP address for the UE 214 is not available or reachable by the SCS/AS.

In order to determine if device triggering is necessary, the SCS 212 and/or AS 220 tracks the validity of the device's IP address. It is possible that the network, i.e., PDN, may re-allocate the IP address assigned to a M2M device to another UE 214 if the device has been idle for too long. In some cases, the SCS/AS may try initial communication using the device's IP address known at the SCS/AS and may detect that the IP address is invalid after the communication fails (probably based on ICMP messages). This process can be time-consuming for establishing a communication with an M2M device. Moreover, the existing device triggering approach requires the SCS/AS to determine if device triggering is needed before exchanging application data, which requires that the SCS/AS use processing resources to build a device triggering message and initiate the device triggering procedure.

Group Based Services

A group based service, which is sometimes referred to as a group based feature or group service, is a service that is offered by a network layer for a group of devices. These services can be beneficial to service layer applications that handle a group of devices (e.g., the M2M service layer). Section 5 of 3GPP TR 23.887, the contents of which are incorporated herein by reference, describes services accessible via a 3GPP network for a group of MTC devices such as, for example, group based messaging, group based charging, group based policy control, and group based addressing and identifiers. Each of these group based services may be realized in the core network by using different methods. For example, group messaging may be achieved by cell broadcast server (CBS) or multimedia broadcast multicast service (MBMS) or other methods.

Group based messaging refers to a service whereby the 3GPP core network distributes the same message to group of UEs in an efficient manner. For example, a message may be communicated to a group of devices in a geographical area.

Group based charging refers to a service whereby the 3GPP core network retrieves charging record data for a group of UEs. The data volume of charging data records (CDRs) generated by MTC applications is often greater than the volume of actual user data transmitted. Under such circumstances, it may be beneficial to create bulk CDRs to count chargeable events for a group of devices instead of CDR creation per individual device. Accordingly, group based charging increases efficiency.

Group based policy control refers to a service whereby the 3GPP core network polices UEs in order to enforce a policy for a group of MTC devices. Group based policy control provides flexibility to the MTC application and reduces the network burden as compared to maintaining individual policies for each of the devices.

The above noted services are just a few of those that are made available to service level applications through 3GPP networks. As new group based services are introduced, new methods to support the existing and new 3GPP services are likewise developed.

Coordinated Group Based Services

For the reasons discussed above, machine to machine communications lends itself to group operations. The expanded deployment of machine to machine communications in the 3GPP network will inevitably lead to the greater utilization of existing group based services and the deployment of new group based services.

In order to efficiently utilize network group based services, intelligent decisions must be made about what devices should be part of the group. In most cases, the mobile network operator does not have enough insight about how the devices are being used to make intelligent decisions about group membership. The mobile network is not well suited to determine what devices should be grouped, when group membership should change, and when groups are no longer needed. Rather, service layer devices such as, for example, an SCS 212, are often better positioned to make such decisions. Applicants disclose herein systems and methods whereby service level systems such as SCSs dynamically coordinate with the core 3GPP mobile network to create, modify, and delete groups of MTC devices for purposes of receiving mobile network services. The SCS 212 provides the core network with information so that the core network can determine an efficient manner to provide the requested services.

It is highly likely that the service layer may want to create groups or modify the groups dynamically based on some condition or information available at the service layer. Some activities at the service layer or at the application layer may require the use of a group based service offered by 3GPP networks. Or the service layer may deem that it can perform certain services more efficiently if 3GPP group based services are used. For example, in an automated industry there may be a large number of M2M devices deployed to control and monitor the automation. The SCS 212 may want to create a group for all the sensors and controllers in a particular process area such as, for example, the electrical controllers in the assembly section so that a common command message may be delivered or a common policy may be enforced. Similarly, when a sensor/M2M device is moved to another process area such as the packaging section, the SCS 212 may want to remove it from an existing group and add it to another group.

The M2M service layer platforms such as ETSI M2M service layer and the oneM2M service layer support group operations. The M2M service layer group operations allow group operations to be performed on common services entities (CSEs), applications, devices, resources or on mixed types. The members of a group created at the service layer need not necessarily have a one to one correspondence with UEs. A group of applications or CSEs may be hosted on a single UE. For example a group of 40 applications may be hosted on 10 UEs. When a group operation is performed on this M2M group, a minimum of 10 different messages would be sent to each of the UEs. However if these UEs are grouped at the network layer, then a single message can be given to the 3GPP network and the network can employ a group communication method such as broadcasting or multicasting to deliver the message to 10 different UEs.

The groups and the group operations performed at the service layer and the network layer are different. The service layer groups (M2M groups) are formed at the service layer function/entity levels (CSFs, applications, URIs etc.) and the group operations that are performed will correspond to service layer procedures. The network layer groups do not directly correspond to service layer groups. The network layer groups are based on the group based services that are offered by the network and these groups are generally formed at the UE level. However it is also possible that the network layer groups are formed by including only a portion of the service provided to the UE. For example, a network layer group can be formed to control the DL-AMBR for a group of applications so that a group of applications do not exceed a maximum DL data rate. These applications can be hosted on different UEs. The network can configure a SDF template on each of the UEs to identify the traffic destined to that particular application and enforce the DL AMBR or other policies that are set for the application group. Hence only a portion of the traffic or only some applications on a UE 214 may be identified separately and be included in a group.

In order to utilize group based services offered by a 3GPP network, the service layer, e.g., SCS, has to first identify which network group based service that the service layer intends to use and the devices (UEs) and/or the affected portion of the service to those devices (e.g., SDFs, application IDs etc.) that are to be part of the group. Then the SCS 212 can make a request to the mobile network operation (MNO) indicating the group based service that is required and provide the list of devices and their related information for formation of the group. Group creation and the services to be provided for the group have to be coordinated between the service layer and the 3GPP network.

Figure 2:
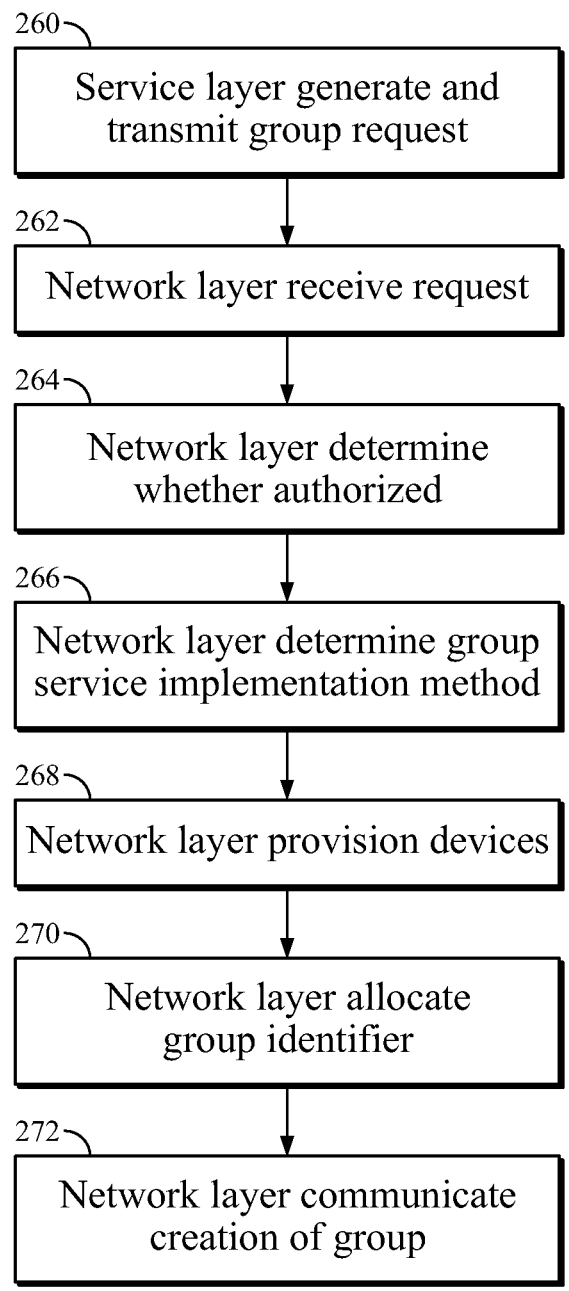
FIG. 2 is a flow diagram of a process for coordinated creation of machine groupings.

FIG. 2 depicts a flow diagram of a process for coordinated grouping for machine type communications group based services. As shown at block 260, a system in the service layer such as, for example, the SCS 212, initiates the group creation procedure by generating and transmitting a Group Control Request for the creation of a group to the network layer. The request comprises information about the UEs 214 to be included in the group and information specifying the requested service(s) for the group. In an example scenario, the request may comprise a list of UEs and/or the affected portion of the service to those devices (e.g., SDFs, application IDs etc.) that are to be part of the group at the group creation time.

At block 262, the request is received at the network layer which, in an example scenario, may be a portion of the core network of a 3GPP network. The operations performed by the core network may be performed by any suitable machine or device that is part of the core network. In an example embodiment, the majority of processing relating to interfacing with the service layer and coordinating group functions is performed by a MTC-IWF 210 and/or HSS 116.

At block 264, the core network determines whether to authorize the use of the requested services by the particular service level system making the request, e.g., the SCS 212, and by the list of UEs 214 that is specified in the request.

At block 266, the core network determines which method should be employed for execution of the requested service (s). A group based service such as group messaging may be carried by the network using any of several different methods such as, for example, CBS based group messaging, MBMS based group messaging, etc. The core network selects a method for execution of the service based on the following criteria: subscription information of the identified UEs 214 and the requesting SCS 212; capabilities of the UEs 214; network condition (congestion/load on a CN node); and network policy.

Under some scenarios, the core network may also suggest that SCS 212 split the group and form sub groups. For example, if the SCS 212 requested a group to be created for group messaging and if the core network chooses the CBS method and finds that the devices are stationary and are distributed in two different LTE cells, then the core network may suggest that the SCS 212 to split the group into two. This can be beneficial for the core network and the SCS 212 as it will allow the core network to manage the group efficiently. For example, if the responses from devices in one of the subgroups are not received, then the SCS 212 can resend the message to only the relevant subgroup.

At block 268, the core network configures or provisions the identified UEs 214 using the selected method(s) and allocates one or more internal group identifier(s) associated with the provisioned service(s). The internal group identifiers are used within the core network to identify particular services and the UEs 214 associated with the service. The core network maintains the internal group identifiers for use in future processing and modification of the services.

At block 270, the core 3GPP network allocates and maintains one or more external group identifiers associated with the newly provisioned service(s). At block 272, the external group identifiers are communicated to the service level system that requested the services and is used in future communications with the service level during subsequent requests relating to the particular group service. The core network maintains a mapping of the external group identifiers to the internal group identifiers along with the UEs 214 that are associated with the internal group identifier(s).

Once a group is formed, the service level, e.g., the SCS 212, can then request that the service be implemented by providing the group ID(s), characteristics of the requested service, and information related to the provisioned service. Upon request, the core network, which may include an HSS 116 and MTC-IWF 210, carries out the requested service using the method that was chosen during the group allocation. The core network may also determine to use a different method for the execution of a group based service if the network condition has changed or if the characteristics of the requested service cannot be met with the method that was chosen during group creation. In some cases, the SCS 212 may directly perform an action on the group. For example, if a group was created for group messaging and if the SCS 212 has a direct link with the broadcast multicast—service center (BMSC) or the cell broadcast center (CBC) of the network, then the SCS 212 may directly send a group message to the BMSC or the CBC.

The SCS 212 may request to add or remove UEs 214 from the group. Accordingly, a group may be created without any members and the members added at a later time. The modification of the group can be accomplished either using dedicated group modification procedure or as part of other existing procedures (attach, TAU, detach etc.). It should also be appreciated that an SCS 212 can also request de-allocation/deletion of a group.

As discussed in detail below, the disclosed systems provide several new procedures, accessible on the Tsp 208 interface between the service layer, e.g., the SCS 212, and the network layer, e.g., MTC-IWF 210, for group creation, group management, and group servicing. The call flow for these procedures may differ depending upon whether the HSS 116 (which may be an HLR, UDR, SPR, HSS, or AAA Server) is made responsible for the group maintenance or whether the MTC-IWF 210 is responsible. In some embodiments, the HSS 116 is responsible for assigning group IDs, configuring the CN nodes, and the managing the groups. This approach may be used, for example, where the MTC-IWF 210 is implemented as a stateless entity. In other embodiments, the MTC-IWF 210 is responsible for assigning group IDs, configuring the CN nodes, and managing the group. Such an approach typically involves the MTC-IWF 210 maintaining information about the UEs 214 in the group and information about the serving nodes.

Coordinated Group Creation

HSS Based Group Creation

Figure 3:
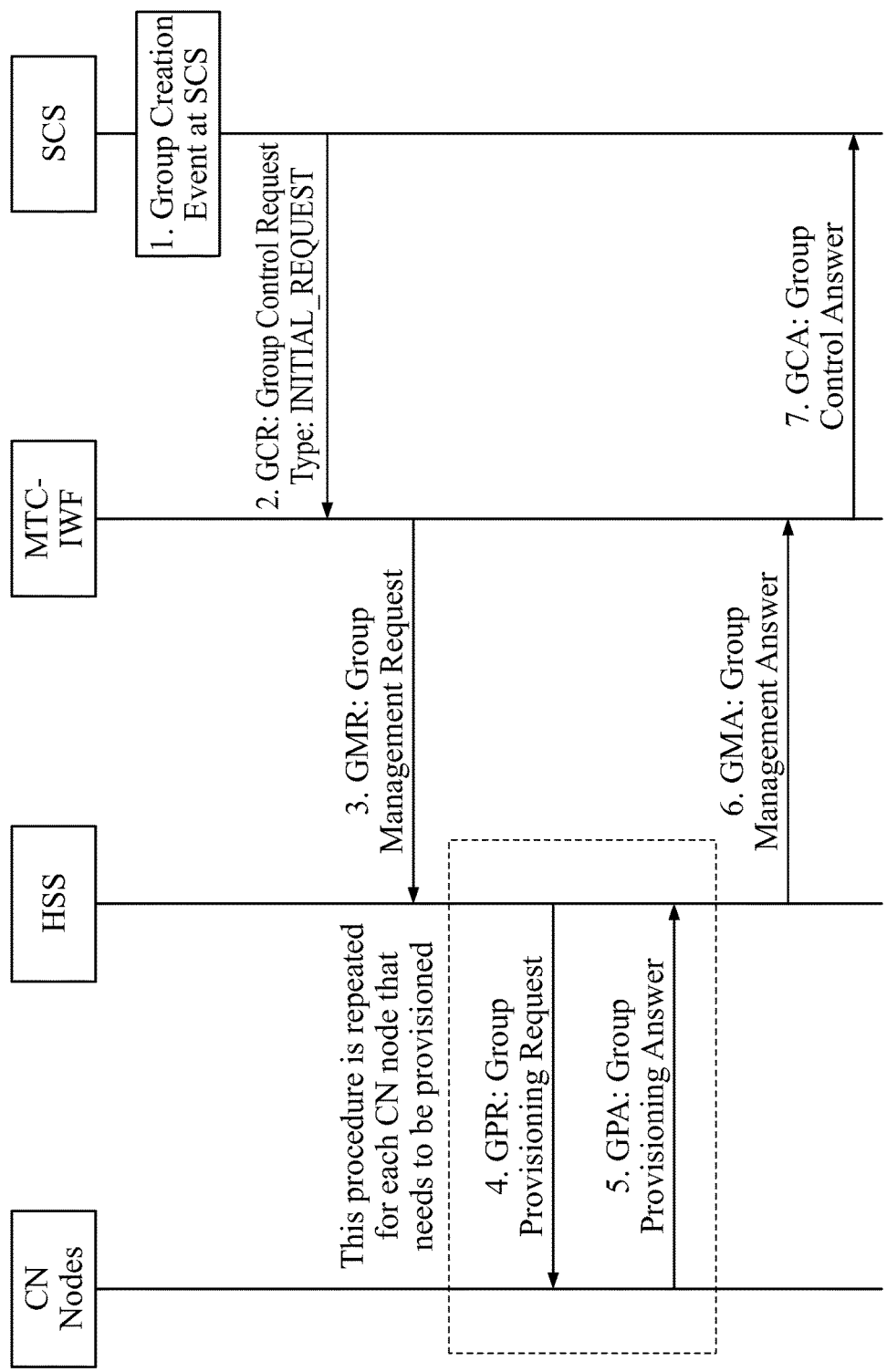
FIG. 3 is a flow diagram of an HSS based process for creation of machine groupings.

FIG. 3 depicts an example process for creating a new group of UEs 214 for receiving network services where an HSS 116 has responsibility for assigning group ID's, configuring the CN nodes, and managing the group. In such an embodiment, the MTC-IWF 210 may be implemented as a stateless entity.

Referring to FIG. 3, at step 1, a group creation event occurs at the service layer. In an example embodiment, the event is identified at an SCS 212. The group creation event may occur as a result of any number of different processing situations. For example, an M2M application or a CSE may send a group CREATE request for the formation of a group resource. A Group Management CSF may thereafter determine that the network provided group services can be used for the group and initiates a group creation request to an NSSE CSF. In another example scenario, the process of creating a group may be initiated based on configurations/provisioning done by the M2M operator.

Referring to FIG. 3, in response to detecting a group creation event, at step 2, the SCS 212 prepares and transmits a Group Control Request message (GCR) with GC-Request-Type attribute value pair (AVP) set to the value "INITIAL_REQUEST" to the MTC-IWF 210. In an example embodiment, the attribute value pair corresponds to a Diameter protocol attribute value pair. The request comprises any information needed to perform the requested group creation. In an example embodiment, the request comprises the following information in the GCR message: a suggested group identifier; the type of the requested service such as, for example, the group messaging service or group policy; the requirements/characteristics of the requested service(s); membership information such as a list of devices, which may be external identifiers of devices and/or external group identifiers of previously created groups, and/or application identifiers that should be part of the group (optional); flag data indicating if the mobile network operation (MNO) can make modifications to the group; an indication of how long the group is to exist; flag data indicating whether direct group execution is requested; a sub-grouping flag to indicate whether the MNO can suggest breaking the group into multiple sub-groups or not; and, if sub-grouping is supported, then the max number of subgroups that may be formed can be indicated. The list of devices included in the request may be a list of individual External Identifiers of the UEs, a list of External Group IDs, which may have been previously allocated, or a combination of External Group IDs and External UE IDs. When an External Group ID is provided, the HSS 116 maps it to a list of UEs during the processing described below. The services that were selected for the External Groups ID provided in the 'list of devices' of the GCR message are generally not considered for the new group being formed. Rather, only the services that are explicitly listed in the GCR request are considered for the new group to be formed. In an example embodiment, the SCS 212 exchanges information with the HSS 116 via the MTC-IWF 210 over the Tsp interface 208. In an alternative embodiment, the SCS 212 might interface directly to the HSS 116 via an updated Mh interface.

Referring to FIG. 3, at step 3, the MTC-IWF 210 prepares and transmits a Group Management Request (GMR) message to the HSS 116 and passes the information received in the GCR message for the purpose of authorization and group formation. In an example embodiment, the message contains the information from the GCR message as described above. Upon receipt of the message, the HSS/HLR 116 maps the External Identifiers of the devices and External Group Identifiers to internal identifiers (e.g., IMSI) and retrieves the subscription information of each of the UEs. The HSS 116 also retrieves subscription information of the SCS 212 that is making the request. The HSS/HLR 116 determines whether the SCS 212 is authorized to form groups and use the services being requested. The HSS/HLR 116 also checks if the UEs can be authorized for the use of the group based service. The HSS 116 selects a method for the delivery/execution of the service based on the following parameters: capabilities of the UEs that are known in the HSS 116; requirements for the service; subscription information of the UEs and the SCS 212; and status of the network nodes that serve the group members. Depending on the method that is selected, the HSS 116 determines the core network (CN) nodes that require configuration for the group based service. The HSS 116 also allocates a local group identifier to be used within the CN. For example, if the requested service is a group messaging service and the message characteristics is a small message, then the CN may determine to use the cell broadcast service (CBS) method and may configure the MME and CBC. If the HSS 116 choses the MBMS method, then the HSS 116 may configure the BMSC. In another example, if group policy control was requested, then the HSS 116 may configure the PCRF and PGW.

Referring to FIG. 3, at step 4, the HSS 116 prepares and transmits a Group Provisioning Request (GPR) message to each CN node that has to be configured for the group service. The CN node may correspond to any of the functional entities in the CN such as, for example, the MME, SGW, PGW, PCRF, CBC, MBMS-GW, etc. The HSS 116 includes in the message any information needed by the CN nodes that are serving in the group. In an example embodiment, the message may include, for example: the identifiers of the UEs (e.g., IMSI); the service that has to be configured; the events that needs to be reported to the HSS 116; and a local group identifier allocated by the HSS 116. The HSS 116 may include all UEs that belong to the group in the GPR message, irrespective of whether the UE 214 is currently serviced by the CN node, or it may include only the part of the group that is relevant to the CN node depending on the service being configured. The HSS 116 keeps track of the UEs in the group, and when the UEs attach to a different node (a different MME, PGW, etc.), the HSS 116 provisions the new CN node with the group service information.

Upon receiving the GPR message, the CN nodes 214 configure themselves for the service. As part of this process, a CN node may provision other CN nodes that are connected to it. For example an MME 114 may configure the wireless network base stations, e.g., evolved node Bs (eNBs), or the SGW 110 that are connected to it. The CN nodes store the local group ID allocated by the HSS 116 and may also pass it on to other nodes. The CN nodes may also explore the possibility of creating sub-groups (local groups) for the convenience of the CN and pass information about the sub-groups to HSS 116.

Referring again to FIG. 3, at step 5, each of the CN nodes send a Group Provisioning Answer (GPA) message once it has configured itself and other relevant nodes connected to it. In an example embodiment, the CN nodes may allocate an internal group identifier and provide it to the HSS 116 in the message. The HSS 116 may store these IDs and use them whenever needed to address the part of the group that is associated with a particular CN node.

Upon receipt of the GPA messages from all of the CN nodes or after a timer expiry, the HSS 116 allocates an external group ID that is to be provided to the SCS 212. In one example embodiment, the HSS 116 may use the local group ID for creating the external group ID (localID@realm) or hide the local ID completely and allocate an external group ID and maintain the mapping to the local group ID.

Referring to FIG. 3, at step 6, the HSS 116 sends a Group Management Answer (GMA) message to the MTC-IWF 210 indicating the external group identifier and other service related parameters (e.g., a message ID, multicast IP address, etc.) to the MTC-IWF 210.

Referring to FIG. 3, at step 7, the MTC-IWF 210 passes on the external group identifier and the service related parameters to the SCS 212 in the Group Control Answer (GCA) message. The information in this message may include, for example: external identifier for the group; the list of services that were accepted by the CN; if direct group service execution was requested, then the MTC-IWF 210 may pass the group addressing information such as the TMGI, Multicast IP address, etc. that the SCS 212 may use to directly address the group; any sub grouping information (if sub-grouping was performed then an external group ID for each sub group and the list of services for each group and the list of UEs in each group are provided); and the negotiated duration for the existence of the group.

In an example embodiment, the MTC-IWF 210 or HSS 116 may provision a DNS server with the external group ID. This allows the SCS 212 to use the services for the external group ID. For example, one SCS 212 may have created a group and passed the external group ID to other SCSs. If the other SCSs want to execute a service (e.g., send a group message) they may use the external group ID to find the appropriate MTC-IWF 210 and send the group message.

MTC-IWF Based Group Creation

Figure 4:
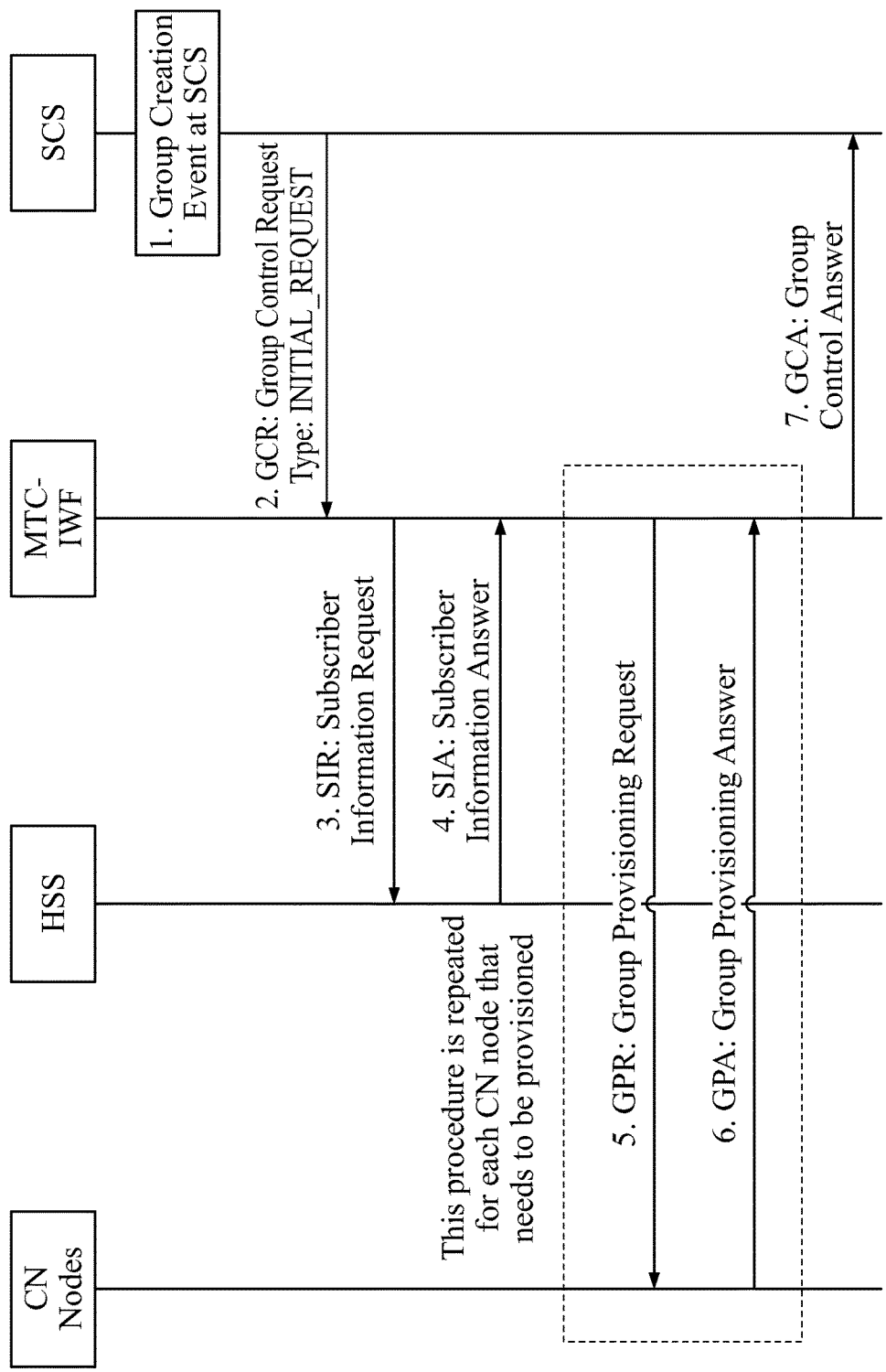
FIG. 4 is a flow diagram of an MTC-IWF based process for creation of machine groupings.

FIG. 4 depicts another example process for creating a new group of UEs for receiving network services wherein the responsibility for assigning group IDs, configuring the CN nodes, and managing the group lies with the MTC-IWF 210. In this approach, the MTC-IWF 210 maintains information about the UEs in the group and information about the serving nodes.

Referring to FIG. 4, at step 1, a group creation event occurs at the service layer. The group creation event may occur as a result of any number of different processing situations as described above in connection with FIG. 3, step 1.

Referring to FIG. 4, at step 2, the SCS 212 generates and transmits a Group Control Request message (GCR) with GC-Request-Type AVP set to the value "INITIAL_REQUEST" to the MTC-IWF 210. The information contained is the request is the same as described above in connection with FIG. 3, step 2.

In response to receiving the request, the MTC-IWF 210, based on the requirements of the requested service and other network status information, generates a list of candidate methods for executing the service. In some scenarios, there may be only one method for executing the service. The MTC-IWF 210 may also perform a mapping of the external group IDs to a list of UEs (if external group IDs were provided by the SCS 212 in the GCR message).

Referring again to FIG. 4, at step 3, the MTC-IWF 210 generates and transmits a Subscriber Information Request (SIR) to the HSS/HLR 116 for purposes of authorizing the group creation process. In an example embodiment, MTC-IWF 210 provides group parameters such as, for example, the following: the list of devices (external identifiers); the SCS ID which is requesting the service; the type of service (s) requested and the list of candidate methods for executing the service(s); and the list of candidate methods that were chosen. In another example embodiment, a new Group Information Retrieval procedure is used for the purpose of sending the above information. A GIR (Group Information Request) message can be used by the MTC-IWF 210 to initiate this procedure.

In response to the SIR request, the HSS 116 maps the external identifiers to internal identifiers (IMSI) and retrieves the subscription information of each of the UEs and the SCS 212. The HSS/HLR 116 determines whether the SCS 212 is authorized to form groups and to access the requested services. The HSS/HLR 116 also checks if the UEs can be authorized for the use of the requested group based service.

Referring to FIG. 4, at step 4, the HSS/HLR 116 prepares and transmits an SIA (Subscriber Information Answer) message. In an example embodiment, the SIA comprises the following information: authorization information for the SCS 212; capabilities and authorization details of each of the UEs; group service related data for each of the candidate methods; and serving node information for each of the UEs. In one alternative embodiment, a new Group Information Retrieval procedure (as mentioned in the above step as an alternative) may be used for the purpose of communicating information from the HSS 116 to the MTC-IWF 210. In another alternative, the HSS 116 may allocate an external group ID or local group ID and provide it to the MTC-IWF 210 as part of an SIA message or a GIA message. In yet another embodiment, a new Group ID Request procedure can be used wherein the MTC-IWF 210 explicitly sends a message requesting an external/local group ID to be allocated by the HSS 116 and the HSS 116 responds with a message containing the requested group ID.

Upon receipt of the message, the MTC-IWF 210 uses the received information, the condition of the network, and the contents of the GCR message (such as, for example, the requested service, characteristics of the service, number of UEs in the group, etc.) to determine a method for use in delivery of the service.

Referring to FIG. 4, at step 5, the MTC-IWF 210 prepares and transmits a Group Provisioning Request (GPR) message to each of the CN nodes that need to be configured for the method(s) chosen by the MTC-IWF 210. The MTC-IWF 210 may provide the complete list of the group members to a CN node or only a subset of the group that the node may be currently serving or that needs to be monitored for. The MTC-IWF 210 may also indicate if sub-grouping can be done. The GPR message may also carry information about which events for the group should be communicated to the MTC-IWF 210. The MTC-IWF 210 may use this notification to manage/modify the group. The MTC-IWF 210 may also include a local group identifier and include it as part of the GPR message.

Upon receiving the GPR message, the CN nodes configure themselves for the service. As part of this process, a CN node may provision other CN nodes that are connected to it. For example, an MME 114 may configure the eNBs or the SGW 110 that are connected to it. The CN nodes store the local group ID allocated by the MTC-IWF 210 and may also pass it on to other connected nodes. The CN Nodes may also explore the possibility of sub-groups (local groups) for the convenience of the CN and the MTC-IWF 210.

In the scenario wherein a group provisioning request is communicated to and received at a base station such as, for example, an eNB, the request may indicate, for example, that the eNB should be configured consistent with a defined grouping of machines for receiving services. More particularly, the provisioning request may comprise information identifying one or more machines that are comprised in a group of machines for receiving services and may further comprise an indication that the eNB configure itself to communicate with a group of machines including the one or more machines identified in the request. In response to the request, the eNB stores the information identifying the one or more machines comprised in the group of machines and configures itself to communicate with a group of machines including the identified one or more machines. In an example scenario, the eNB may update an existing grouping defined on the eNB that identifies machines that receive group communications from the eNB. After the eNB has configured the grouping thereon to accommodate the one or more machines identified in the group provisioning request, the eNB generates and transmits a response indicating the configuration is complete. Subsequent group communications initiated by the eNB may comprise communications with the one or more machines identified in the request.

Referring to FIG. 4, at step 6, the CN nodes generate and transmit Group Provisioning Answers to the MTC-IWF 210. The information comprised in the answer is the same as that discussed above in connection with step 5 of FIG. 3. It will be appreciated that while FIG. 4 illustrates that the GPR/GPA messages are communicated directly between CN nodes and MTC-IWF 210, the processing might also involve the HSS/HLR 116.

Referring to FIG. 4, at step 7, the MTC-IWF 210 prepares and transmits a Group Control Answer message (GCA) message to the SCS 212. The information comprised in the message is the same as that discussed above in connection with step 7 of FIG. 3.

Group Modification

In some instances, it may be desirable to modify the membership of a group, modify the services that are allotted for the group, or delete the group. This procedure may also be used for splitting or merging groups and can be initiated by the CN or the SCS 212. Under some circumstances, the modification of a group may leave the group empty (all the UEs/devices removed from the group). In some instances where a group does not contain any UEs, the group may not be deleted and the external group ID for the group maintained so as to allow for the addition of new members to the group at a later point in time. However, in some instances, it may be desired to actually remove the group. The group external group ID will be deleted if the GCR command type is set to DELETION_REQUEST.

SCS Initiated Group Modification

Figure 5:
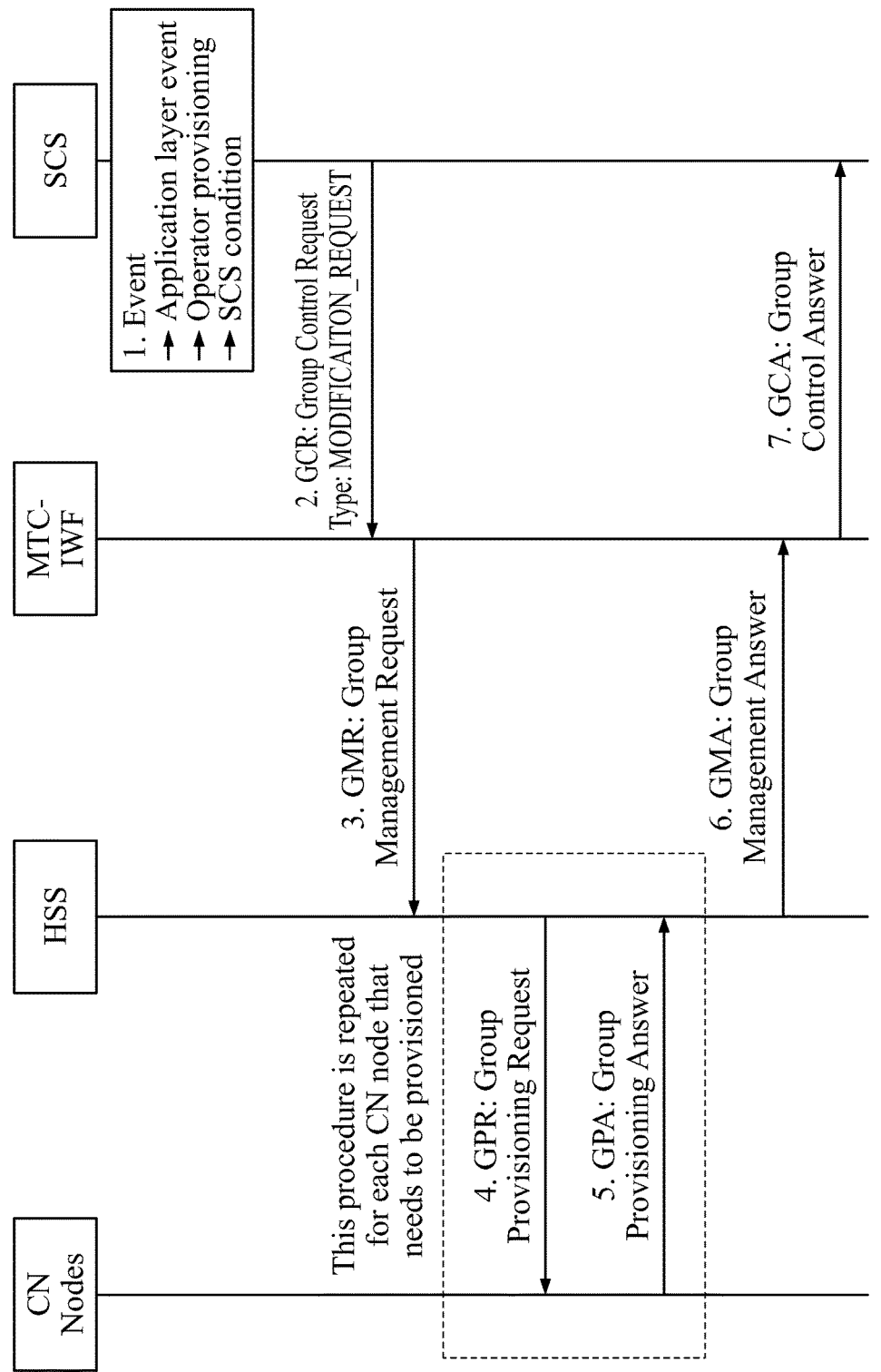
FIG. 5 a flow diagram of an HSS based process for modification of machine groupings.
Figure 6:
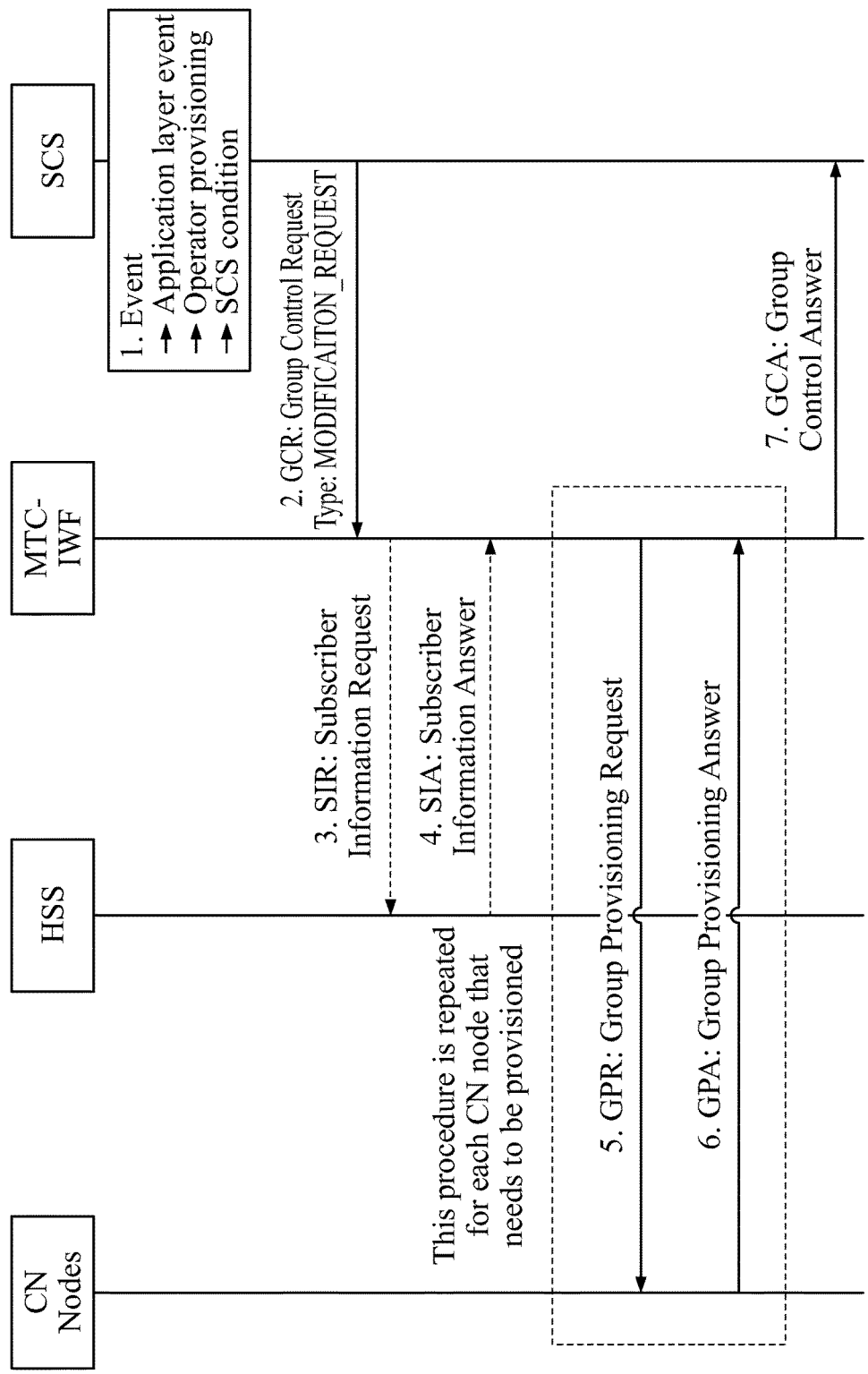
FIG. 6 is a flow diagram of an MTC-IWF based process for modification of machine groupings.

FIGS. 5 and 6 depict example processing for modifying an existing group of UEs where the modification is initiated by the SCS 212. The SCS 212 may initiate a modification procedure when it detects an event that would interfere with the existing group service processing. For example, the SCS 212 may initiate a modification procedure when a device or application has changed location, shut down, has an expired subscription, has elected to leave or join the group, or when the SCS 212 elects to add or delete a device or application to/from a group.

FIG. 5 depicts an example process for modifying an existing group of UEs for receiving network services wherein an HSS 116 has responsibility for assigning group ID's, configuring the CN nodes, and managing the group identifiers with the HSS 116. In such an embodiment, the MTC-IWF 210 may be implemented as a stateless entity. In an example embodiment, the SCS 212 may exchange information with the HSS 116 via the MTC-IWF 210 over the Tsp interface 208. An alternative embodiment allows the SCS 212 to interface directly to the HSS 116 via an updated Mh interface.

Referring to FIG. 5, at step 1, a group creation event occurs at the service layer. In an example embodiment, the event is identified at an SCS 212. The event may be initiated in response to activity by, for example, the user, the application, or a UE, or it may be initiated in response to some conditions at the application or service layer (i.e., when a certain application defined criteria is satisfied) or in response to administrator activity. The trigger could result in removal or addition of UEs to a group or the modifications of the services allotted for the group.

Referring to FIG. 5, at step 2, the SCS 212 generates and sends a Group Control Request message (GCR) with the GC-Request-Type AVP set to the value "MODIFICATION_REQUEST" or "DELETION_REQUEST" to the MTC-IWF 210. In an example embodiment, this GCR message may contain the following information: a list of UEs that are to be removed or added; a list of services that are to be removed, added, or modified; characteristics of the services; a flag indicating whether or not sub-grouping can be performed; and a time duration of the group. In an embodiment, the GCR message may further comprise the following: sub-grouping information such as, for example, a list of UEs and services for the sub-groups; and merging information which may comprise, for example a list of group IDs and individual UE IDs that are to be merged into a single group. In a scenario wherein groups are being merged, the new group may have the superset of all the services that were allotted for each of the groups.

Referring to FIG. 5, at step 3, the MTC-IWF 210 passes the modification request to the HSS 116 in a Group Management Request with type set to "MODIFICATION_REQUEST" or "DELETION_REQUEST." Based on the modification request, the HSS 116 may alter the method of service execution. For example, if the characteristics of an existing service are modified, the HSS 116 may identify a different method for the delivery of the service. In a scenario wherein the size of the group significantly changes, the HSS 116 may choose a different method. The selection of the method may be similar to that described above in connection with step 3 of FIG. 3.

Referring to FIG. 5, at step 4, the HSS 116 prepares and transmits a GPR message to all the affected CN nodes (those providing the group services and any new CN nodes that need to be provisioned) regarding the modifications in the group characteristics. The information that is comprised in the GPR message may be similar to that described above in connection with step 4 of FIG. 3.

The CN nodes configure themselves and other relevant nodes connected to them based on the GPR message. Referring to FIG. 5, at step 5, the CNs prepare and transmit a GPA message to the HSS 116 to inform the HSS 116 about the success or failure of the group provisioning.

At step 6 of FIG. 5, the HSS 116 generates and transmits a Group Management Answer, which in this instance may be a Group Modification Answer, to the MTC-IWF 210 indicating the result of the group modification procedure.

At step 7 of FIG. 5, the MTC-IWF 210 prepares and transmits a GCA message to inform the SCS 212 about the success or failure of the group modification procedure. In one embodiment, the message may also include the current list of services supported by the CN in the 'Supported-Features' AVP or the 'Available-Service' AVP.

FIG. 6 depicts an example process for modifying an existing group of UEs for receiving network services wherein the responsibility of assigning group IDs, configuring the CN nodes, and managing the group lies with the MTC-IWF 210. In this approach, the MTC-IWF 210 maintains information about the UEs in the group and information about the serving nodes.

Referring to FIG. 6, at step 1, a group creation event occurs at the service layer. In an example embodiment, the event is identified at an SCS 212. The event may be initiated in response to activity by, for example, the user, the application, or a UE, or it may be initiated in response to some conditions at the application or service layer (i.e., when a certain application defined criteria is satisfied) or in response to administrator activity. The trigger could result in removal or addition of UEs to a group or the modifications of the services allotted for the group.

Referring to FIG. 6, at step 2, the SCS 212 generates and transmits a Group Control Request message (GCR) with the GC-Request-Type AVP set to the value "MODIFICATION_REQUEST" or "DELETION_REQUEST" to the MTC-IWF 210. The contents of the request may be the same as those discussed above in connection with step 2 of FIG. 5.

At step 3 of FIG. 6, the MTC-IWF 210 generates and transmits a subscriber information request (SIR). The SIR requests subscription information for the devices that are to be added to the group and authorizes adding them to the group. The request may comprise information such as described above in connection with step 3 of FIG. 5.

At step 4, the HSS/HLR 116 generates and transmits the subscription information and its authorization response in a SIA message to the MTC-IWF 210. The answer may comprise information such as described above in connection with step 4 of FIG. 5. Based on the response from the HSS 116 and type of modification requested, the MTC-IWF 210 may alter the method of execution for the service. The selection of the method is the same as described above in connection with step 4 of FIG. 4. It will be appreciated that the SIR request and SIA response may be optional depending upon the type of modification.

At step 5, the MTC-IWF 210 generates and transmits a GPR message to each of the affected CN nodes (those providing the group services and the new CN nodes that need to be provisioned) about the modifications in the group members and/or the services required. The CN nodes configure themselves and other relevant nodes connected to them based on the GPR message.

At step 6, the CN nodes generate and transmit a GPA message to the MTC-IWF 210 providing information about the success or failure of the group provisioning.

At step 7, the MTC-IWF 210 prepares and transmits a GCA message to inform the SCS 212 about the success or failure of the group modification procedure.

CN Initiated Group Modification

According to another aspect of the disclosed systems and methods, the core network (CN) may initiate a group modification procedure based on network conditions or events. For example, if a UEs subscription is withdrawn, or a UE 214 is detached, deactivated, or roams to another network or to another access type, or if the UE 214 attaches or activates a PDN or returns back to the HPLMN, the CN may initiate the addition or removal of the from the group.

In another example scenario wherein the CN may initiate group modification, the core network may alter the allotted services for a group in response to detecting congestion on the network. With respect to such a group modification, certain events may be handled by HSS/MTC-IWF and may not be reported to SCS 212. For example if a CBS node is congested and the HSS/MTC-IWF had earlier selected CBS method for group message delivery, then the CBS may internally choose another message delivery method for the group and may not report the event to the SCS 212. However if the service requirements cannot be satisfied with other methods, then the HSS/MTC-IWF may either request that the SCS 212 alter the service requirements or delete the group.

During group creation as described above, the HSS/MTC-IWF may explicitly configure the CN nodes about the events that will require group modifications. The HSS/MTC-IWF configures the CN nodes (using GPR/GPA procedures) about the events that the CN nodes should monitor and report to the HSS/MTC-IWF. Based on the event notifications from the CN nodes or from other events and procedures where the HSS/MTC-IWF is involved, the HSS/MTC-IWF determines if a group modification is necessary. If a group modification is needed, the HSS/MTC-IWF initiates the group modification procedure. The HSS/MTC-IWF can also communicate the occurrence of the event (e.g., UE detach) to the SCS 212 and let the SCS 212 determine if group modification is needed. This approach of HSS/-MTC-IWF providing the event notification to SCS 212 is described below in connection with FIG. 7.

The events that the CN nodes monitor for depends on the group based service that the group has been subscribed for and the method that is selected for executing the group based service. The table below lists some of the events and the particular CN node that typically monitors that event. Many of the events are monitored by the HSS 116, in which case the HSS 116 reports the event to MTC-IWF 210 in the 'MTC-IWF based group management' method. The events listed below are not an exhaustive list and there may be other events that may need to be monitored. The HSS/MTC-IWF can trigger the group modification based on any event notification from any of the CN nodes.

| Event | Monitoring CN node |
| --- | --- |
| Tracking Area Change | MME |
| Cell Change | MME |
| Attach | MME |
| Detach | MME |

-continued

| Event | Monitoring CN node |
| --- | --- |
| UE Reachability | MME |
| UE Idle State/PSM mode | MME |
| PDN Connection | PGW |
| PDN Disconnection | PGW |
| UE Subscription Withdrawal | HSS/HLR |
| Inter PLMN mobility (Roaming) | HSS/HLR |
| Inter-System Mobility (e.g. LTE to UMTS) | HSS/HLR |
| Inter-Technology Mobility (e.g., LTE to Wi-Fi) | HSS/AAA Server |
| Handover | MME, HSS/HLR |
| Policy and Charging Information Change | PCRF |
| Congestion/Overload | MME, PGW, HSS, PCRF, CBC, MBMS-GW etc. |
| Operator Provisioning/Service availability | MME, PGW, HSS, PCRF, CBC, MBMS-GW etc. |

HSS Based CN Initiated Group Modification

Figure 7:
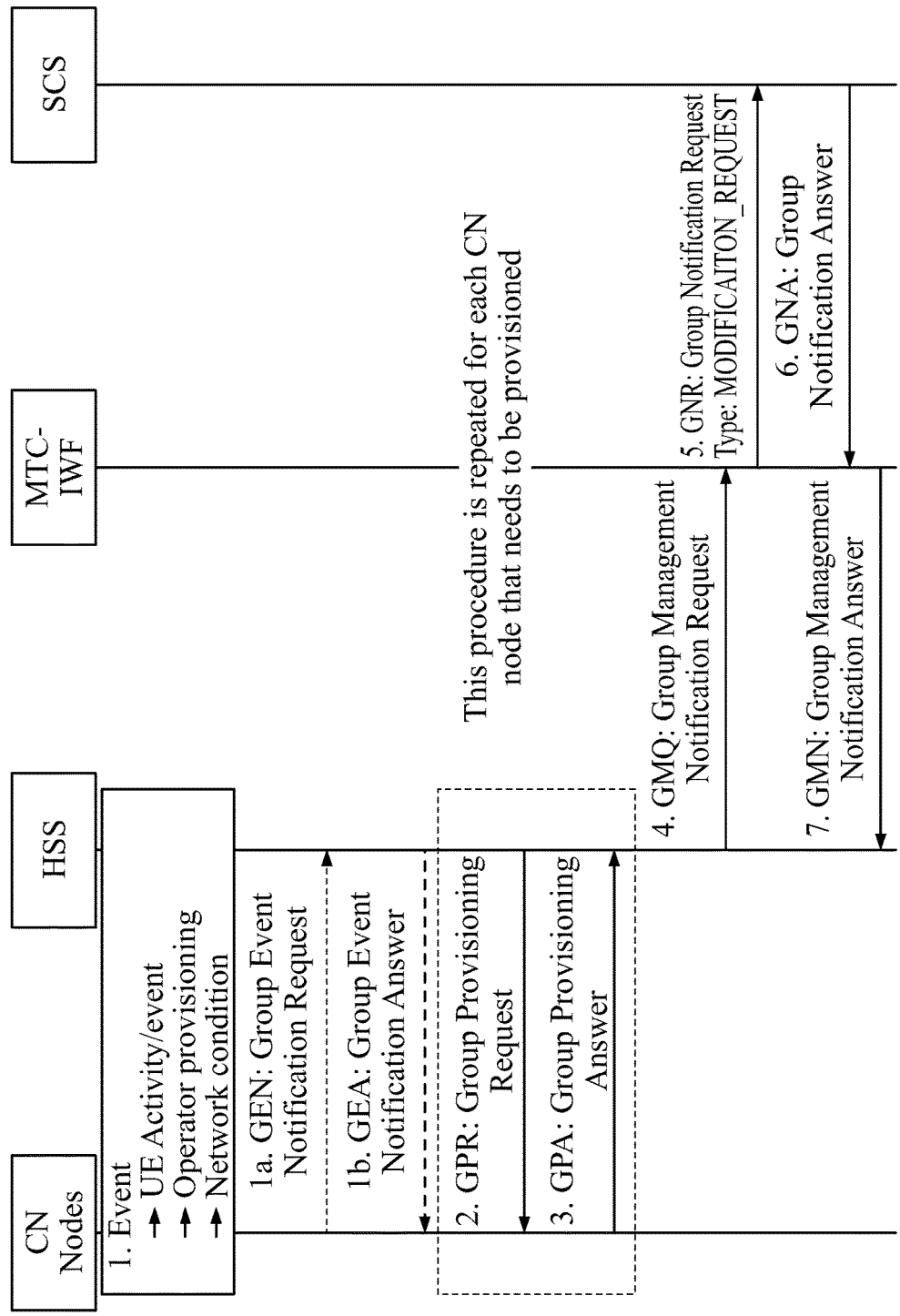
FIG. 7 is a flow diagram of an HSS based process for core network initiated group modification.

In an example embodiment of group modification initiated by the core network, the HSS 116 is primarily responsible for implementing the modifications to the groupings. FIG. 7 depicts example processing associated with such an embodiment.

As shown, at step 1, a core network (CN) node detects an event, procedure, or operator provisioning in the core network. The events may be a UE related event such as an attach/detach event or a network related event such as the existence of network congestion. Where the event is one for which the core network nodes have been configured to monitor for (see table above), CN node generates and transmits a group event notification to the HSS 116.

In response to detecting the event, at step 1a, the core network generates and transmits a Group Event Notification Request (GEN) message to the HSS 116. At step 1b, the HSS 116 sends a Group Event Notification Answer (GEA) message to acknowledge the receipt of the GEN message.

In response to receiving the GEN message, the HSS 116 determines the modifications that are necessary for the group. The HSS 116 may apply policies that have been defined in the network to determine the modifications that are needed. The policies/subscription may define if the CN is allowed to make modifications to the group. For example, the policies may define group owners (MNO or the SCS 212) for which modification is allowed, the level of modification that can be made (addition/deletion of UEs/Services), when to make the modification (events), the method selection criteria, etc.

Referring to FIG. 7, at step 2, the HSS 116 sends a GPR message to each of the CN nodes that requires provisioning. In an example embodiment, the GPR messages are the same or similar to that described above in connection with step 4 of FIG. 5.

In response to receiving the GPR messages, each of the impacted nodes implements the requested service provisioning. Referring to FIG. 7, at step 3, the core network nodes that received the GPR messages respond with a GPA message providing details of the provisioning. In an example embodiment, the GPA message comprises information the same as or similar to that described above in connection with step 5 of FIG. 5.

In response to receiving the GPA messages, the HSS 116 determines whether or not to inform the SCS 212. In an example embodiment, if only the method of executing a service has changed, the HSS 116 may choose not to inform the SCS 212. Similarly, in an example embodiment, if the group members and the service offered have changed, then the HSS 116 may inform the SCS 212.

In the scenario wherein the HSS 116 determines the SCS 212 should be informed, as shown at step 4, the HSS 116 generates and transmits a Group Management Notification Request (GMQ) message to the MTC-IWF 210. The message contains the modifications and/or group related notifications that require communication to the SCS 212.

At step 5, the MTC-IWF 210 generates and transmits a Group Notification Request (GNR) message to the SCS 212 indicating the modifications made to the group. In an example embodiment, the message contains a list of devices (external identifiers) that were removed or added and the list of services that have been added, reconfigured (characteristics change), or removed. In response to receiving the message, the SCS 212 may configure the service layer as needed.

Once the service layer configuration for the group modification is complete, at step 6, the SCS 212 sends a Group Notification Answer (GNA) GNA message to the MTC-IWF 210.

At step 7, the MTC-IWF 210 prepares a message communicating the information to the HSS 116 in a Group Management Notification Answer (GMN) message.

Those skilled in the art will appreciate that while the above processing involved the HSS 116 transmitting a group modification message to the SCS 212 via the MTC-IWF 210, other alternatives methods of processing may be used. For example, the message may be sent directly to the SCS 212 via the Mh interface as opposed to via the Tsp interface 208.

In the embodiment described in connection with FIG. 7, upon receiving notification of an event, the HSS 116 reconfigures the members of the group, the services that are provided to the group, or how services are provided to the group. In an alternative embodiment, a different core network node is notified of the event and tasked with reconfiguring the members of the group. For example the MTC-IWF 210 could be assigned these tasks. In an embodiment where the MTC-IWF 210 is assigned these tasks, steps 1, 2, and 3 would occur between core network nodes (i.e., the P-GW, S-GW, MME, PCRF, UDR, and HSS) and the MTC-IWF 210. In other words, steps 1*a* and 3 would terminate at the MTC-IWF 210 and steps 1*b* and 2 would be initiated at the MTC-IWF 210.

HSS Based CN Triggered, SCS Initiated Group Modification

Figure 8:
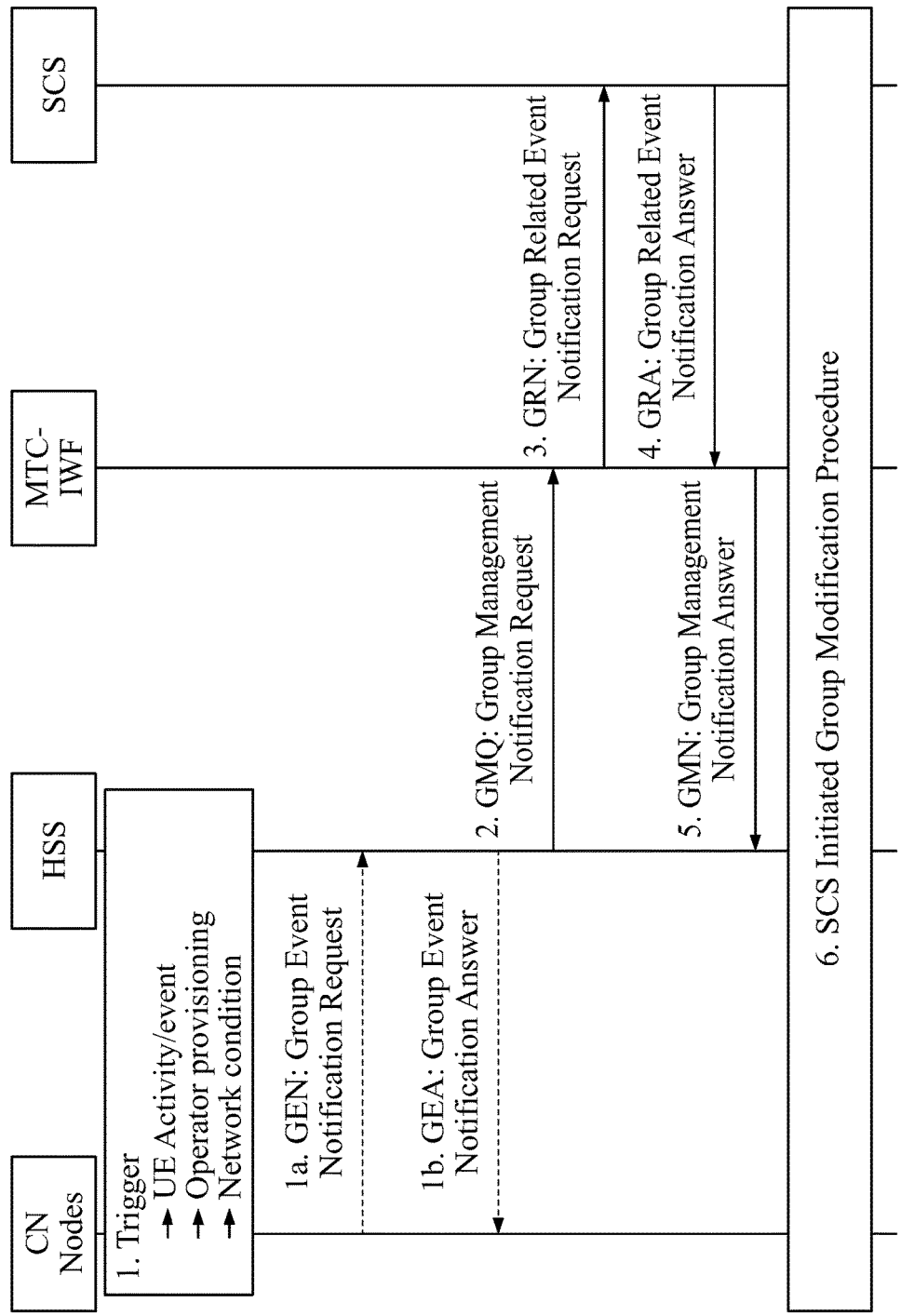
FIG. 8 is a flow diagram of an HSS based process for core network triggered, SCS initiated group modification.

FIG. 8 depicts an alternative HSS-based approach to core network initiated modification. In the processing depicted in FIG. 8, the HSS 116 sends a notification to the SCS 212 about the modification-triggering events and the SCS 212 initiates the group modification procedure based on the event notification message.

Generally, the processing operates similarly to that described in connection with FIG. 7. In this alternative approach, however, a GRN message that is communicated from the MTC-IWF 210 to the SCS 212 contains a report about the events, such as new services that have become available or the services that have become unavailable and other UE related events. The SCS 212 determines whether to perform a modification for the group based on the GRN message. In a variation of this processing, the HSS 116 sends a group event message to the SCS 212 via the MTC-IWF 210. In yet another alternative embodiment, the message is sent directly to the SCS 212 via the Mh interface.

On the Fly Group Membership Control

As described above, the addition and deletion of UEs into a group can be performed along with some existing UE level procedures by involving the SCS 212. But some UE level procedures such as, for example, Attach and TAU, do not involve the SCS 212. The SCS 212 may learn about a UE event (e.g., an area/location change) from user plane level procedures or from notifications from the CN (as described above in connection with FIG. 8) after an event has occurred. If the SCS 212 determines that a group should be modified in view of the event, then it triggers a group modification procedure as described above in connection with FIG. 5. The CN nodes are provisioned to accommodate the group modification.

In some instances, the group modification can be made efficient by involving/informing the SCS 212 during some UE level procedures. If the SCS 212 determines that a group modification should be implemented, the CN nodes can be configured as part of the UE level procedure without invoking a separate procedure. Accordingly, group modification is accomplished on the fly instead of invoking a dedicated group modification procedure. For example, if group messaging method is used where the eNB allocates a common Group-CRNTI to the UEs of a group, and if the SCS 212 is involved during UEs attach, when the SCS 212 determines that the UE 214 should be added to a group, the HSS 116 can configure/notify the MME and the MME can configure the eNB so that the eNB adds the UE 214 to the Group-CRNTI and informs the group-CRNTI of the UE 214 as part of the attach procedure (probably in the RRC message that carries the Attach Accept). In an example scenario, the eNB may receive a request to configure itself as described above in connection with FIG. 4 where the request specifies to add UE 214 to the Group-CRNTI. If the SCS 212 is not involved during the Attach procedure, a new procedure would have to be invoked involving the SCS, MTC-IWF, HSS, MME and eNB to pass the Group-CRNTI to the UE 214 so that the UE 214 would also monitor for DL messages on the Group-CRNTI.

A benefit of embedding group information with other procedures is that the group information and the CN node configuration is done on the fly as part of an existing procedure instead invoking a separate dedicated procedure mentioned above in connection with FIG. 7. On the fly group membership control may be performed in connection with numerous different procedures including, for example, UE Attach and TAU procedures.

On the Fly Group Membership Control with Attach Procedure

If the CN determines that an SCS 212 should be informed about a UE Attach procedure, then the SCS 212 may provide the grouping information for the UE 214 in its response to the attach notification. The serving nodes (i.e., MME/SGSN) can configure themselves for the group services for which the UE 214 is associated and also use the same attach procedure to configure other nodes that are involved in the attach procedure, such as the eNB/RNC.

On the Fly Group Membership Control with Attach Procedure—HSS Based

Figure 9:
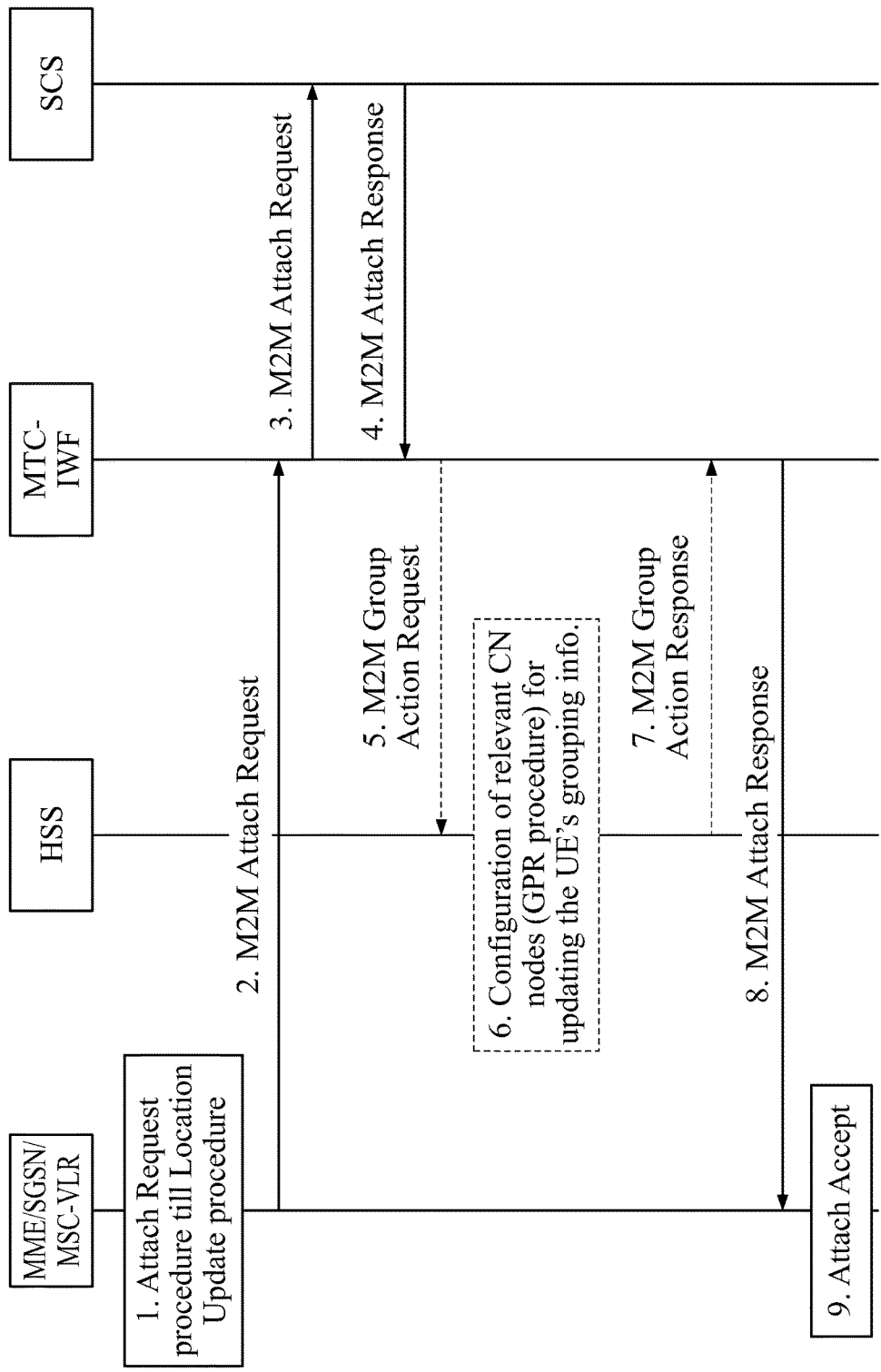
FIG. 9 is a flow diagram of an HSS based process for on the fly group modification during an Attach procedure.

FIG. 9 illustrates HSS based processing of group membership during an attach procedure. As shown, at step 1, a UE 214 initiates an attach procedure with the CN. The serving node (e.g., MME, SGSN, or MSC) determines that the UE 214 is an MTC device and that the procedure should be communicated to an SCS 212. The serving node may make this determination based on the subscription information from the HSS 116, an indication from the UE, or an event monitoring request from the SCS 212. The serving nodes may identify the UE's External ID and the Grouping Information from the HSS/HLR as part of the ULA (Update Location Answer) or the ISD (Insert Subscriber Data) messages that are sent during the attach procedure. The ULA and ISD messages on the Sha and Gr interfaces are enhanced to include this information.

Referring to FIG. 9, at step 2, the serving nodes generate and transmit an M2M Attach Request to the MTC-IWF 210. The serving nodes determine if the MTC-IWF 210 should be notified based on subscription information received from the HSS 116 or based on local provisioning. In an example embodiment, the request comprises an External ID, the SCS IDs of the SCSs 212 that are to be informed, and the Group Information of the UE, or just the IMSI. If IMSI is present, then the MTC-IWF 210 may query the HSS 116 and retrieve the External ID, SCS ID(s), and the Group Information of the UE.

At step 3, the MTC-IWF 210 generates and transmits an M2M Attach Request notification to the SCS 212. In an example embodiment, the request comprises the external ID and the current grouping information of the UE. In an example scenario, the SCS 212 may determine, based on its application layer functions, that the UE's grouping information needs to be updated. For example, the SCS 212 may determine to add the UE 214 to a group or remove it from a group.

At step 4, the SCS 212 generates and transmits an M2M Attach Response message comprising the updated grouping information for the UE 214 to the MTC-IWF 210. The message may comprise, for example, the External Group ID(s) to which the UE 214 should be added and/or the External Group IDs from which the UE 214 should be removed.

At step 5, the MTC-IWF 210 relays the grouping information to the HSS 116 if the SCS 212 has provided updated grouping information. This step is optional if the SCS 212 has not indicated any changes to the UE's grouping information.

At step 6, if the UE 214 is to be added or removed from a group, then the HSS configures other CN nodes substantially as described above in connection with FIG. 7.

At step 7, the HSS 116 sends a response to the MTC-IWF 210 indicating that the group modification for the UE 214 is complete. If the serving node has to be configured, then the HSS 116 may include a transparent information element (IE) containing the group service and configuration information for the serving node that is to be forwarded to the serving node by the MTC-IWF 210.

At step 8, the MTC-IWF 210 generates and transmits an M2M Attach Response message comprising the grouping information and the transparent IE from the HSS 116. In an example scenario, if the UE 214 is added to a group that uses T5 based group messaging, then the transparent IE may contain the local group identifier to be used for identifying the group at T5 interface, the characteristics of the group bearer that needs to be established at the eNB, etc.

At step 9, the serving node configures itself and the other related nodes for the updated grouping information. For example, if the UE 214 is added to a group which uses T5 based group messaging, the MME may allocate a Group M-TMSI or add the UE 214 to be a part of the Group M-TMSI and notify the eNB about the grouping information. The eNB may allocate a Group-CRNTI to enable group messages to be sent with the G-CRNTI.

On the Fly Group Membership Control with Attach Procedure—MTC-IWF Based

Figure 10:
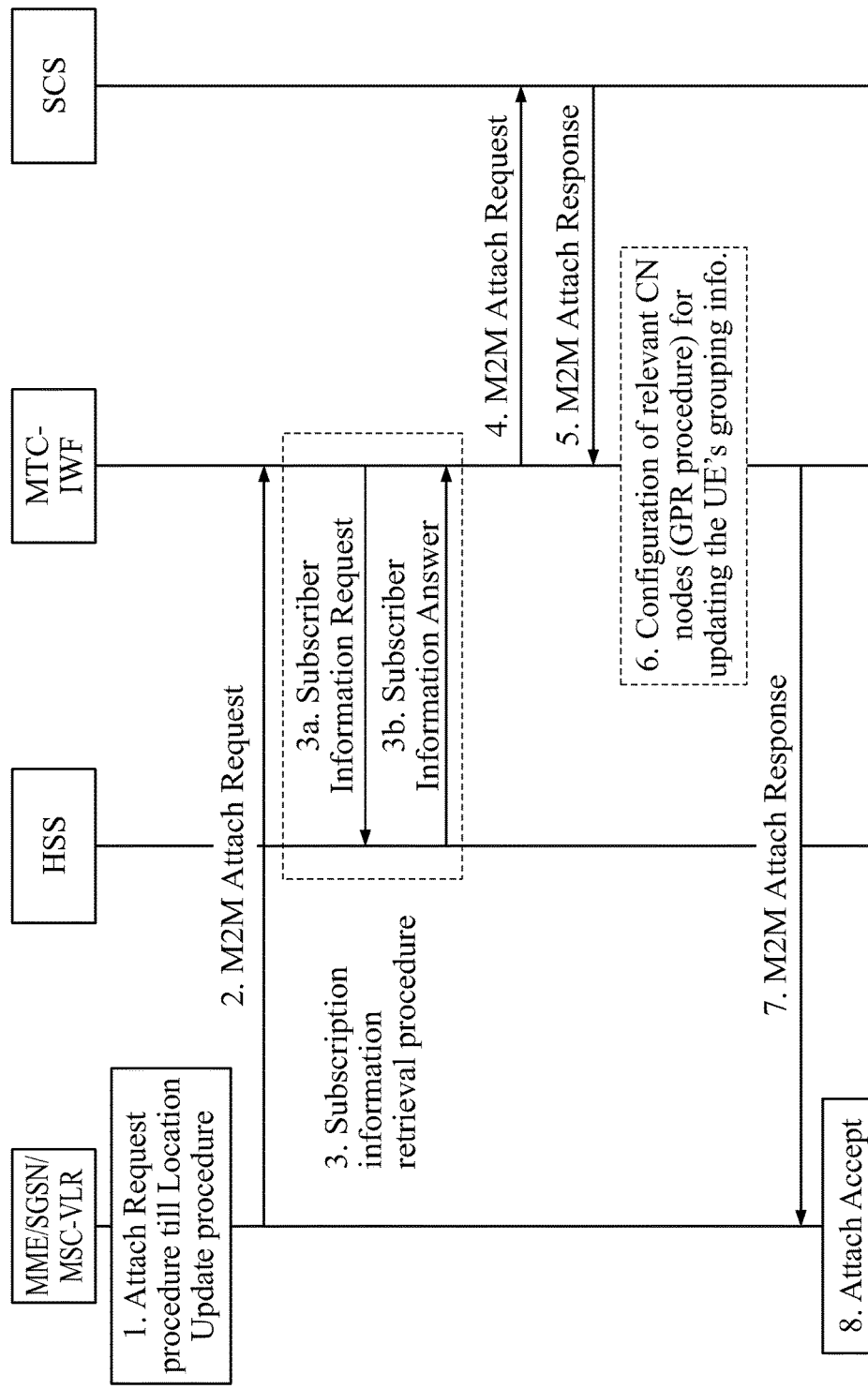
FIG. 10 is a flow diagram of an MTC-IWF based process for on the fly group modification during an Attach procedure.

FIG. 10 illustrates MTC-IWF 210 based processing of group membership during an attach procedure. As shown, at step 1, a UE 214 initiates an attach procedure with the CN. The serving node (MME or SGSN or MSC) determines that the UE 214 is an MTC Device and that the procedure should be communicated to an SCS 212. The serving node may determine this based on the subscription information from the HSS 116 or an indication from the UE 214 or an event monitoring request from the SCS 212.

The serving nodes can learn the UE's External ID and the subscription information of the UE 214 and the SCS(s) to be informed from the HSS/HLR as part of the ULA (Update Location Answer) or the ISD (Insert Subscriber Data) messages that are sent during the attach procedure. The ULA and ISD messages on the Sha and Gr interfaces may be enhanced to include this information.

At step 2, the serving nodes generate and transmit an M2M Attach Request to the MTC-IWF providing the External ID of the UE, the SCS IDs of the SCS(s) that are to be informed about the device attach, and the subscription information of the UE 214 and the SCS(s) that are to be informed. Alternatively, just the IMSI of the device may be provided.

At step 3a, the MTC-IWF 210 generates and transmits a Subscription Information Retrieval message if the received M2M Attach Request message contains just the IMSI of the device. The MTC-IWF 210 queries the HSS 116 and retrieves the External ID of the UE, SCS ID(s) that are to be informed, and the subscription information of the UE 214 and the SCS(s). At step 3b, the HSS 116 returns the requested information.

At step 4, the MTC-IWF 210 generates and transmits an M2M Attach Request notification to the SCS 212 and provides the External ID and the current grouping information of the UE.

In response, in an example scenario, the SCS 212 may determine, based on its application layer functions that the UE's grouping information needs to be updated. The SCS 212 may want to add the UE 214 to a group or remove it from a group.

At step 5, the SCS 212 generates and transmits an M2M Attach Response message that comprises the updated grouping information for the UE. It may list the External Group ID(s) to which the UE 214 should be added and/or the External Group ID(s) from which the UE 214 has to be removed.

At step 6, the MTC-IWF 210 may use the subscription information retrieved at step 3 and authorize the SCS 212 and the UE 214 for the use of the requested group services. If authorized, the MTC-IWF 210 may configure other relevant CN nodes as described above in connection with FIG. 7.

At step 7, the MTC-IWF 210 generates and transmits an M2M Attach Response message to the serving node containing the updated grouping information and any necessary group provisioning information for the serving nodes. For example, if the UE 214 is added to a group that uses T5 based group messaging, then the message may contain the local group identifier to be used for identifying the group at T5 interface, the characteristics of the group bearer that needs to be established at the eNB, etc.

At step 8, the serving node configures itself and the other related nodes for the updated grouping information. For example, if the UE 214 is added to a group which uses T5 based group messaging, the MME may allocate a Group M-TMSI or add the UE 214 to be a part of the Group M-TMSI and notify the eNB about the grouping information. The eNB may allocate a Group-CRNTI to enable group messages to be sent with the G-CRNTI.

On the Fly Group Membership Control with TAU Procedure

During a TAU procedure (that is either executed separately or as part of handover procedure), if the CN determines that an SCS 212 should be informed (based on subscription or event monitoring request from the SCS), then the SCS 212 may provide the grouping information of the UE 214 in its response. Serving nodes such as, for example, MME/SGSN, may also configure themselves for the group services with which the UE 214 is associated and use the same TAU procedure to configure other nodes that are involved, such as the eNB/RNC.

On the Fly Group Membership Control with TAU Procedure—HSS Based

Figure 11A:
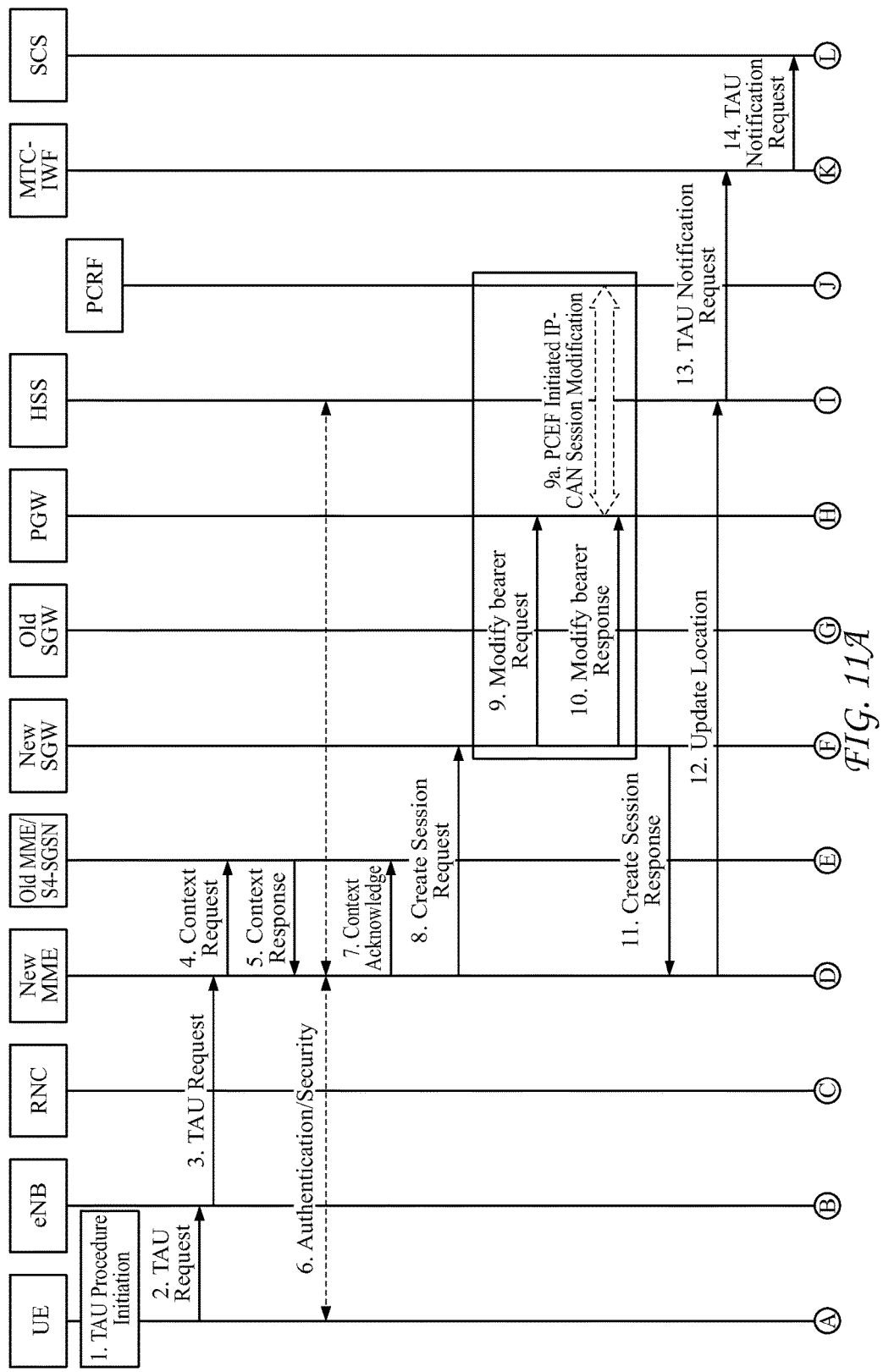
FIGS. 11A-B depict a flow diagram of an HSS based process for on the fly group modification during a TAU procedure.
Figure 11B:
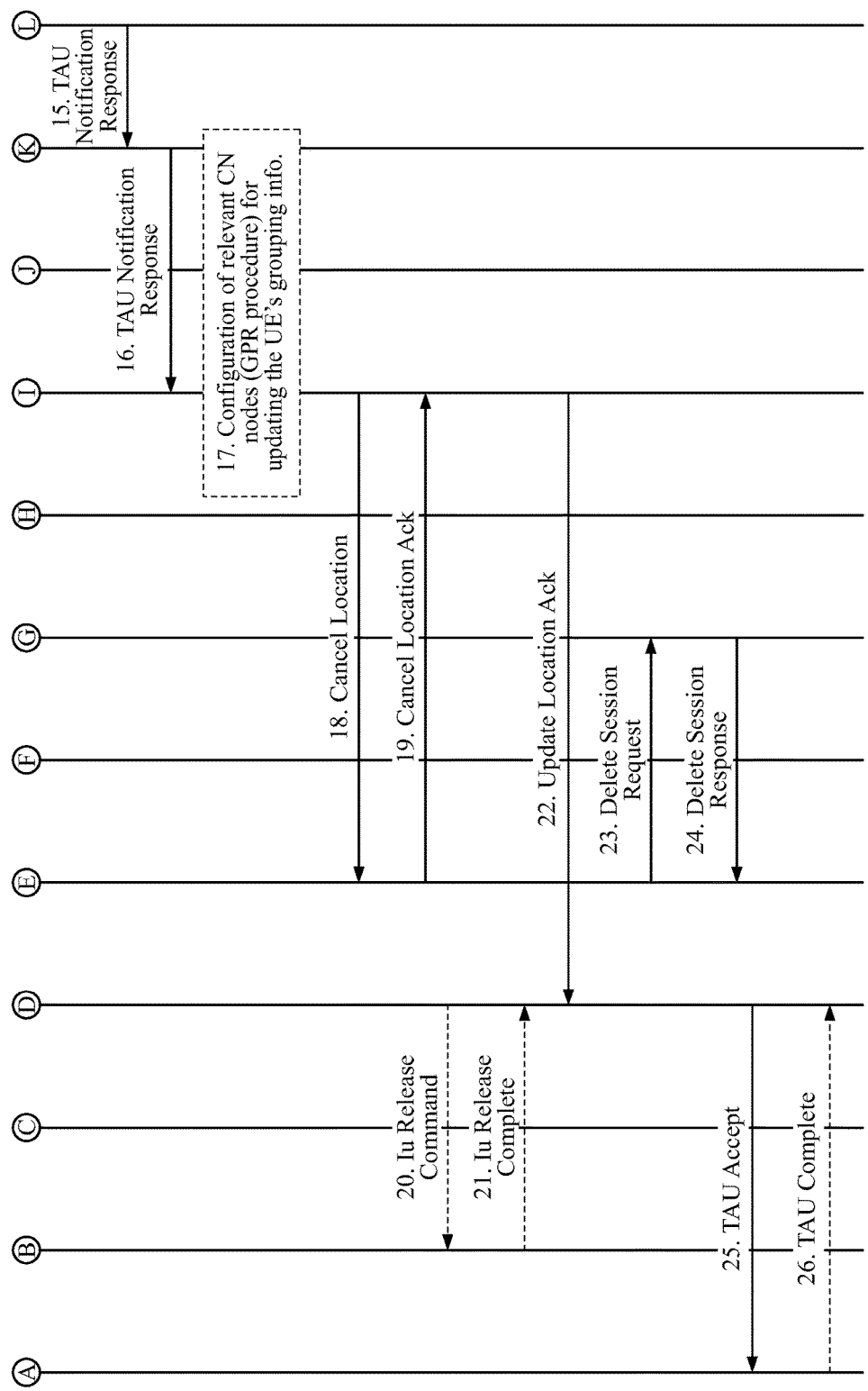

FIGS. 11A-B illustrate HSS 116 based processing of group membership during a TAU procedure. Steps 1-12, which depicted on FIG. 11A, correspond to procedures for TAU initiation such as is described in section 5.3.3.1 of 3GPP TS version 23.401, the contents of which are hereby incorporated herein by reference in its entirety.

At step 13 depicted on FIG. 11A, the HSS 116 generates and transmits a TAU Notification Request message to the MTC-IWF 210 in order to provide an indication to the SCS 212 about the tracking area update of the UE. The indication may be sent only if the tracking area of the device has changed and may not be sent during a periodic TAU procedure. This message may comprise the old TAI, a new TAI, the External ID of the UE, the current grouping information of the UE, and the SCS 212 ID(s) that are to be informed.

At step 14, the MTC-IWF 210 forwards the TAU Notification Request message to the appropriate SCS. The message comprises the old TAI, a new TAI, the External ID of the UE, and the current grouping information of the UE. The MTC-IWF 210 may also translate the TAI to a geographical area representation that can be understood by the SCS 212. In response to receiving the message, the SCS 212 may determine, based on its application layer functions, if the UE's grouping information needs to be updated. Depending upon the circumstances, the SCS 212 may want to add the UE 214 to a group or remove it from a group. For example, the UE's group ID may need to be changed due to the change in location.

At step 15, which appears on FIG. 11B, the SCS 212 generates and transmits a TAU Notification Response message to the MTC-IWF 210 and provides the updated grouping information for the UE. It may list the External Group ID(s) to which the UE 214 should be added and/or the External Group ID(s) from which the UE 214 has to be removed.

At step 16 of FIG. 11B, the MTC-IWF 210 forwards the TAU Notification Response message to the HSS 116.

At step 17, the HSS 116 configures other CN nodes as necessary using the procedure described above in connection with FIG. 7.

At step 18, the HSS 116 generates and transmits a Cancel Location message to the old MME/S4-SGSN. The message comprises the updated grouping information of the UE. In an embodiment, the Cancel Location message may be enhanced to carry the grouping information of the UE. The old MME/S4-SGSN configures itself based on the received grouping information.

Steps 19-21 correspond to steps 14-16 of section 5.3.3.1 in 3GPP TS 23.401.

At step 22 of FIG. 11B, the HSS 116 generates and transmits an Update Location Ack message to the new MME/S4-SGSN. In an example embodiment, the message comprises the updated grouping information and any necessary group provisioning information for the new MME/S4-SGSN. For example, if the UE 214 is added to a group that uses T5 based group messaging, then the message may comprise the local group identifier to be used for identifying the group at T5 interface, the characteristics of the group bearer that needs to be established at the eNB, etc.

Step 23-26 comprise processing substantially as described in steps 14-16 of section 5.3.3.1 in 3GPP TS 23.401. However, according to one aspect of an embodiment, some steps such as, for example, TAU Accept may be enhanced to configure the relevant nodes for the updated grouping information such as the use of a Group-CRNTI in the eNB.

On the Fly Group Membership Control with TAU Procedure—MTC-IWF Based

Figure 12A:
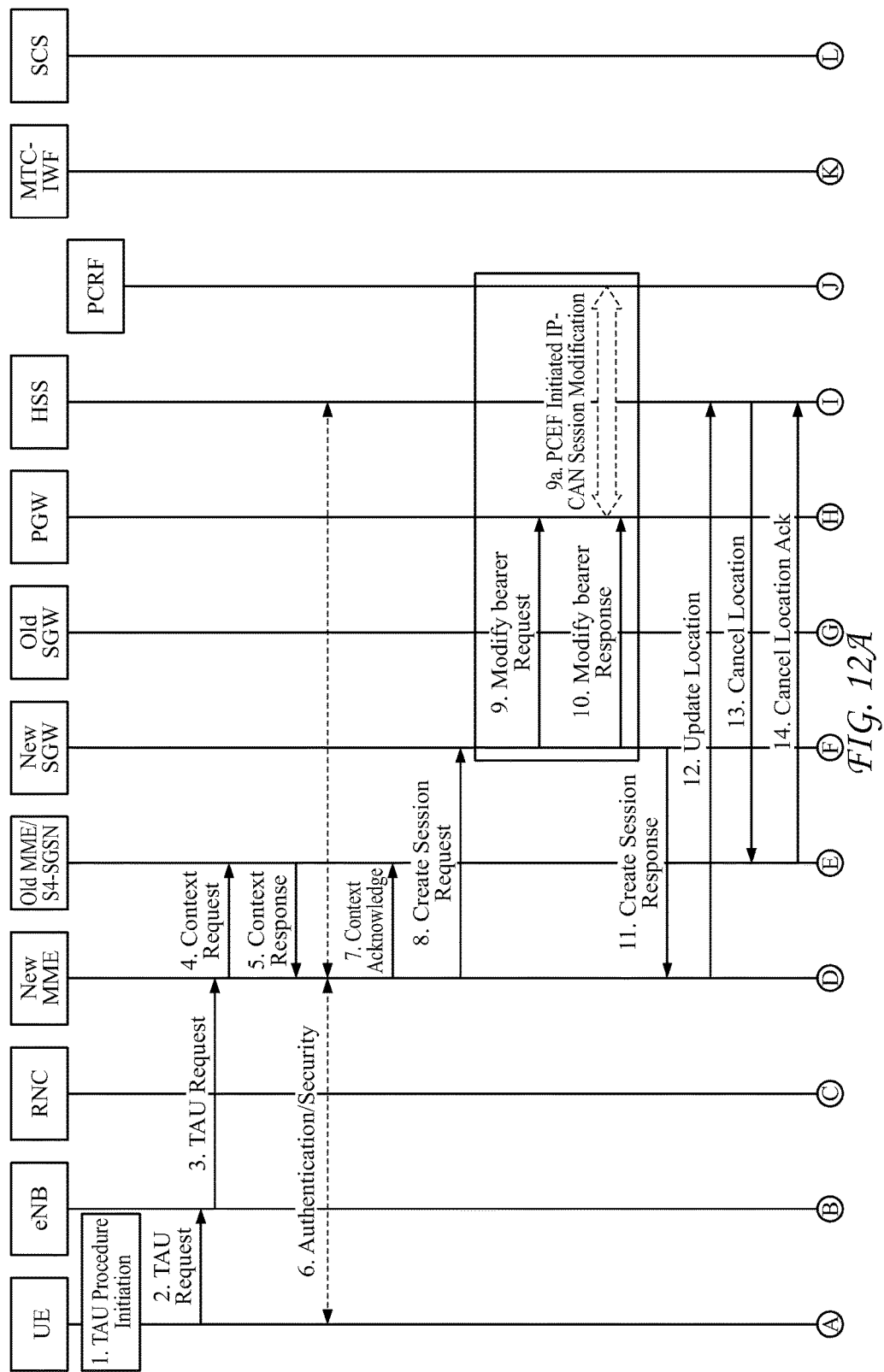
FIGS. 12A-B depict a flow diagram of an MTC-IWF based process for on the fly group modification during a TAU procedure.
Figure 12B:
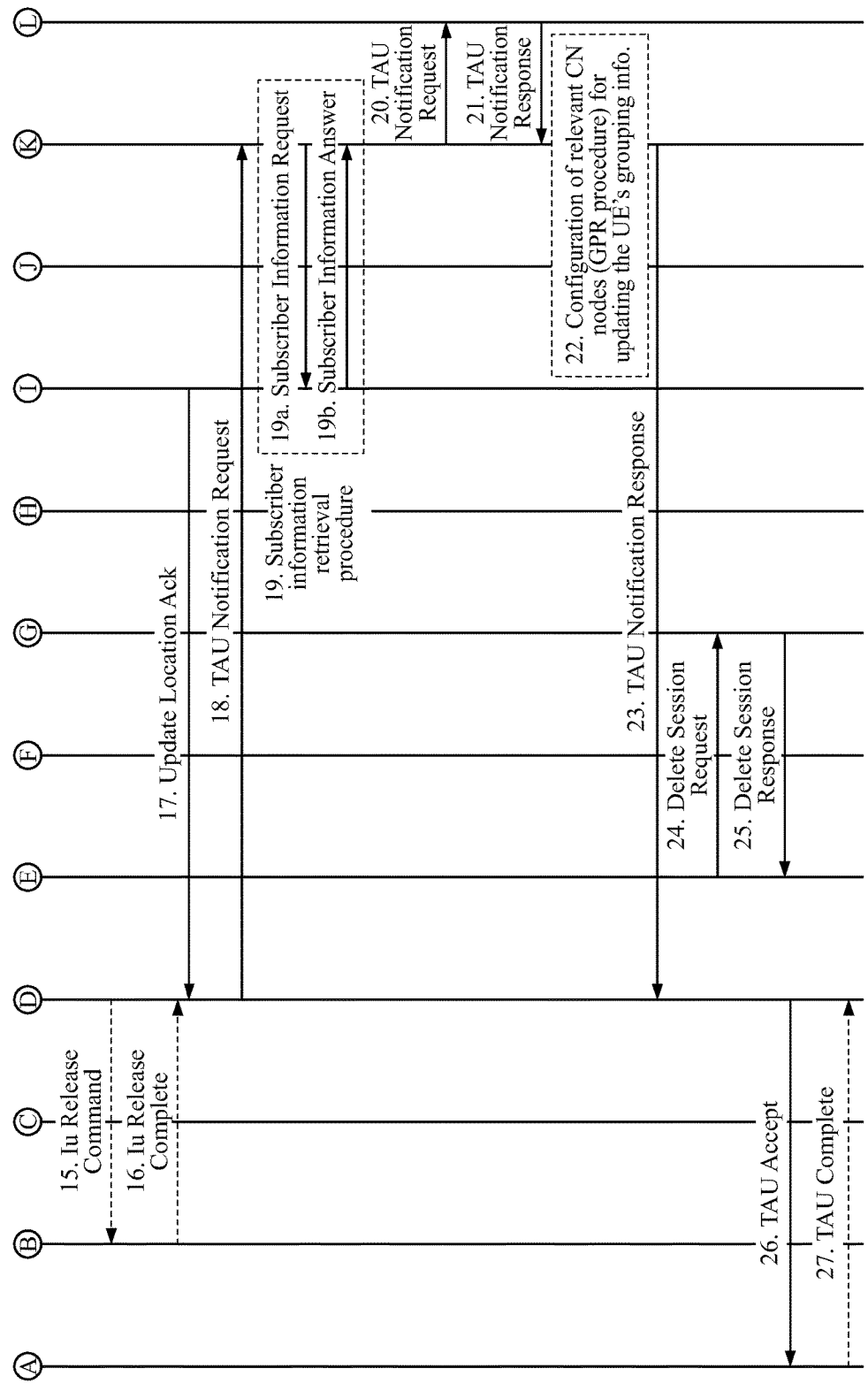

FIGS. 12A-B illustrate MTC-IWF 210 based processing of group membership during a TAU procedure. Steps 1-16 correspond to procedures for TAU initiation such as is described in section 5.3.3.1 of 3GPP TS version 23.401, the contents of which are hereby incorporated herein by reference in its entirety.

At step 17, which is depicted on FIG. 12B, the ULA message may be enhanced to comprise the UE's External ID and the subscription information of the UE 214 and the SCS(s) that are to be informed about the TAU event.

At step 18, of FIG. 12B the new MME generates and transmits a TAU Notification Request message to the MTC-IWF 210 to provide an indication to the SCS 212 about the tracking area update of the UE. In an example embodiment, the message may be sent only if the tracking area of the device has changed and may not be sent during a periodic TAU procedure. In an example embodiment, the TAU Notification Request message comprises the old TAI, a new TAI, the External ID of the UE, the SCS ID(s) that are to be informed, and the subscriber information of the UE 214 and the SCS(s). If the new MME didn't retrieve the subscription information in step 17, it can provide the IMSI of the UE.

At step 19, the MTC-IWF 210 may perform a Subscription Information Retrieval procedure if the new MME provided did not provide the subscriber information in the TAU Notification Request. The MTC-IWF 210 queries the HSS 116 and retrieves the External ID of the UE, SCS ID(s) that are to be informed and the subscription information of the UE 214 and the SCS(s).

At step 20, the MTC-IWF 210 sends the TAU Notification Request to the SCS 212. In an example embodiment, the message comprises the old TAI, a new TAI, the External ID of the UE, and the current grouping information of the UE. The MTC-IWF 210 may also translate the TAI to a geographical area representation that can be understood by the SCS 212. According to one aspect of a potential embodiment, the SCS 212 may determine, based on its application layer functions, if the UE's grouping information needs to be updated. The SCS 212 may add the UE 214 to a group or remove it from a group. For example, the UE's group ID may be changed due to its change in location.

At step 21, the SCS 212 generates and transmits a TAU Notification Response message to the MTC-IWF 210. The message comprises the updated grouping information for the UE. In an example embodiment, the message may list the External Group ID(s) to which the UE 214 should be added and/or the External Group Ids from which the UE 214 has to be removed.

At step 22, the MTC-IWF 210 may use the subscription information retrieved in step 19 and authorize the SCS 212 and the UE 214 for the use of the requested group services. If authorized, the MTC-IWF 210 may configure other relevant CN nodes as described above in connection with FIG. 7.

At step 23 of FIG. 12B, the MTC-IWF 210 generates and transmits a TAU Notification Response message to the new MME/S4-SGSN. In an example embodiment, the message comprises the updated grouping information and any necessary group provisioning information for the serving nodes. In an example scenario, if the UE 214 is added to a group that uses T5 based group messaging, then the message may contain the local group identifier to be used for identifying the group at T5 interface, the characteristics of the group bearer that needs to be established at the eNB, etc.

Steps 24-26 comprise processing substantially as described in steps 14-16 of section 5.3.3.1 in 3GPP TS 23.401. However, according to one aspect of a potential embodiment, some steps such as, for example, TAU Accept may be enhanced to configure the relevant nodes for the updated grouping information such as, for example, the use of a Group-CRNTI in the eNB.

Group Based Services Execution

Once a group is formed either dynamically or through pre-determined means, the SCS 212 can then make use of the group based services by providing the group ID(s), characteristics of the requested service, and information related to the availed service to the network layer. If requested to execute a service, the MTC-IWF 210 carries out the requested service using the method that was chosen during the group allocation. In some circumstances, the MTC-IWF 210 may determine to use a different method if the network condition has changed or if the characteristics of the requested service cannot be met with the method that was chosen during group creation. In some scenarios, the group services may also be directly executed by the SCS 212 without contacting the MTC-IWF 210. For example, the direct execution of a group service is possible for certain types of group based services (e.g., group messaging) provided the SCS 212 has direct links with the necessary nodes (e.g., CBC, BMSC etc.).

Figure 13:
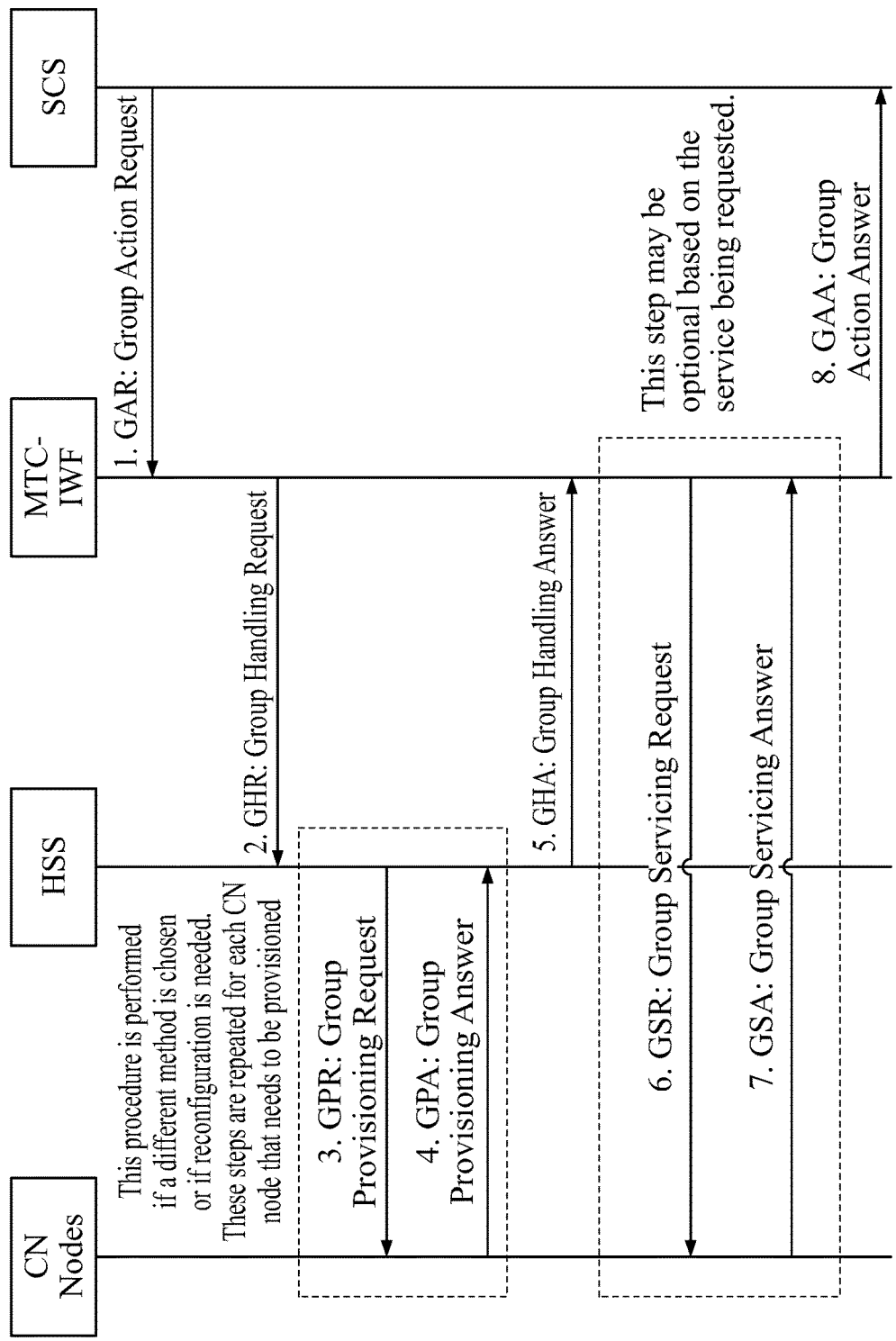
FIG. 13 is a flow diagram of an HSS based process for group service execution.
Figure 14:
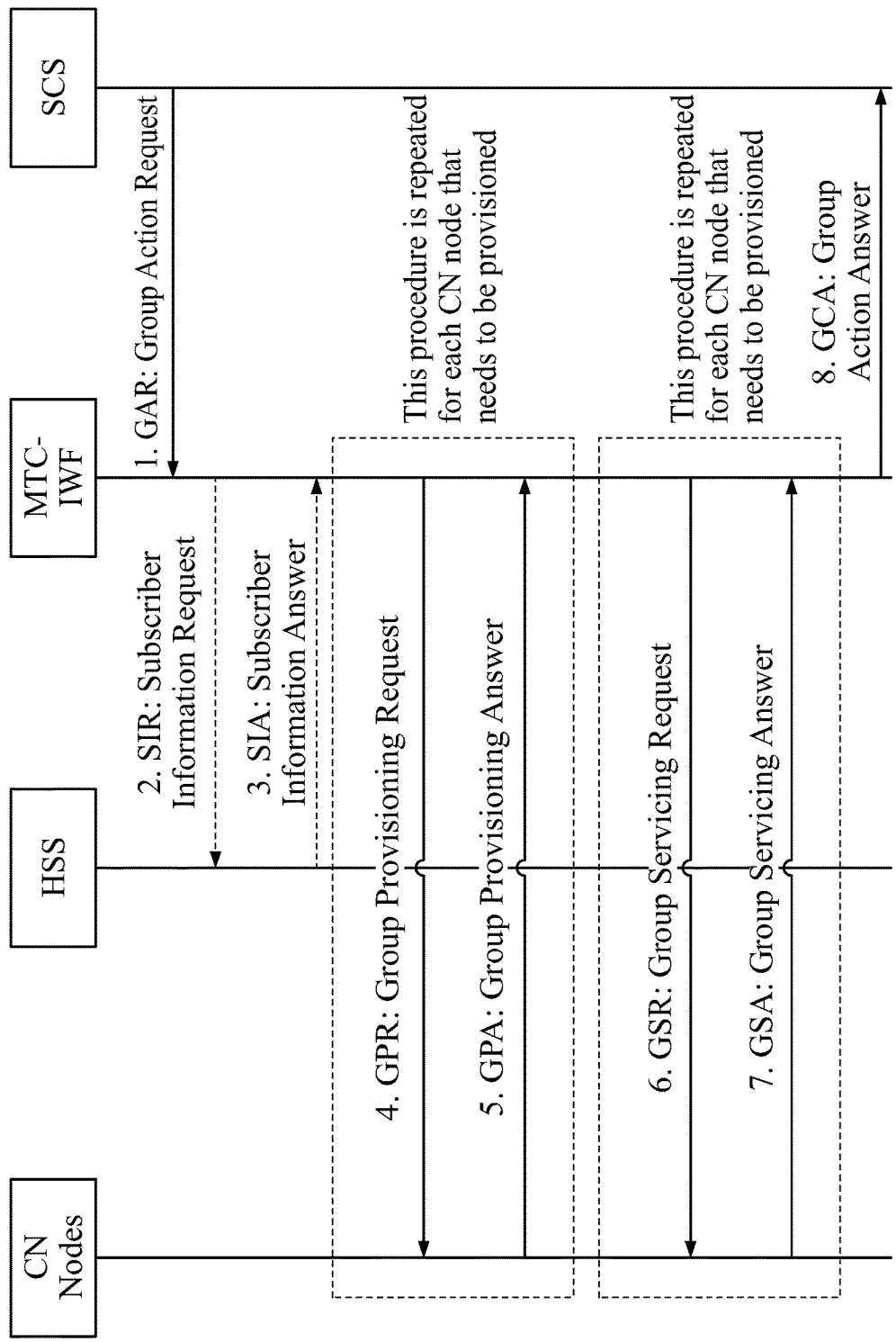
FIG. 14 is a flow diagram of an MTC-IWF based process for group service execution.

Depending upon the provisioning of the core network, the degree to which the HSS 116 and the MTC-IWF 210 are involved in executing a service may vary. FIG. 13 depicts processing wherein the processing is primarily HSS based. FIG. 14 depicts processing wherein processing is primarily MTC-IWF 210 based.

HSS Based Group Services Execution

FIG. 13 depicts flow for an example process of executing group based services where the HSS 116 is primarily responsible for the grouping. At step 1, the SCS 212 generates and transmits a GAR (Group Action Request) message to the MTC-IWF 210 in order to access the particular services for a group of devices. In an example scenario, the request comprises information specifying the following: external group ID(s); the requested service; characteristics of the requested service; and data related to the service.

At step 2, the MTC-IWF 210 generates and transmits a GHR (Group Handling Request) message to the HSS 116 in order to transmit information about the delivery/handling of this service request. In an example scenario, the message comprises the information received in the preceding GAR message. Depending on the service being requested, the MTC-IWF 210 may not pass the data portion to the HSS 116. For example if group messaging is requested, then the MTC-IWF 210 need not pass the actual message contents to the HSS 116. Rather, it may just pass the details/characteristics of the service.

Upon reception of the GHR message, the HSS 116 may select one of the methods that was previously configured for the group during the group creation stage, or the HSS 116 may re-evaluate (based on policies) the method for executing the service. The HSS 116 uses the characteristics of the requested service and the current network condition to make this decision. If any of the methods that was chosen during the group creation stage is not sufficient to carry out the service, or if the network condition is not capable to support the method, then the HSS 116 may choose a different method to execute the service. The HSS 116 may also choose a different method if none of the configured methods for the group is suited for the execution of the service.

In an example embodiment, during group creation, the group may have been configured for a T4 (SMS based) method or a T5 (control plane based) method for a group message delivery. If the current group messaging characteristics is such that a large amount of data at a high data rate needs to be delivered, then the HSS 116 may determine to choose a different method such as one, for example, that employs the user plane for the delivery.

In an example embodiment, the HSS 116 may also determine to reject the GAR if the requested characteristics cannot be serviced or if the MNO policy does not allow a method re-selection.

In the scenario wherein one of the already configured methods is chosen, the HSS 116 may also determine whether the CN nodes for that method need to be re-configured to handle the characteristics provided in the GAR message. For example, if a user plane method was configured during group creation time to carry out group messaging service, and if the current characteristics require a higher data rate to be supported, then the HSS 116 may re-configure the PGW with the new QoS value to be used for the user plane tunnel(s).

At step 3, the HSS 116 generates and transmits a GPR (Group Provisioning Request) message to all the CN nodes that have to be configured (for the new method) or reconfigured in order to handle the new characteristics of the service.

At step 4, the CN nodes send a GPA (Group Provisioning Answer) message to the HSS 116.

At step 5, the HSS 116 generates and transmits a GHA (Group Handling Answer) message to the MTC-IWF 210 that contains details about the serving nodes to be contacted by the MTC-IWF 210 for the execution of the service. In some scenarios, particular services that are related to provisioning (e.g., policy or charging related services) may have already been addressed by the HSS 116 (as part of the GPR/GPA procedure), in which case, the HSS 116 may not include any serving node information. The HSS 116 may indicate that the service has been executed and the MTC-IWF 210 can skip the next two steps and send the GAA to the SCS 212.

At step 6, the MTC-IWF 210 generates and transmits a GSR (Group Servicing Request) message to the serving nodes provided by the HSS 116. In an example embodiment, the MTC-IWF 210 includes in the message the service data to be delivered or handled by the serving nodes. The MTC-IWF 210 may also include parameters for executing the service and reporting back to the MTC-IWF 210, including, for example, the time period for executing the service, the number of attempts that may be made to deliver the service, the time period for sending the report back to MTC-IWF 210, format for the report, etc.

In response to the messages, the serving nodes carry out the service as specified in the GSR message and collect data related to the service execution for reporting to the MTC-IWF 210.

At step 7, the serving nodes generate and transmit a GSA (Group Servicing Answer) message to the MTC-IWF 210 that contains a report about the service execution. For example, the message may contain the number of UEs that received a group message or the geographic areas or tracking areas in which a message was broadcasted and the success/failure of the provisioning.

Upon receipt of the messages from the serving nodes, the MTC-IWF 210 collates the reports from all the GSA messages and prepares a summary report to be sent to the SCS 212.

At step 8, the MTC-IWF 210 generates and transmits a GAA (Group Action Answer) containing the report about the execution of the service by the CN to the SCS 212.

MTC-IWF Based Group Services Execution

FIG. 14 depicts flow for an example process of executing group based services where the MTC-IWF 210 is primarily responsible for the group processing. At step 1, the SCS 212 sends a GAR (Group Action Request) message to the MTC-IWF 210 in order to access the particular services for a group of devices. In an example scenario, the request comprises information specifying: external group ID(s); the requested service; characteristics of the requested service; and data related to the service.

Upon receipt of the message, the MTC-IWF 210 chooses one of the already selected methods to execute the service or decides to use a different method. The criteria for the method selection are the same as described above in connection with step 2 of FIG. 13.

At step 2, the MTC-IWF 210 generates and transmits a SIR message to the HSS 116 to retrieve the serving nodes and subscription information of SCS 212 and UEs. This step is optional and, in an example embodiment, may be performed only if a new method was chosen for service execution.

At step 3, the HSS 116 generates and transmits an SIA message comprising the authorization information for the SCS 212 and the UEs in order to utilize the method that was chosen by the MTC-IWF 210. The message also contains the serving node information for the method that was chosen.

At step 4, the MTC-IWF 210 generates and transmits a GPR (Group Provisioning Request) message to all the CN nodes that have to be configured (for the new method) or reconfigured to handle the new characteristics of the service.

At step 5, the CN nodes generate and transmit a GPA (Group Provisioning Answer) message to the MTC-IWF 210. Certain services that are related to provisioning (e.g., policy or charging related services) may get completed at this point and for these types of services the MTC-IWF 210 may skip the next two steps and send the GAA to the SCS 212.

At step 6, the MTC-IWF 210 generates and transmits a GSR (Group Servicing Request) message to all the serving nodes that need to execute the service. The processing is similar to that described above in connection with step 6 of FIG. 13.

At step 7, the serving nodes generate and transmit a GSA (Group Servicing Answer) message to the MTC-IWF 210 that contains a report about the service execution. The processing is similar to that described above in connection with step 7 of FIG. 13.

At step 8, the MTC-IWF 210 generates and transmits a GAA (Group Action Answer) message containing the report about the execution of the service by the CN. The processing is similar to that described above in connection with step 8 of FIG. 13.

Correlation to OneM2M Group Management Procedures

Figure 15:
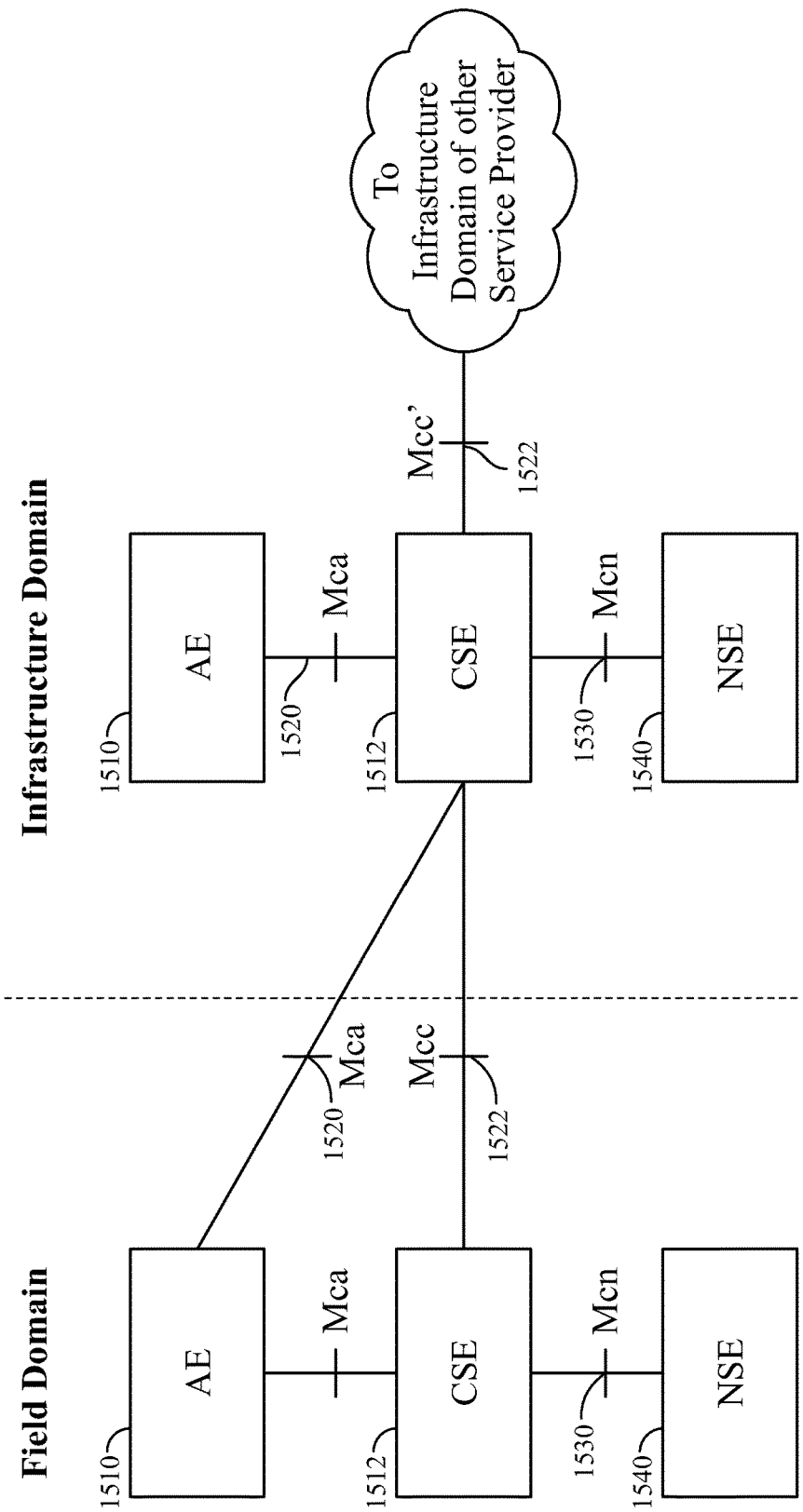
FIG. 15 is a diagram depicting a oneM2M functional architecture.

OneM2M refers to a functional architecture for machine to machine communications. FIG. 15, illustrates example basic oneM2M architecture. As shown, the oneM2M architecture comprises application entities (AEs) 1510 which provide application logic in oneM2M solutions. Common services entities (CSEs) 1512 comprise the set of service functions that are common in the M2M environments and specified by one M2M. Such service functions are exposed to other entities through reference points Mca 1520 and Mcc 1522. Reference point Mcn 1530 is used for accessing underlying network service entities. Network services entities (NSEs) 1540 provide services to the CSEs. Examples of M2M services include device management, location services, and device triggering. The underlying NSE may be, for example, a 3GPP based network as described above.

Figure 16:
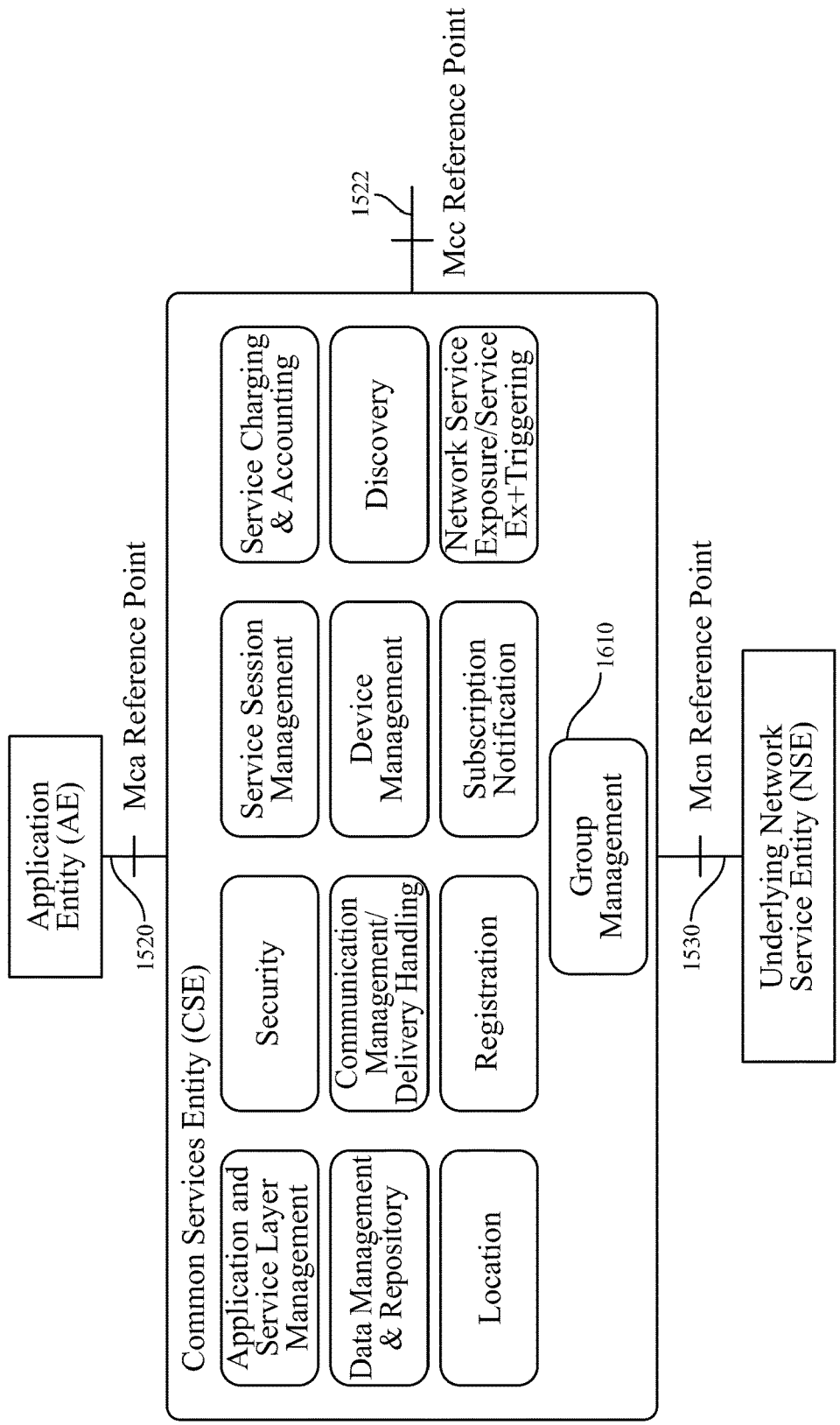
FIG. 16 is a diagram depicting common services functions in a oneM2M architecture.

Service functions provided by the common services layer that are common to the oneM2M environment are referred to as Common Service Functions (CSFs). FIG. 16 is a diagram depicting various CSFs that may be incorporated in CSEs in an example embodiment. The CSFs provide services to the applications via the Mca reference point 1520 and to other CSEs 1512 via the Mcc reference point 1522. Interaction with the underlying network service functions, i.e., 3GPP network functions, is via the Mcn reference point 1530.

Referring to FIG. 16, the group management (GMG) CSF 1610 is responsible for handling group related requests in oneM2M architecture. The GMG CSF 1610 is responsible for the management of a group and its membership. The GMG CSF 1610 supports bulk operations to multiple resources of interest and aggregates the results. The GMG CSF 1610 is able to facilitate access control based on grouping. When needed and available, the GMG CSF 1610 may leverage the existing capabilities of the underlying network, i.e., 3GPP network, including broadcasting/multicasting.

Grouping enables the oneM2M System to perform bulk operations to multiple devices, applications, or resources. The GMG CSF 1610 manages the resources and operations associated with grouping. For example, the GMG CSF 1610 handles requests to create, query, update, and delete a group. An application or a CSE may request the creation/retrieve/update/deletion of a group as well as the addition and deletion of members of the group. The GMG CSF 1610 is able to create one or more groups in CSEs in any of the nodes in a oneM2M system for a particular purpose (i.e. facilitation of access control, device management, fan-out common operations to a group of devices, etc.).

Referring again to FIG. 16, the Network Service Exposure, Service Execution and Triggering (NSSE) CSF 1620 manages communications with the underlying networks, e.g., 3GPP, for accessing network service functions over the Mcn reference point 1530. The NSSE CSF 1620 uses the available/supported methods for service "requests" on behalf of M2M Applications. The NSSE CSF 1620 shields other CSFs and AEs from the specific technologies and mechanisms supported by the underlying networks.

Different procedures have been defined in oneM2M for managing the groups at the service layer. These procedures are used for managing membership verification, creation, retrieval, update and deletion of the information associated with a <group> resource as well as the bulk management of all group member resources by invoking the corresponding verbs upon the virtual resource members of a <group> resource. The table below summarizes the group management procedures used in oneM2M.

| Procedure | Purpose |
| --- | --- |
| Create <group> | Used for creating a group resource. |
| Retrieve <group> | Used for retrieving <group> resource. |
| Update <group> | Used for updating an existing <group> resource. |
| Delete <group> | Used for deleting an existing <group> resource. |
| Create <Members> | Used for creating the content of all member resources belonging to an existing <group> resource. |
| Retrieve <Members> | Used for retrieving the content of all member resources belonging to an existing <group> resource. |
| Update <Members> | Used for updating the content of all member resources belonging to an existing <group> resource. |
| Delete <Members> | Used for deleting the content of all member resources belonging to an existing <group> resource. |

Accordingly, there are different procedures that are used in the M2M service layer to form service layer groups and perform different operations on the groups such as, for example, updating the group by adding/removing members to the group. The groups that are formed at the M2M service layer are based on the M2M service layer functions and these groups may be a group of devices, applications, CSEs etc. The operations performed on these groups correspond to the M2M service layer procedures. It is the responsibility of the M2M service layer to determine how it can utilize the network layer group management functions that are described above in connection with FIGS. 1-4 and correlate these procedures to the service layer group management procedures.

Figure 17:
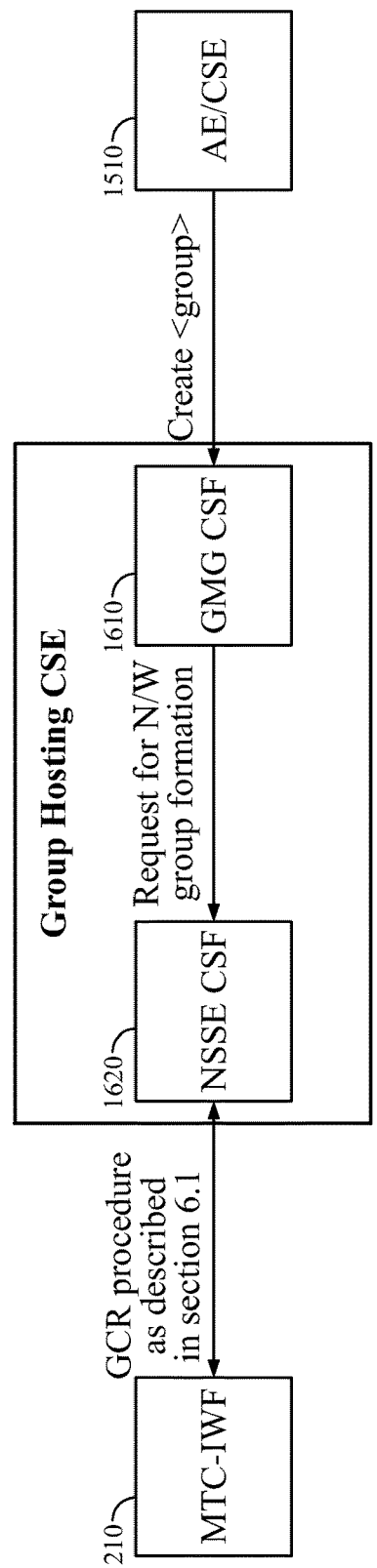
FIG. 17 is a diagram of a group creation process in a oneM2M architecture.

FIG. 17 depicts a process whereby group procedures in the oneM2M service layer may be implemented in the network layer service capabilities. As shown at the right side of FIG. 17, a oneM2M service layer request to create a group may be generated at an AE 1510 and received at the oneM2M Group Management (GMG) CSF 1610. The oneM2M Group Management (GMG) CSF 1610 is responsible for determining if a network layer group needs to be created and, if so, to determine the UEs that should be part of the group, the purpose for which the group is to be created (e.g., group messaging), and the characteristics of the group service (such as, for example, maximum message size). The GMG CSF 1610 then requests that the Network Service Exposure, Service Execution and Triggering (NSSE) CSF 1620 form a network layer group. The NSSE CSF 1620 invokes the underlying network's dynamic group creation procedure (as described above in connection with FIG. 3) over the Mcn reference point and communicates a request to form a group to an NSE. In the scenario that the underlying network is a 3GPP based network, then the Mcn reference point can be the Tsp interface 208 and the NSE may be the MTC-IWF 210. Alternately the Mh interface in the 3GPP network could also be used for this purpose.

Other service layer group procedures may also result in the execution of the network layer group management procedure. The following table summarizes the correlation between various service layer group management procedures and the network layer group management procedures.

| Service Layer Group Management Procedure | Service Layer Purpose | Corresponding Network Layer Group management Procedure |
| --- | --- | --- |
| Create <group> | Used for creating a group resource. | Group Creation Procedure |
| Retrieve <group> | Used for retrieving <group> resource. | — |
| Update <group> | Used for updating an existing <group> resource. | Group Creation Procedure, Group Modification Procedure |
| Delete <group> | Used for deleting an existing <group> resource. | Group Modification Procedure |
| Create <Members> | Used for creating the content of all member resources belonging to an existing <group> resource. | Group Creation Procedure, Group Modification Procedure, Group Service Execution Procedure(in case if the member resources contain a sub-group resource) |
| Retrieve <Members> | Used for retrieving the content of all member resources belonging to an existing <group> resource. | Group Service Execution Procedure |
| Update <Members> | Used for updating the content of all member resources belonging to an existing <group> resource. | Group Modification Procedure, Group Service Execution Procedure |
| Delete <Members> | Used for deleting the content of all member resources belonging to an existing <group> resource. | Group Modification Procedure |

The Network layer group management functions can also be invoked by the NSSE based requests from other CSFs or based on operator provisioning at the service layer.

Coordinated Grouping in PAN Networks

Applicants disclose systems and methods for generating and managing groups of devices for purposes of executing network level services. The concepts presented herein may be applied to different network types including personal area networks. The procedures that are defined herein are particularly well suited for personal area networks that use a PAN Coordinator. Examples of such networks are 802.15.4 based networks such as ZigBee and 6LoWPAN.

Figure 18:
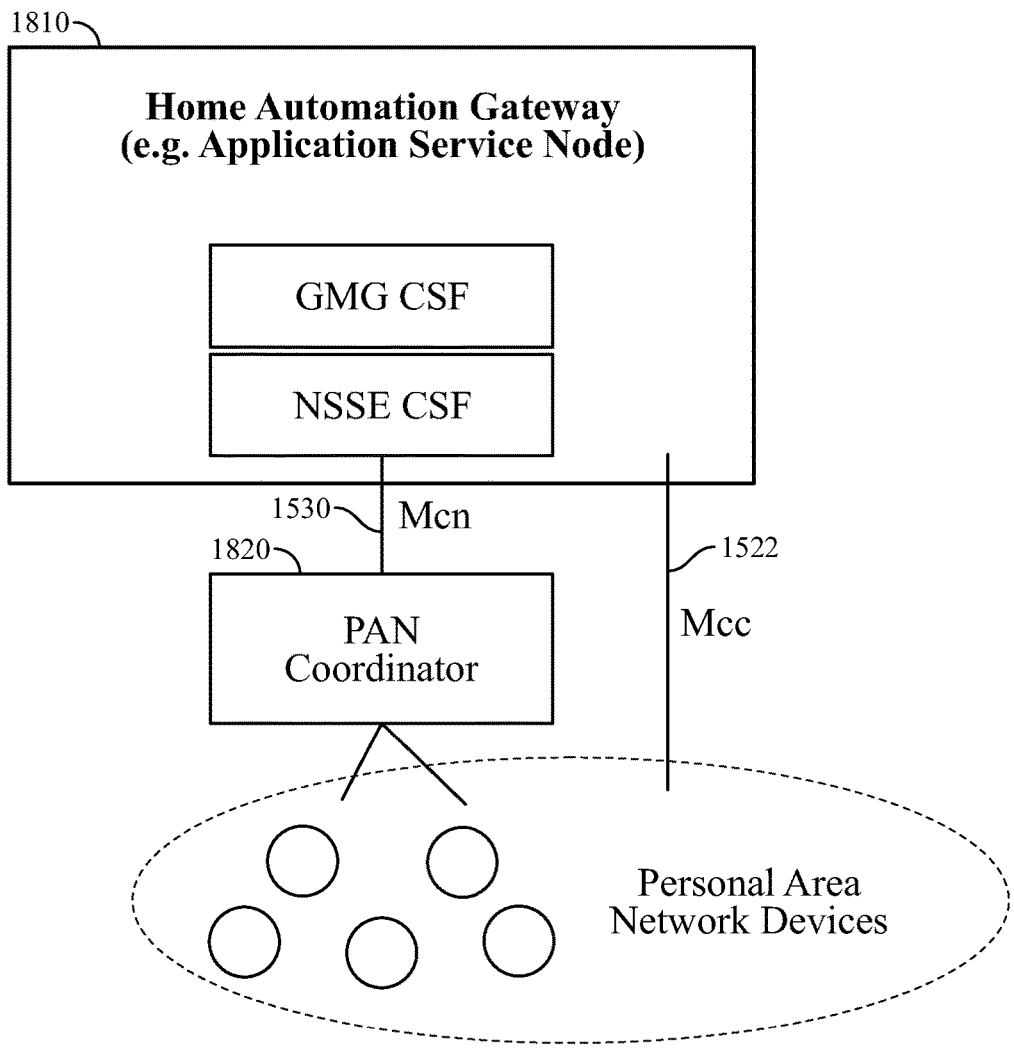
FIG. 18 is a diagram of a oneM2M node interfacing with a PAN coordinator.

FIG. 18 shows an example deployment where a oneM2M Application Service Node (ASN) 1810, operating as a home automation gateway, uses a Mcn interface 1530 to interface to a PAN Coordinator 1820. The PAN Coordinator 1820 may manage, for example, a network of home automation devices such as light switches, door locks, etc. If the home automation devices host oneM2M applications, then the ASN 1810 will also have a Mcc interface 1522 with the devices. Otherwise, the ASN 1810 will have some network specific interface with the oneM2M devices.

Figure 19:
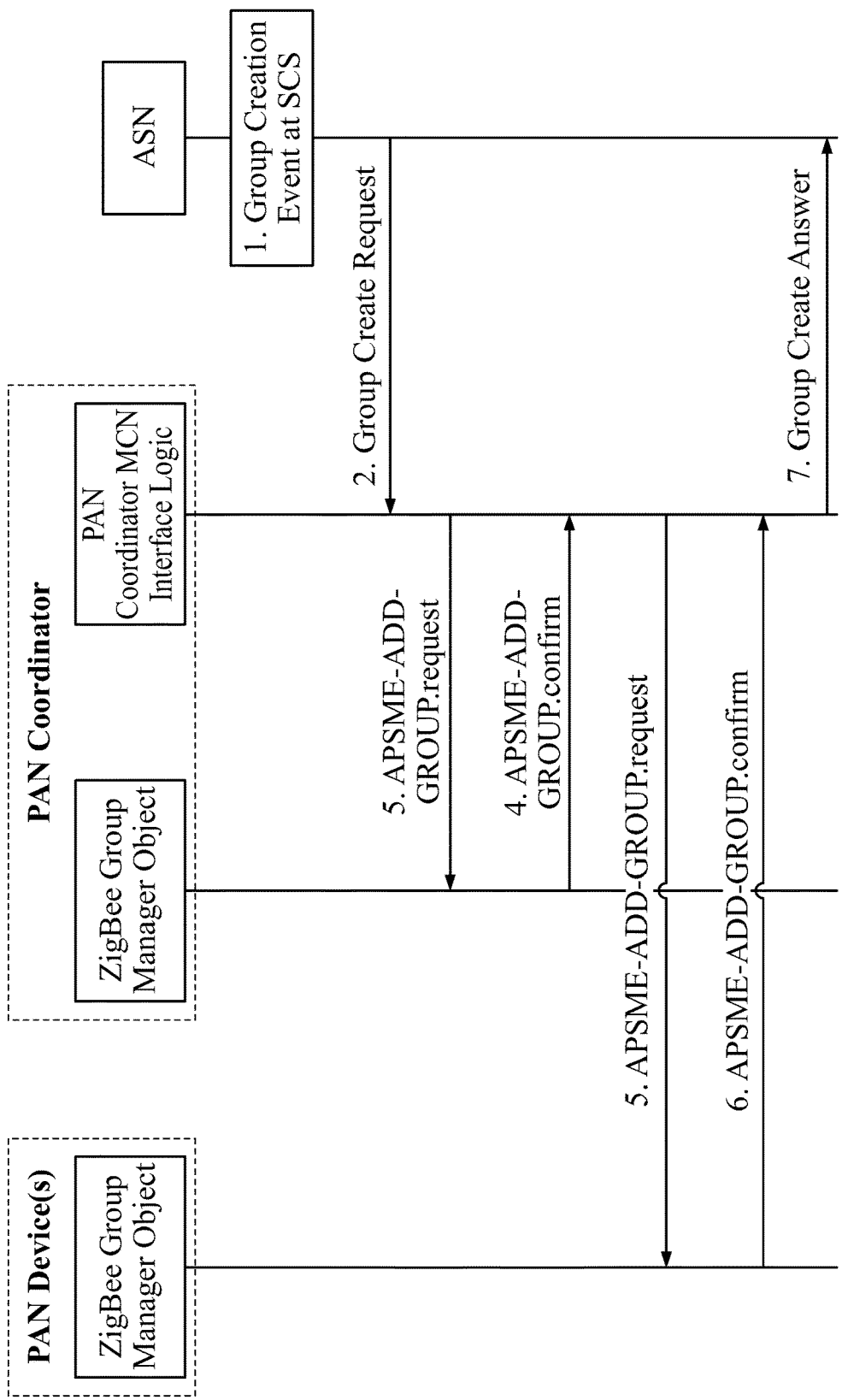
FIG. 19 is a diagram of a process for creating a device grouping in a PAN network.

The ASN 1810 uses the Mcn interface 1530 to request that the PAN Coordinator 1820 create a group of devices. For example the group may be used to multi-cast messages to a sub-set of the devices in the network or broadcast messages to all devices in the group. FIG. 19 shows an example call flow where an ASN 1810 uses its Mcn interface 1530 with a PAN Coordinator 1820 to create a group of devices (or add devices to a group). In the example of FIG. 19, the underlying network is a ZigBee based network. However, the same concept can be applied to other personal area networks such as 6LoWPAN.

FIG. 19 illustrates a scenario wherein a group is created by the ASN. It should be appreciated, that while FIG. 19 depicts a scenario wherein a group is created by the ASN 1810, a similar procedure can be applied when removing devices from the group. In a ZigBee implementation, the APSME-REMOVE-GROUP.request and APSME-REMOVE-GROUP.confirm primitives would be used to remove a group.

Referring to FIG. 19, at step 1, a group creation event is identified at an SCS 212. For example, an M2M application or a CSE may transmit a group CREATE request for the formation of a group resource. In response, a Group Management CSF 1610 determines that the network provided group services can be used for the group and initiates a group creation request to the NSSE CSF 1620. In an alternative scenario, the group creation may be initiated based on configurations/provisioning done by the M2M operator.

At step 2, the ASN 1810 generates and transmits a Group Create Request to the PAN Coordinator 1820. The fields of the message may be similar to those described herein in connection the Group Control Request message (GCR) with GC-Request-Type AVP set to the value "INITIAL_REQUEST."

At step 3, the PAN Coordinator 1820 uses the APSME-ADD-GROUP.request primitive to update its internal ZigBee Group Management Object with the details of the newly formed group.

At step 4, the ZigBee Group Management Object responds with the APSME-ADD-GROUP.confirm to indicate that the group has been formed.

At step 5, the PAN Coordinator 1820 uses the APSME-ADD-GROUP.request primitive to update the ZigBee Group Management Objects of each device that is part of the group.

At step 6, the ZigBee Group Management Objects respond with the APSME-ADD-GROUP.confirm to indicate that the group has been formed.

At step 7, the PAN Coordinator 1820 communicates the external group identifier and the service related parameters to the ASN 1810. In an example embodiment, the fields of the message are similar to what is provided in the Group Control Answer message (GCA).

Those skilled in the art will appreciate that while FIG. 19 illustrates a oneM2M ASN creating/modifying the group, the same procedures may be executed by a oneM2M middle node or a oneM2M infrastructure node. The underlying network may be an IP based network and the Mcn interface 1530 may be used to create multicast groups.

New Diameter Messages

According to one aspect of the disclosed systems and methods, several new messages are described as being accessible between the service layer and network layer at the Tsp interface 208 in order to support the described procedures for group based services.

The described messages and the information in these messages may be used on the Mh interface if the group management between HSS 116 and the SCS 212 is done over the Mh interface. In such a scenario, the group action messages GAR and GAA might not be applied on the Mh interface because the group action is done over the Tsp interface 208.

The following tables lists the commands and codes described herein in connection with the systems and methods for group creation and management.

| Command-Name | Abbreviation |
| --- | --- |
| Group-Control-Request | GCR |
| Group-Control-Answer | GCA |
| Group-Notification-Request | GNR |
| Group-Notification-Answer | GNA |
| Group-Related-Event-Notification-Request | GRN |
| Group-Related-Event-Notification-Answer | GRA |
| Group-Action-Request | GAR |
| Group-Action-Answer | GAA |

GCR—Group Control Request

The GCR command is sent by the SCS 212 to the MTC-IWF 210 as part of SCS initiated group creation procedure described above in connection with FIG. 3 or SCS initiated group modification procedure described above in connection with FIG. 5.

The table below lists the attribute value pairs (AVPs) in the GCR message that may be sent during different procedures.

| SCS Initiated Group Creation | SCS Initiated Group Modification |
| --- | --- |
| {GC-Request-Type} | {GC-Request-Type} |
| {GC-Request-Number} | {GC-Request-Number} |
| [Group-Members] | *[Group-Service-Details] |
| *[Group-Service-Details] | [Group-Existence-Time] |
| [Suggested-Group-Identifier] | *[Group-Modifications-Control] |
| [Group-Existence-Time] | [Sub-Grouping-Indication] |
| *[Group-Modifications-Control] | {External-Group-Identifier} |
| [Sub-Grouping-Indication] | *[Group-Member-Addition] |
| | [Group-Member-Removal] |
| | *[Group-Service-Removal] |
| | *[Group-Delete-List] |

The contents of the GCR message depend on the request type and the procedure for which it is used.

In an example embodiment, during the group modification procedure the 'Group-Service-Details' attribute value pair (AVP) can be used to request the addition of a new service or to provide a change in the characteristics of an existing service. Upon receiving this message, if the CN finds that the group being modified has already subscribed to the service mentioned in a 'Group-Service' AVP, then the CN updates the characteristics for that service and chooses a different method for executing the service.

In an example embodiment, the 'External-Group-Identifier' AVP becomes a mandatory AVP in the group modification procedure and should not be included during the group creation procedure.

The 'GC-Request-Type' AVP is set to 'INITIAL_REQUEST' when the SCS 212 initiates the GCR message for group creation and is set to 'MODIFICATION_REQUEST' when the SCS 212 sends the GCR for modifying group attributes.

GCA—Group Control Answer

In an example embodiment, the GCA command is sent by the MTC-IWF 210 to the SCS 212 as part of SCS initiated group creation procedure described above in connection with FIG. 3 and SCS initiated group modification procedure described above in connection with FIG. 5.

The message may include the following AVPs:

```
{ GC-Request-Type }
{ GC-Request-Number }
[ External-Group-Identifier ]
*[ Group-Service-Details ]  -->Accepted group services
*[ Rejected-Group-Service ]
[ Group-Existence-Time ]
*[ Sub-Group-Information ]
*[ Supported-Features ]
```

The 'Group-Services' AVP contains the list of services that were accepted by the CN and the characteristics of the services that were accepted.

GNR—Group Notification Request

The GNR command is sent by the MTC-IWF 210 to the SCS 212 as part of CN initiated group modification procedure as described above in connection with FIG. 7.

The message may include the following AVPs:

```
{ GC-Request-Number }
[ External-Group-Identifier ]
*[ Group-Service-Details ]
[ Group-Existence-Time ]
*[ Group-Modifications-Control ]
*[ Sub-Group-Information ]
*[ Group-Member-Addition ]
[ Group-Member-Removal ]
*[ Group-Service-Removal ]
*[ Available-Service ]
*[ Supported-Features ]
```

The 'Group-Service-Details' AVP contains the list of services that were modified or added by the CN to the group and the characteristics of the services modified/added.

The 'Supported-Features' AVP can be used to indicate the available group based services to the SCS 212.

GNA—Group Notification Answer

The GNA command is sent by the SCS 212 to the MTC-IWF 210 as part of the CN initiated group modification procedure as described above in connection with FIG. 7.

The message may include the following AVPs:
{GC-Request-Number}

The 'Result-Code' AVP is used to indicate the success or failure of the group modification at the service layer.

GRN—Group Related Event Notification Request

The GRN command is sent by the MTC-IWF 210 to the SCS 212 as part of the alternative CN initiated group modification procedure, described above in connection with FIG. 8 to provide the list of unavailable or newly available services/UEs to the SCS 212. The SCS 212 may perform an SCS initiated group modification procedure based on the information in the GRN command.

The message may include the following AVPs:

```
{ GC-Request-Number }
[ External-Group-Identifier ]
*[ Unavailable-Member ]
*[ Suggested-New-Member ]
*[ Unavailable-Service ]
*[ Available-Service ]
*[ Group-Service-Details ]
*[ Group-Delete-List ]
*[ Supported-Features ]
```

The 'Group-Service-Details' AVP may be used to indicate the changes needed to the already subscribed services.

GRA—Group Related Event Notification Answer

The GRA command is sent by the SCS 212 to the MTC-IWF 210 as part of the alternative CN initiated group modification procedure, described above in connection with FIG. 8 to indicate the success or failure of the group modification at the service layer.

The message may include the following AVPs:
{GC-Request-Number}

GAR—Group Action Request

The GAR command is sent by the SCS 212 to the MTC-IWF 210 as part of the group services execution procedure which is described above in connection with FIG. 13.

The message may include the following AVPs:

```
{ GC-Request-Number }
{ External-Group-Identifier }
{ Group-Service-Id }
[ Service-Characteristics ]
[ Service-Payload ]
```

GAA—Group Action Answer

The GAA command is sent by the MTC-IWF 210 to the SCS 212 as part of the group services execution procedure described above in connection with FIG. 13.

The message may include the following AVPs:

```
{ GC-Request-Number }
{ External-Group-Identifier }
[ Service-Execution-Report ]
*[ Supported-Features ]
```

Proposed New AVPs for the Tsp Interface

In an example embodiment, several Diameter attribute value pairs (AVPs) are defined for use in group based procedures on the Tsp reference point 208, including their types and possible flag values. The following chart provides a listing of AVPs that might be used in connection with the group processing described herein. Following the list is a more detailed explanation of each of the identified AVPs.

| Attribute Name | Value Type |
| --- | --- |
| External-Group-Identifier | UTF8String |
| GC-Request-Type | Enumerated |
| GC-Request-Number | Unsigned32 |
| Group-Members | Grouped |
| External-Id | UTF8String |
| Group-Service-Details | Grouped |
| Group-Service-Id | Enumerated |
| Service-Characteristics | Grouped |
| Group-Messaging-Characteristics | Grouped |
| Group-Charging-Policy-Characteristics | Grouped |
| Group-Actions-Monitoring-Characteristics | Grouped |
| Group-Message-Type | Enumerated |
| Group-Messaging-Data-Rate | Unsigned32 |
| Group-Messaging-Frequency | Unsigned32 |
| GM-Repetition | Unsigned32 |
| GM-Repetition-Interval | Unsigned32 |
| GM-Maximum-Delay-Tolerance | Unsigned32 |
| GM-Response-Expected | Enumerated |
| GM-Priority | Unsigned32 |
| Roamers-Inclusion | Enumerated |
| GCP-Type | Enumerated |
| GAM-Type | Enumerated |
| Sub-Grouping-Indication | Grouped |
| Number-Of-Sub-Groups | Unsigned32 |

-continued

| Attribute Name | Value Type |
| --- | --- |
| Minimum-SubGroup-Members | Unsigned32 |
| Sub-Group-Information | Grouped |
| Suggested-Group-Identifier | UTF8String |
| Suggested-New-Member | Grouped |
| Unavailable-Member | Grouped |
| Unavailable-Service | Grouped |
| Device-State* | Enumerated |
| Service-Payload | Grouped |
| Group-Messaging-Payload | OctetString |
| Policy-Charging-Payload | Grouped |
| Actions-Monitoring-Payload | Grouped |
| Group-QoS* | Grouped |
| Group-Charging-Id | OctetString |
| Group-Application-Identifier | OctetString |
| Group-Charging-Type | Enumerated |
| Group-Sponsor-Data | Grouped |
| Monitoring-Event | Grouped |
| Actions-To-Perform | Grouped |
| Monitoring-Reference-Number | Enumerated |
| Monitoring-Event-Id | Enumerated |
| Monitoring-Event-Data | Enumerated |
| Action-Reference-Number | Enumerated |
| Action-Type-Id | Enumerated |
| Action-Type-Data | Enumerated |
| Group-Delete-List | Grouped |
| Deletion-Type | Enumerated |
| Group-Id-Availability | Enumerated |
| Group-Unavailable-Time | Time |
| Group-Existence-Time | Time |
| Group-Member-Addition | Grouped |
| Group-Member-Removal | Grouped |
| Group-Modifications-Control | Grouped |
| GMC-Entity | Enumerated |
| GMC-Type | Unsigned32 |
| Group-Service-Removal | Grouped |
| Available-Service | Grouped |
| Rejected-Group-Service | Grouped |
| Acceptable-Service-Characteristics | Grouped |
| Max-Devices-Supported | Grouped |
| Service-Available-Time | Grouped |
| Service-Roaming-Support | Grouped |
| Group-Control-Cause | Grouped |
| Service-Execution-Report | Grouped |
| Group-Messaging-Report | Grouped |
| Group-Charging-Policy-Report | Grouped |
| Actions-Monitoring-Configuration-Report | Grouped |
| Transmission-Area | Grouped |
| Supported-Features | Grouped |

External-Group-Identifier

The External-Group-Identifier AVP is of type UTF8String, and contains an external group identifier for the group. The External Group Identifier has the form groupname@realm as specified in clause 2.1 of IETF RFC 4282, the contents of which are hereby incorporated herein by reference in their entirety, and have the same principles as MTC external identifiers defined in 3GPP TS 23.682, the contents of which is hereby incorporated herein by reference in its entirety. The definition for external group identifiers is discussed in 3GPP TR 23.887, the contents of which are hereby incorporated by reference herein in their entirety.

GC-Request-Type

The GC-Request-Type AVP is of type Enumerated and is used by the SCS 212 to indicate the reason for which the GCR message is initiated.

The following values are defined:

INTIIAL_REQUEST (0)—When the GCR message is sent for the purpose of forming a group this value is used.

MODIFICATION_REQUEST (1)—This value is used when the GCR message is sent for the purpose of modifying group attributes.

DELETION_REQUEST (2)—This value is used when the GCR message is sent for the purpose of modifying group attributes.

GC-Request-Number

The GC-Request-Number AVP is of type Unsigned32 and identifies this request within one session. An SCS 212 or MTC-IWF 210 can initiate multiple group based procedures simultaneously without waiting for a previous procedure to complete. The GC-Request-Number AVP is used to match the response to the corresponding request.

For example, in an example scenario, the SCS 212 may initiate a group creation procedure simultaneously to create multiple groups by sending the GCR message with GC-Request-Number set to different values. The MTC-IWF 210 ensures that the respective GCA message have the GC-Request-Number set to the same value received in the respective GCR message.

Alternately the 'Reference-Number' AVP defined in clause 6.4.8 3 GPP TS 29.368, the contents of which are hereby incorporated herein by reference, may be re-used.

Group-Members

The Group-Members AVP is type Grouped and is used to denote the members belonging to a MTC external group. It can contain multiple instances of individual MTC external identifiers and/or multiple instances of external group identifiers.

The message may include the following AVPs:

*[ External-Id ]
*[ External-Group-Identifier ]

External-Id

The External-Id AVP is of type UTF8String and contains an external identifier of the UE. 3GPP TS 23.003, the contents of which are hereby incorporated by reference herein in their entirety, provides information regarding the definition and formatting of the external identifier.

Group-Service-Details

The Group-Service-Details AVP is of type Grouped and contains the details about a group based service. It contains the service ID and the characteristics of the service.

The message may include the following AVPs:

{ Group-Service-Id }
[ Service-Characteristic ]

Group-Service-Id

The Group-Service-Id is of type Enumerated and indicates a 3GPP offered group based service.

The following values are defined:

GROUP_MESSAGING_SERVICE (0)—Indicates a either a group based multicast or broadcast messaging service.

GROUP_CHARGING_POLICY_CONTROL_SERVICE (1)—Indicates a group based policy and charging control service where the SCS 212 can provide policy and charging control information for a group of UEs.

GROUP_ACTIONS_MONITORING_SERVICE (2)—Indicates a group based monitoring and actions service where the activities of some UEs are monitored and automatic actions are performed on some UEs based on the occurrence of specified events.

Service-Characteristics

The Service-Characteristics AVP is of type Grouped and defines the characteristics of a service being offered/requested. It is similar to a QoS to the group based service.

The message may include the following AVPs:

[ Group-Messaging-Characteristics ]
[ Group-Charging-Policy-Characteristics ]
[ Group-Actions-Monitoring-Characteristics ]

Group-Messaging-Characteristics

The Group-Messaging-Characteristics AVP is of type Grouped and contains the service characteristics of the group messaging service.

The message may include the following AVPs:

[ Group-Message-Type ]
[ Group-Messaging-Data-Rate ]
[ Group-Messaging-Frequency ]
[ GM-Repetition ]
[ GM-Repetition-Interval ]
[ GM-Maximum-Delay-Tolerance ]
[ GM-Response-Expected ]
[ GM-Priority ]
[ Roamers-Inclusion ]

Group-Charging-Policy-Characteristics

The Group-Charging-Policy-Characteristics AVP is of type Grouped and contains the characteristics of the group charging and policy control feature.

The message may include the following AVPs:

{ GCP-Type }
[ Roamers-Inclusion ]

Group-Actions-Monitoring-Characteristics

The Group-Actions-Monitoring-Characteristics AVP is of type Grouped and contains the characteristics of the group based monitoring and actions service.

The message may include the following AVPs:

{ GAM-Type }
[ Roamers-Inclusion ]

Group-Message-Type

The Group-Message-Type AVP is of type Enumerated and denotes the purpose for group messaging.

The following values are defined:
DEVICE_TRIGGERING (0)—This value indicates that the message that has to be sent to the group is a device triggering message.
SHORT_MESSAGING (1)—This value indicates that the group message to be delivered is a short message. The short message may be operator defined or the maximum size of a single MT SMS or a CBS message.
DOWNLINK_STREAMING (2)—This value indicates a continuous stream of messages in the downlink direction.
Other values can be added as per agreements between the service provider and the operator.

Group-Messaging-Data-Rate

The Group-Messaging-Data-Rate AVP is of type Unsigned32 and denotes the data rate, in number of bytes per second format, for the messaging service. It is relevant to particular type of messaging such as 'downlink streaming'

Group-Messaging-Frequency

The Group-Messaging-Frequency AVP is of type Unsigned32 and provides the number of messages (packets) that have to be sent in the downlink for a messaging service. This value is denoted in number packets per hour format. It may be relevant to 'device triggering' and 'short messaging' kind of services.

GM-Repetition

The GM-Repetition AVP is of type Unsigned32 and indicates the number of times a particular message has to be repeated or re-broadcasted. Certain messaging needs such as device triggering may require that the message be repeated to increase probability of maximum number devices receiving the message.

GM-Repetition-Interval

The GM-Repetition-Interval AVP is of type Unsigned32 and provides the interval duration, in seconds, between successive messaging repetitions.

GM-Maximum-Delay-Tolerance

The GM-Maximum-Delay-Tolerance AVP is of type Unsigned32 and provides the maximum amount of time that can be delayed before the delivery of a message. It is provided in the unit of seconds with a value of zero indicating immediate delivery. This attribute helps the core network in optimizing the message delivery mechanism and in scheduling the message delivery. This attribute is helpful in minimizing the effects during congestion periods.

GM-Response-Expected

The GM-Response-Expected AVP is of type Enumerated and indicates whether or not the SCS 212 is expecting a response from the UEs for the group message. This attribute helps the core network to prepare its resources to handle the uplink messages from the UEs. The core network can broadcast the downlink group message at different times in different cells/areas (as allowed by the GM-Maximum-Delay-Tolerance) or it can include a timer value and request the UEs to randomly choose a time within the time period for sending their response messages.

The following values are defined:
NO_RESPONSE (0)—This value indicates that the SCS 212 does not expect any response from the UEs for the group message.
SINGLE_RESPONSE (1)—This value indicates that a single response message from the UE is expected.
MULTPLE_RESPONSE (2)—This value indicates that the UE may send more than one message in response to the group message.
UNKNOWN_RESPONSE (3)—This value indicates that the SCS 212 is unsure if the UE may reply with a response message.

GM-Priority

The GM-Priority AVP is of type Unsigned32 and indicates the priority of the group message. Certain warning messages and update messages from the SCS 212 may be critical and the SCS 212 may want the core network to provide a higher priority and choose a reliable method for the delivery of these messages.

A lower value indicates higher priority.

Roamers-Inclusion

The Roamers-Inclusion AVP is of type Enumerated and indicates if the MTC-IWF 210 should make an attempt to deliver the messages or execute or configure the services for the UEs that are not currently being served by the Home-PLMN.

GCP-Type
The GCP-Type AVP is of type Enumerated and provides the purpose of for the group charging and policy service. The following values are defined:
CHARGING_ONLY (0)—This value indicates that the service is required only for group charging purposes.
POLICY_ONLY (1)—This value indicates that the service requires only group policy related control.
CHARGING_AND_POLICY (2)—This value indicates that the service for both charging and policy is required.
GAM-Type
The GAM-Type AVP is of type Enumerated and provides the purpose for the group actions and monitoring service. The following values are defined:
MONITORING_ONLY (0)—This value indicates that the only monitoring and reporting to be performed.
ACTION_ONLY (1)—This value indicates that the SCS 212 will provide the actions that need to be performed and the CN may need to simply execute those actions. No monitoring is performed by the CN. The SCS 212 may do the monitoring at service layer.
MONITORING_AND_ACTIONS (2)—This value indicates that the service is to be configured for both monitoring and monitoring based actions.
Sub-Grouping-Indication
The Sub-Grouping-Indication AVP is of type Grouped and is used by the SCS 212 to indicate that the CN can perform sub-grouping if required.
The message may include the following AVPs:

[ Number-Of-Sub-Groups ]
[ Minimum-SubGroup-Members ]

Number-Of-Sub-Groups
The Number-Of-Sub-Groups AVP is of type Unsigned32 and indicates the maximum number of sub groups that the CN can create.
Minimum-SubGroup-Members
The Minimum-SubGroup-Members AVP is of type Unsigned32 and indicates the minimum number of UEs that should be present in each of the sub groups that is formed.
Sub-Group-Information
The Sub-Group-Information AVP is of type Grouped and is used by the CN to provide information related to the sub groups that were formed. It contains the external group Id of the sub group, its member list and the services configured for the sub group.
The message may include the following AVPs:

{ External-Group-Identifier }
[ Group-Members ]
*[ Group-Service-Details ]

Suggested-Group-Identifier
The Suggested-Group-Identifier AVP is of type UTF8String and is used by the SCS 212 during the group creation procedure to suggest to the CN to assign a specific external group Id to the group. This AVP may be formatted similar to the External-Group-Identifier AVP and of the format 'groupname@realm' or it may just contain the 'groupname' portion.
One scenario where the SCS 212 can suggest an external group ID is when the SCS 212 has deleted a group and sometime later if it wants to create the same group, then it may suggest the CN to assign the same external group ID.

Suggested-New-Member
The Suggested-New-Member AVP is of type Grouped and is used by the CN in the GRN (alternate CN initiated group modification procedure as discussed in connection with FIG. 8) to suggest the SCS 212 to add some UEs to the group.
AVP Format:
The message may include the following AVPs:

[ External-Id ]
[ External-Group-Identifier ]
[ Device-State ]
*[ AVP ]

Unavailable-Member
The Unavailable-Member AVP is of type Grouped and is used by the CN in the GRN (alternate CN initiated group modification procedure discussed in connection with FIG. 8) to suggest the SCS 212 to remove some UEs from the group.
The message may include the following AVPs:

[ External-Id ]
[ External-Group-Identifier ]
[ Device-State ]

Unavailable-Service
The Unavailable-Service AVP is of type Grouped and is used by the CN in the GRN (alternate CN initiated group modification procedure discussed in connection with FIG. 8) to provide the service that is no longer available at the core network.
The message may include the following AVPs:

{ Group-Service-Id }
[ Group-Control-Cause ]

Device-State*
The Device-State AVP is of type Enumerated and provides the status of a UE 214 to the SCS 212. It may have the following values:
 a. Attached
 b. Detached
 c. Unknown
 d. Idle
 e. Connected
 f. Roaming . . . etc.
Service-Payload
The Service-Payload AVP is of type Grouped and is used by the SCS 212 to provide the payload for the service that it wants to be executed. The payload may be data that needs to be sent to the UE 214 or some information to the core network related to a group based service.
The message may include the following AVPs:

[ Group-Messaging-Payload ]
[ Policy-Charging-Payload ]
*[ Actions-Monitoring-Payload ]

Multiple instances of the Actions-Monitoring-Payload AVP may be present in a message to provide multiple monitoring/action events.
Group-Messaging-Payload
The Group-Messaging-Payload AVP is of type Octet-String and contains the payload (the message contents) that needs to be sent to the UEs in the group. The contents may be most probably an IP packet.

Policy-Charging-Payload

The Policy-Charging-Payload AVP is of type Grouped and is used by the SCS 212 to provide the payload for the group charging and policy service. This AVP contains information about the group policy rules and charging characteristics that are to be enforced for a group.

The message may include the following AVPs:

---
[ Group-QoS ]
[ Group-Charging-Id ]
[ Group-Application-Identifier ]
[ Group-Charging-Type ]
[ Group-Sponsor-Data ]
---

Actions-Monitoring-Payload

The Actions-Monitoring-Payload AVP is of type Grouped and is used by the SCS 212 to provide the payload for the action and monitoring service. This AVP contains information about the events that need to be monitored and the actions that are to be performed.

The message may include the following AVPs:

---
*[ Monitoring-Event ]
*[ Action-To-Perform ]
---

Multiple instances of the Monitoring-Event AVP or the Action-To-Perform AVP may be present. This is to provide the flexibility to define multiple actions for a single event or to define multiple events causing single/multiple actions.

Group-QoS*

The Group-QoS AVP is of type Grouped and contains the QoS values that need to be applied for each member of the group. It may even be used to provide a common QoS value such as a collective DL rate wherein the sum of all the DL data rate of all the active UEs in the group may not exceed the collective DL rate.

Group-Charging-Id

The Group-Charging-Id AVP is of type OctetString and is used for charging correlation for the UEs that belong to a group.

Group-Application-Identifier

The Group-Application-identifier AVP is of type OctetString, and contains information that identifies a particular service for an AF service session. This information may be used by the PCRF to differentiate QoS for different application services for the group.

Group-Charging-Type*

The Group-Charging-Type is of type Enumerated and indicates the charging method that needs to be used.

It can identify individual charging, group charging, or both, or SCS sponsored group charging, or offline or online charging.

Group-Sponsor-Data

The Group-Sponsor-Data AVP is of type Grouped and contains details about the sponsorship such as, for example, the sponsor Id, usage threshold, etc. It may be coded similar to the Sponsored-Connectivity-Data AVP defined in clause 5.3.27 of 3GPP TS 29.214, the contents of which are hereby incorporated herein by reference in their entirety.

The message may include the following AVPs:

---
[ Sponsor-Identity ]
[ Application-Service-Provider-Identity ]
[ Granted-Service-Unit ]
[ Used-Service-Unit ]
---

Monitoring-Event

The Monitoring-Event AVP is of type Grouped and contains the event that has to be monitored. The event can be for a single UE 214 or for a group of UEs. For example it can be a single UE 214 mobility event or a mobility event for a group of UEs AVP Format:

The message may include the following AVPs:

---
{ Monitoring-Reference-Number }
[ Monitoring-Event-Id ]
*[ Group-Members ]
[ Monitoring-Event-Data ]
---

For a single UE 214 detach, the Monitoring-Event-Id AVP may be set to detach type and the Group-Members AVP set to the UE's External-Id.

For the mobility of a group of UEs, the Monitoring-Event-Id AVP may be set to mobility type and the Group-Members AVP contain the list of External-Ids of all the UEs for which the mobility needs to be monitored. The Monitoring-Event-Data contains additional information such as the tracking area to which the mobility of the UEs need to be monitored.

For a 50% attach of a group UEs, the Monitoring-Event-Id AVP is set to attach and the Monitoring-Event-Data AVP provides the percentage 50 and the Group-Members AVP contain the list of UEs or External-Group-ID. Hence when the more than 50% of UEs are attached, an action may be performed or a notification may be sent to the SCS 212.

Actions-To-Perform

The Actions-To-Perform is of type Grouped and contains the action that has to be performed, either upon the occurrence of a monitored event or standalone. The action can be for a single UE 214 or for a group of UEs. For example it can be a detach of a single UE 214 or detach for a group of UEs The message may include the following AVPs:

---
{ Action-Reference-Number }
[ Action-Type-Id ]
*[ Group-Members ]
[ Action-Type-Data ]
---

For a single UE detach, the Monitoring-Event-Id AVP is set to detach type and the Group-Members AVP is set to the UE's External-Id.

The action may be anything that can be executed by the CN and permitted by the UE's subscription info, and may range from activating a PDN or creating a dedicated bearer or changing the periodic TAU timer or the DRX timer etc.

Monitoring-Reference-Number

The Monitoring-Reference-Number AVP is of type Unsigned32 and is used to provide a reference number to a monitoring request so that the MTC-IWF 210 can include in its report which events have been configured or which events have occurred.

Monitoring-Event-Id*

The Monitoring-Event-Id AVP is of type Enumerated and mentions the type of the monitoring event. There are a lot of monitoring events possible such as, for example:
- g. Attach
- h. Detach
- i. Inter-PLMN Mobility
- j. Intra-PLMN Mobility
- k. Inter-System Mobility (e.g. LTE to UMTS)
- l. Inter-Technology Mobility (e.g., LTE to Wi-Fi)
- m. PDN Connection/disconnection
- n. Dedicated bearer activation/deactivation
- o. Idle state
- p. Connectivity duration etc.

Monitoring-Event-Data*

The Monitoring-Event-Data AVP is of type grouped and contains the data related to monitoring events. This AVP may be accompanied with a Monitoring-Event-Id AVP and can provide the relevant data for that event type.

Action-Reference-Number

The Action-Reference-Number AVP is of type Unsigned32 and is used to provide a reference number for an action so that the MTC-IWF 210 can include in its report which actions have been configured or which actions have been performed.

Action-Type-Id*

The Action-Type-Id AVP is of type Enumerated and mentions the type of action that needs to be performed. There are a lot of actions that can be performed such as, for example:
- a. Detach
- b. N/W Initiated PDN Disconnection
- c. N/W Initiated Dedicated bearer activation/deactivation
- d. Update of UE context details like the current TA
- e. Update of N/W UE parameter like the TAU timer, Idle timer, DRX timer etc.
- f. Update of charging and policy information
- g. Device Triggering etc.

Action-Type-Data*

The Action-Type-Data AVP is of type grouped and contains the data related to the action that is to be performed. This AVP may be accompanied with an Action-Type-Id AVP and can provide the relevant data for that event type such as the QoS information for a dedicated bearer.

Group-Delete-List

The Group-Delete-List AVP is of type Grouped and contains the list of groups that are removed and related information.

The message may include the following AVPs:

| *{ External-Group-Identifier } |
| [ Deletion-Type ] |
| [ Group-Id-Availability ] |
| [ Group-Unavailable-Time ] |

Deletion-Type

The Deletion-Type AVP is of type Enumerated and indicates the nature of the group removal.

The following values are defined:
PERMANENT (0)—This value indicates that the group is completely removed and the group ID is released.
TEMPORARY (1)—This value indicates that the group is not available temporarily.

Group-Id-Availability

The Group-Id-Availability AVP is of type Enumerated and indicates if the group ID is available for use by other SCSs.

The following values are defined:
AVAILABLE_FOR_OTHER_SCS (0)—This value indicates that the group is can still be used by other SCSs.
NOTAVAILABLE_FOR_OTHER_SCS (1)—This value indicates that the group is not available to any SCS.

Group-Unavailable-Time

The Group-Unavailable-Time AVP is of type Time and indicates the time until which the group is not available and the time until which the group services for the group cannot be used.

Group-Existence-Time

The Group-Existence-Time AVP is of type Time and indicates the time until which the group can exist and beyond which the group would be deleted. This value may be negotiated between the SCS 212 and CN.

Group-Member-Addition

The Group-Member-Addition AVP is of type Grouped and contains the external UE Id or external group ID that needs to be added to an existing group. This may be provided by the SCS 212 in a GCR message or the CN in the GNR message.

The message may include the following AVPs:

| [ External-Id ] |
| [ External-Group-Identifier ] |

Group-Member-Removal

The Group-Member-Removal AVP is of type Grouped and contains the external UE Id or external group ID that needs to be removed from an existing group. This may be provided by the SCS 212 in a GCR message or the CN in the GNR message.

The message may include the following AVPs:

| [ External-Id ] |
| [ External-Group-Identifier ] |

Group-Modifications-Control

The Group-Modifications-Control AVP is of type Grouped and contains the details about the modifications that can be performed on a group by a network entity. Multiple instances of this Group-Modifications-Control AVP may be present to provide the permissions/authorization for each of the network entities that are stakeholders of a group.

The message may include the following AVPs:

| { GMC-Entity } |
| [ GMC-Type ] |

GMC-Entity

The GMC-Entity AVP is of type Enumerated and it indicates the type of network entity that can excise control over the modification/deletion of a group.

The following values are defined:
ORIGINATING_SCS (0)—This value indicates the SCS that created the group.
3GPP_CN (1)—This value indicates the 3GPP core network that authorized the creation of the group or that is serving the group.
OTHER_SCS (2)—This value indicates other SCSs in the serving layer that has access to the external group identifier.

GMC-Type

The GMC-Type AVP is of type Unsigned32 and contains a 32 bit flag field about the permissions for the modifications of different attributes of a group.

The following values are defined:

NO_MODIFICATION_ALLOWED (0x00000000)—This flag indicates that the network entity mentioned in 'GMC-Entity' AVP cannot make any modifications to the group.

MEMBER_ADDITION (0x00000001)—This flag, when set, indicates the authorization for a network entity to add members to the group.

MEMBER_DELETION (0x00000002)—This flag, when set, indicates the authorization for a network entity to remove members from the group.

SERVICE_ADDITION (0x00000004)—This flag, when set, indicates the authorization for a network entity to add services to the group.

SERVICE_DELETION (0x00000008)—This flag, when set, indicates the authorization for a network entity to remove services from the group.

SERVICE_MODIFICATION (0x00000010)—This flag, when set, indicates the authorization for a network entity to modify the service characteristics of a service that has been allowed for the group.

GROUP_DELETION (0x00000020)—This flag, when set, indicates the authorization for a network entity to delete the group.

Group-Service-Removal

The Group-Service-Removal AVP is of type Grouped and indicates the service removal from a group. Multiple instances of this AVP may be provided if multiple services are to be removed.

The message may include the following AVPs:

```
{ Group-Service-Id }
[ Group-Control-Cause ]
```

Available-Service*

The Available-Service AVP is of type Grouped and indicates all the group based services that are available. Multiple instances of this AVP may be provided if multiple services have become available.

The message may include the following AVPs:

```
{ Group-Service-Id }
[ Max-Devices-Supported ]
[ Service-Available-Time ]
[ Service-Roaming-Support ]
```

Other information related to the available service may be added to this AVP such as, for example, the maximum number of UEs that the service may support, the time for which the service may be available, roaming support and other service specific parameters such as the data rate supported for messaging, etc.

Rejected-Group-Service

The Rejected-Group-Service AVP is of type Grouped and indicates the service that was rejected by the SCS 212 and is not available for use by the group. Multiple instances of this AVP may be provided if multiple services are rejected.

AVP Format:

The message may include the following AVPs:

```
{ Group-Service-Id }
[ Group-Control-Cause ]
[ Acceptable-Service-Characteristics ]
```

If the service was rejected because the requested service characteristics couldn't be served, then the MTC-IWF 210 may include the 'Acceptable-Service-Characteristics' AVP including the acceptable value for the characteristics which caused the rejection. The 'Acceptable-Service-Characteristics' AVP may be coded similar to the 'Service-Characteristics' AVP but may include only the sub-AVPs which caused the rejection.

Acceptable-Service-Characteristics*

The Acceptable-Service-Characteristics AVP is of type Grouped and provides the acceptable values of a service characteristic parameter.

Max-Devices-Supported

The Max-Devices-Supported AVP is of type Unsigned32 and mentions the maximum number of UEs that can be supported by a group based service.

Service-Available-Time

The Service-Available-Time AVP is of type Time and mentions the time until which a group based service would be available for use by a SCS 212.

Service-Roaming-Support

The Service-Roaming-Support AVP is of type Enumerated and mentions if a service would be available for UEs that roam into other operator's network.

The following values are defined:

ROAMING_NOT_SUPPORTED (0)—This value indicates the services would not be provided to the UEs that have roamed.

ROAMING_SUPPORTED (1)—This value indicates the services will be provided to the UEs that have roamed.

Group-Control-Cause*

The Group-Control-Cause AVP is of type Enumerated and contains the cause code for group control procedures. It may indicate the cause value for a service that is unavailable or for the failure of a service execution or for the rejection of group based service etc. Some cause values may apply only to specific group based procedures.

Service-Execution-Report

The Service-Execution-Report AVP is of type Grouped and is used to provide the details about the execution of group based service.

The message may include the following AVPs:

```
{ Group-Service-Id }
{ Group-Control-Cause }
[ Group-Messaging-Report ]
[ Group-Charging-Policy-Report ]
[ Actions-Monitoring-Configuration-Report ]
```

Group-Messaging-Report

The Group-Messaging-Report AVP is of type Grouped and contains the details about the execution of a group messaging service. It may provide the list users in the group to which the group message was sent, the members of the group that were unavailable, the areas in which the message was broadcasted, etc.

The message may include the following AVPs:

```
[ Group-Members ]
[ Transmission-Area ]
*[ Unavailable-Member ]
```

Other information can be added to this AVP based on the type of method that was chosen. For example, the streaming kind of messaging service may have downlink data rate, the number of messages discarded, etc. The report could be sent periodically rather than for every single packet. The CBS kind of service may even mention the number of times a messages was broadcasted (repetition number).

Group-Charging-Policy-Report

The Group-Charging-Policy-Report AVP is of type Grouped and contains the details about the execution of a group charging and policy service. It may provide the current list of users for whom the policy was applied and the list of users for whom the policy could not be applied/enforced.

The message may include the following AVPs:

```
[ Group-Members ]
[ Transmission-Area ]
*[ Unavailable-Member ]
```

Actions-Monitoring-Configuration-Report*

The Actions-Monitoring-Configuration-Report AVP is of type Grouped and contains the information about the accepted monitoring events/actions. It may also contain the rejected monitoring events/actions. The Monitoring-Reference-Number AVPs and Action-Reference-Number AVPs may be used for reporting the accepted/rejected events/actions.

This AVP is defined for use in the GAA message when an event/action is configured. A separate procedure may be need to be defined to have CN send an unsolicited report to the SCS 212 if the CN had made any actions based on a monitoring event.

Transmission-Area*

The Transmission-Area AVP is of type Grouped and mentions the area of message broadcast. It may be mentioned as a list of Tracking Areas or Geographical Areas.

Supported-Features*

The Supported-Features AVP is of type grouped and can be used to provide the list of group based features that are supported by the core network. The Available-Service AVP may be used instead of the Supported-features AVP when the some specific service related information has to be provided.

This AVP is coded as mentioned in clause 6.3.29 of 3GPP TS 29.229 the contents of which are hereby incorporated herein by reference in their entirety.

Example Computing Environment

Figure 20A:
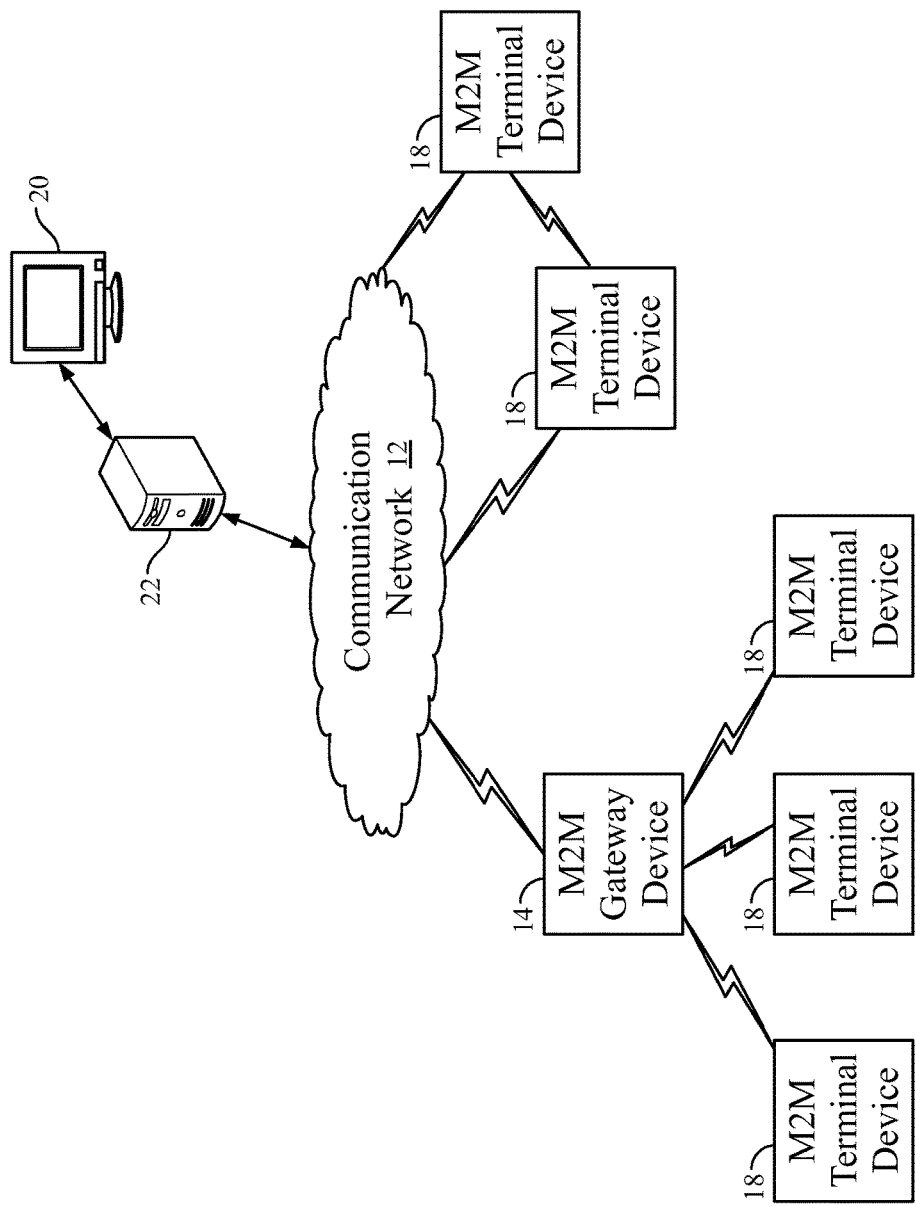
FIG. 20A is a diagram of an example machine-to machine (M2M), Internet of Things (IoT), or Web of Things (WoT) communication system.

FIG. 20A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or node of the IoT/WoT as well as an IoT/WoT service layer, etc. Communication system 10 can be used to implement functionality of the disclosed embodiments and can include functionality and logical entities such as SCS 212, AS 220, MTC-IWF 210, HSS 116, SMS-SC/GMSC/IWMSC 204, GGSN/PGW 224, RAN 219, SGW 110, SGSN 234, MME 114, MSC 238, and UE 214 as well as logical entities that produce the user interfaces.

As shown in FIG. 20A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 20A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different network nodes (e.g., servers, gateways, device, and the like). For example, the Field Domain may include M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals, using communications circuitry, via the communication network 12 or direct radio link. A M2M gateway 14 allows wireless M2M devices (e.g. cellular and non-cellular) as well as fixed network M2M devices (e.g., PLC) to communicate either through operator networks, such as the communication network 12 or direct radio link. For example, the M2M terminal devices 18 may collect data and send the data, via the communication network 12 or direct radio link, to an M2M application 20 or other M2M devices 18. The M2M terminal devices 18 may also receive data from the M2M application 20 or an M2M terminal device 18. Further, data and signals may be sent to and received from the M2M application 20 via an M2M service layer 22, as described below. M2M terminal devices 18 and gateways 14 may communicate via various networks including, cellular, WLAN, WPAN (e.g., Zigbee, 6LoWPAN, Bluetooth), direct radio link, and wireline for example.

Exemplary M2M terminal devices 18 include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Figure 20B:
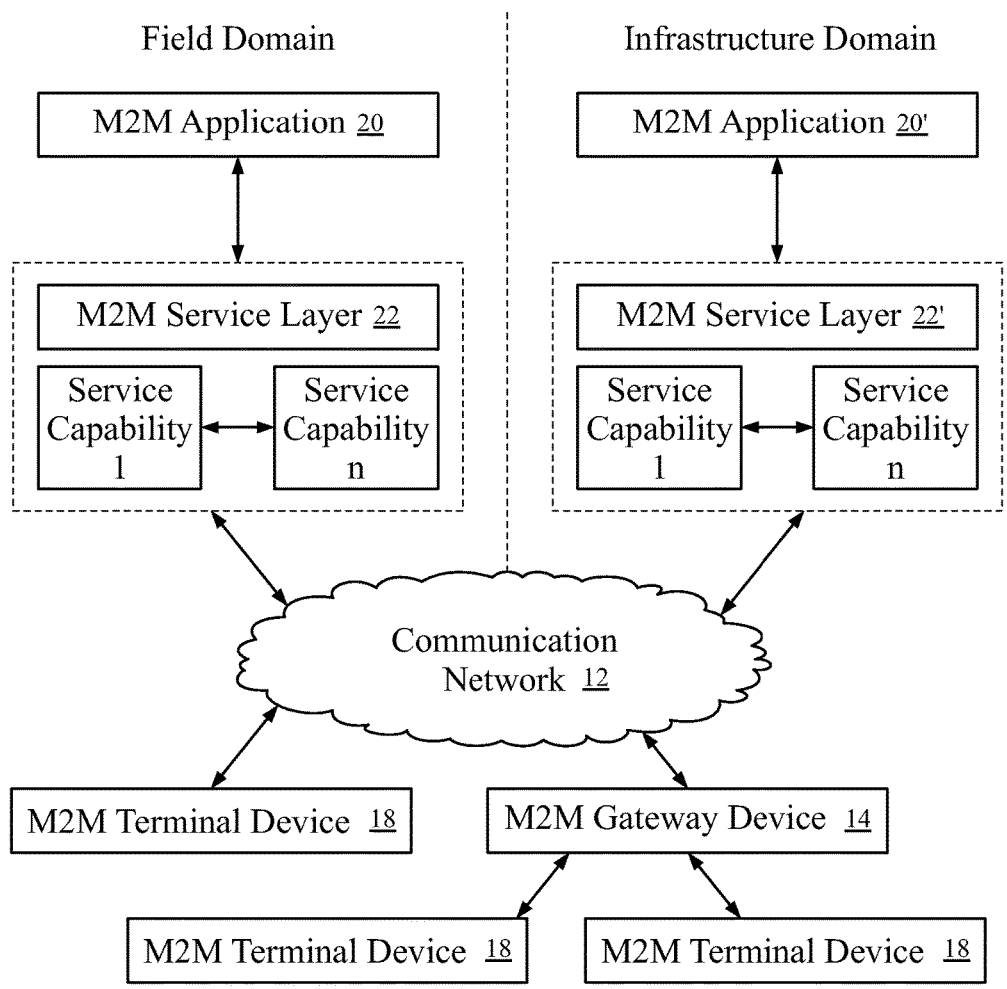
FIG. 20B is a diagram of an example system depicting operation of the M2M service layer in providing services for the M2M application, M2M gateway devices, M2M terminal devices, and the communication network.

Referring to FIG. 20B, the illustrated M2M service layer 22 in the field domain provides services for the M2M application 20, M2M gateway devices 14, and M2M terminal devices 18 and the communication network 12. Communication network 12 can be used to implement functionality of the disclosed embodiments and can include functionality and logical entities such as SCS 212, AS 220, MTC-IWF 210, HSS 116, SMS-SC/GMSC/IWMSC 204, GGSN/PGW 224, RAN 219, SGW 110, SGSN 234, MME 114, MSC 238, and UE 214. The M2M service layer 22 may be implemented by one or more servers, computers, devices, virtual machines (e.g. cloud/storage farms, etc.) or the like, including for example the devices illustrated in FIGS. 20D and 20E described below. It will be understood that the M2M service layer 22 may communicate with any number of M2M applications, M2M gateways 14, M2M terminal devices 18, and communication networks 12 as desired. The M2M service layer 22 may be implemented by one or more nodes of the network, which may comprises servers, computers, devices, or the like. The M2M service layer 22 provides service capabilities that apply to M2M terminal devices 18, M2M gateways 14, and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateways 14 and M2M terminal devices 18 in the field domain. It will be understood that the M2M service layer 22' may communicate with any number of M2M applications, M2M gateways and M2M devices. The M2M service layer 22' may interact with a service layer by a different service provider. The M2M service layer 22' by one or more nodes of the network, which may comprises servers, computers, devices, virtual machines (e.g., cloud computing/storage farms, etc.) or the like.

Referring also to FIG. 20B, the M2M service layers 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layers 22 and 22' also enable M2M applications 20 and 20' to communicate through various networks 12 and 12' in connection with the services that the service layers 22 and 22' provide.

The methods of the present application may be implemented as part of a service layer 22 and 22'. The service layer 22 and 22' is a software middleware layer that supports value-added service capabilities through a set of Application Programming Interfaces (APIs) and underlying networking interfaces. Both ETSI M2M and oneM2M use a service layer that may contain the connection methods of the present application. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE) which can be hosted on different types of network nodes (e.g. infrastructure node, middle node, application-specific node). Further, connection methods of the present application can implemented as part of an M2M network that uses a Service Oriented Architecture (SOA) and/or a resource-oriented architecture (ROA) to access services such as the connection methods of the present application.

In some embodiments, M2M applications 20 and 20' may be used in conjunction with the disclosed systems and methods. The M2M applications 20 and 20' may include the applications that interact with the UE or gateway and may also be used in conjunction with other disclosed systems and methods.

In one embodiment, the logical entities such as SCS 212, AS 220, MTC-IWF 210, SMS-SC/GMSC/IWMSC 204, GGSN/PGW 224, RAN 219, SGW 110, SGSN 234, MME 114, MSC 238, and UE 214 may be hosted within a M2M service layer instance hosted by an M2M node, such as an M2M server, M2M gateway, or M2M device, as shown in FIG. 20B. For example, the logical entities such as SCS 212, AS 220, MTC-IWF 210, HSS 116, SMS-SC/GMSC/IWMSC 204, GGSN/PGW 224, RAN 219, SGW 110, SGSN 234, MME 114, MSC 238, and UE 214 may comprise an individual service capability within the M2M service layer instance or as a sub-function within an existing service capability.

The M2M applications 20 and 20' may include applications in various industries such as, without limitation, transportation, health and wellness, connected home, energy management, asset tracking, and security and surveillance. As mentioned above, the M2M service layer, running across the devices, gateways, servers and other nodes of the system, supports functions such as, for example, data collection, device management, security, billing, location tracking/geofencing, device/service discovery, and legacy systems integration, and provides these functions as services to the M2M applications 20 and 20'.

Generally, the service layers 22 and 22' define a software middleware layer that supports value-added service capabilities through a set of Application Programming Interfaces (APIs) and underlying networking interfaces. Both the ETSI M2M and oneM2M architectures define a service layer. ETSI M2M's service layer is referred to as the Service Capability Layer (SCL). The SCL may be implemented in a variety of different nodes of the ETSI M2M architecture. For example, an instance of the service layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e., service capabilities). An instantiation of a set of one or more particular types of CSFs is referred to as a Common Services Entity (CSE) which can be hosted on different types of network nodes (e.g. infrastructure node, middle node, application-specific node). The Third Generation Partnership Project (3GPP) has also defined an architecture for machine-type communications (MTC). In that architecture, the service layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the service layer may be implemented as a logical entity (e.g., software, computer-executable instructions, and the like) executing either on one or more standalone nodes in the network, including servers, computers, and other computing devices or nodes, or as part of one or more existing nodes. As an example, an instance of a service layer or component thereof may be implemented in the form of software running on a network node (e.g., server, computer, gateway, device or the like) having the general architecture illustrated in FIG. 20D or FIG. 20E described below.

Further, logical entities of the present application such as SCS 212, AS 220, MTC-IWF 210, HSS 116, SMS-SC/GMSC/IWMSC 204, GGSN/PGW 224, RAN 219, SGW 110, SGSN 234, MME 114, MSC 238, and UE 214 can be implemented as part of an M2M network that uses a Service Oriented Architecture (SOA) and/or a Resource-Oriented Architecture (ROA) to access services of the present application.

Figure 20C:
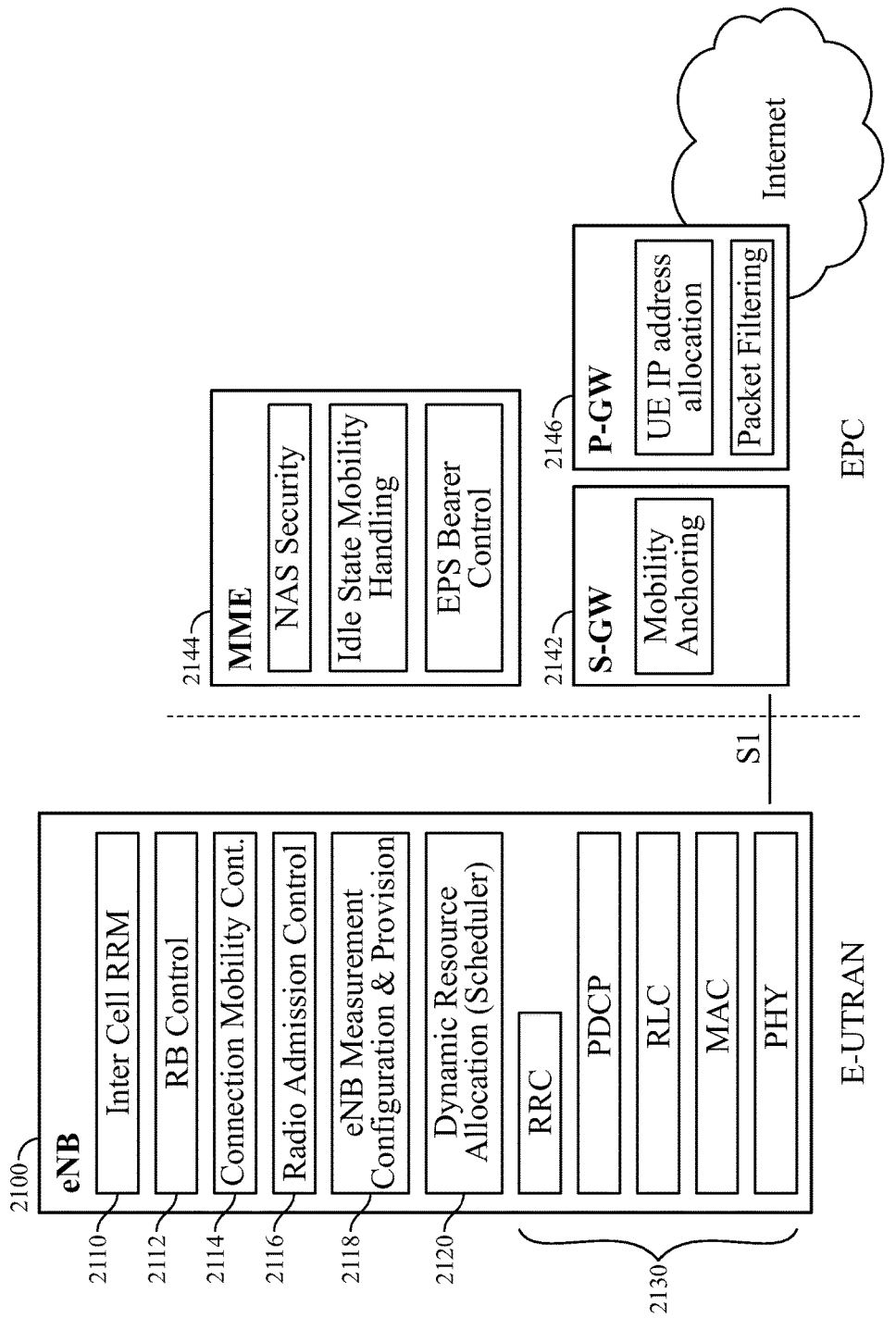
FIG. 20C is a diagram depicting functional components of a base station that may be used in connection with the systems and methods described herein.

As noted above, coordinated grouping for grouped based services often involves the automated configuration of UE's and core network (CN) nodes including wireless base stations such as, for example, eNBs. Implementing a group service may involve configuring an eNB to communicate messages to a defined group of machines. A base station may be any type of device that is configured to wirelessly interface with at least one wireless remote terminal units (WRTU) to facilitate access to one or more communication networks, such as, for example, an evolved packet core, the Internet, or other network. FIG. 20C depicts a block diagram of functional components of an example eNB 2100. As shown, eNB 2100 comprises several functional components that are adapted to perform various control operations including, for example, inter cell radio resource management 2110, radio bearer control 2112, connection mobility control 2114, radio admission control 2116, measurement configuration and provisioning 2118, and dynamic allocation of resources to UEs (scheduler) 2120. eNB 2100 may be configured to communicate using any number of different protocol layers 2130 including, for example, RRC, PDCP, RLC, MAC, and PHY.

eNB 2100 is communicatively coupled with components of the evolved packet core (EPC). For example, eNB 2100 is communicatively coupled with serving gateway (S-GW) 2142, MME 2144, and packet data network gateway (P-GW) 2146. MME 2144, in addition to its traditional functions, may be adapted to communicate with eNB 2100 to configure the eNB 2100 as needed to implement a group service. For example, eNB 2100 may receive request to create or alter an existing grouping of nodes with which the eNB 2100 communicates. Communications between the eNB and the EPC take place over Si interface 2140. It will be appreciated that a base station such as, for example, an eNB 2100, is implemented as a computing system that is programmed to perform the various functions as described herein, as well as those typically associated with a base station.

Figure 20D:
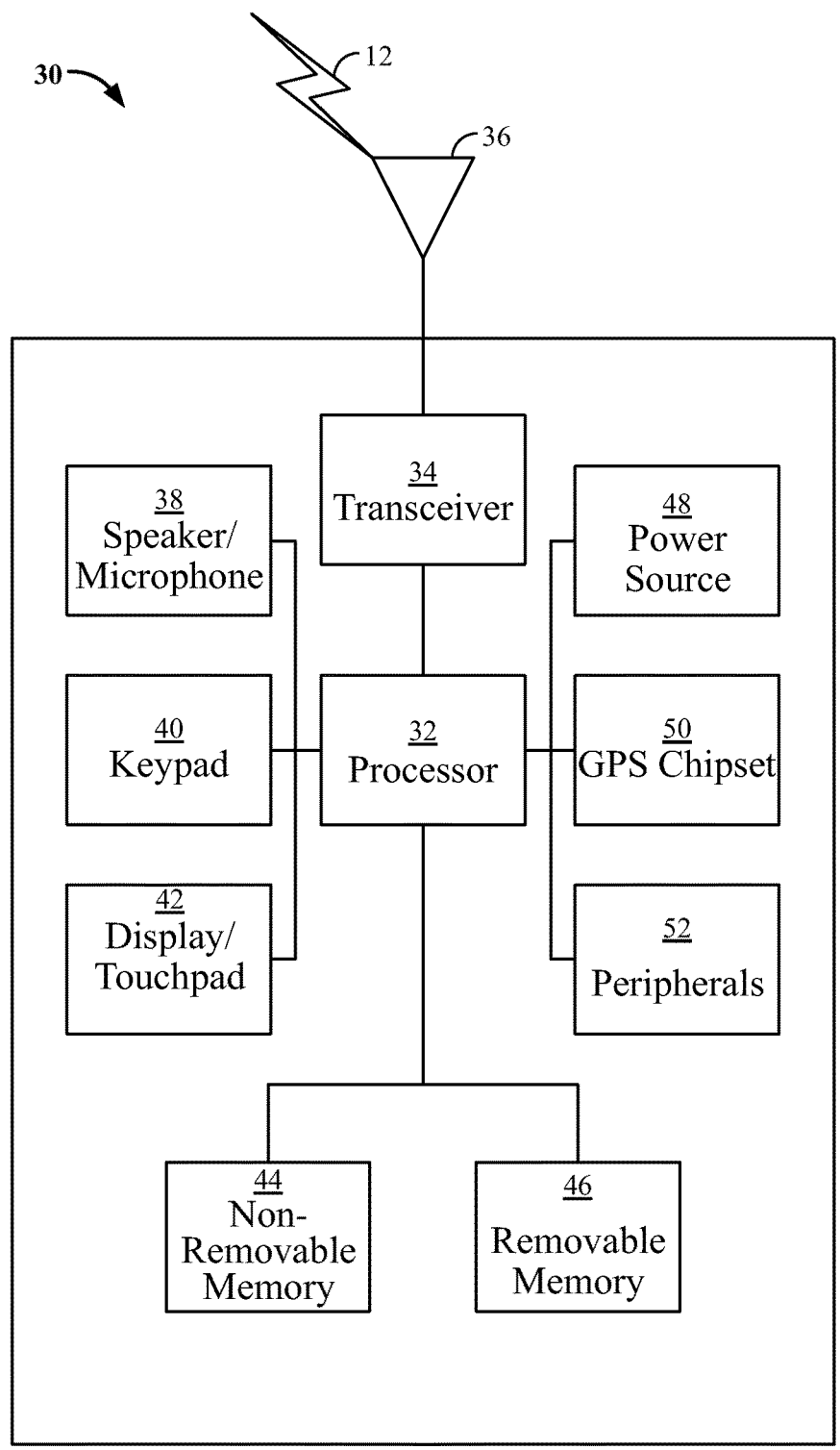
FIG. 20D is a diagram of a system suitable for use as a base station in connection with the systems and methods described herein.

FIG. 20D is a block diagram of an example hardware/software architecture of a M2M network node 30, such as, for example, an eNB 2100, an M2M device 18, an M2M gateway 14, an M2M server, or the like. The node 30 can execute or include logical entities such as SCS 212, AS 220, MTC-IWF 210, HSS 116, SMS-SC/GMSC/IWMSC 204, GGSN/PGW 224, RAN 219, SGW 110, SGSN 234, MME 114, MSC 238, and UE 214. The device 30 can be part of an M2M network as shown in FIG. 20A-B or part of a non-M2M network. As shown in FIG. 20D, the M2M node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. It will be appreciated that the M2M node 30 may include any sub-combination of the foregoing elements while remaining consistent with an embodiment. This node may be a node that implements the SMSF functionality described herein.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the M2M node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 20D, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the transmitting and receiving steps described herein and in the claims. While FIG. 20D depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other M2M nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 20D as a single element, the M2M node 30 may include any number of transmit/receive elements 36. More specifically, the M2M node 30 may employ MIMO technology. Thus, in an embodiment, the M2M node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M node 30 may have multi-mode capabilities. Thus, the transceiver 34 may include multiple transceivers for enabling the M2M node 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M node 30, such as on a server or a home computer. The processor 32 may be configured to control lighting patterns, images, or colors on the display or indicators 42 to reflect the status of an M2M service layer session migration or sharing or to obtain input from a user or display information to a user about the node's session migration or sharing capabilities or settings. In another example, the display may show information with regard to a session state. The current disclosure defines a RESTful user/application API in the oneM2M embodiment. A graphical user interface, which may be shown on the display, may be layered on top of the API to allow a user to interactively establish and manage an E2E session, or the migration or sharing thereof, via the underlying service layer session functionality described herein.

The processor 32 may receive power from the power source 48, and may be configured to distribute and/or control the power to the other components in the M2M node 30. The power source 48 may be any suitable device for powering the M2M node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M node 30. It will be appreciated that the M2M node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 20E:
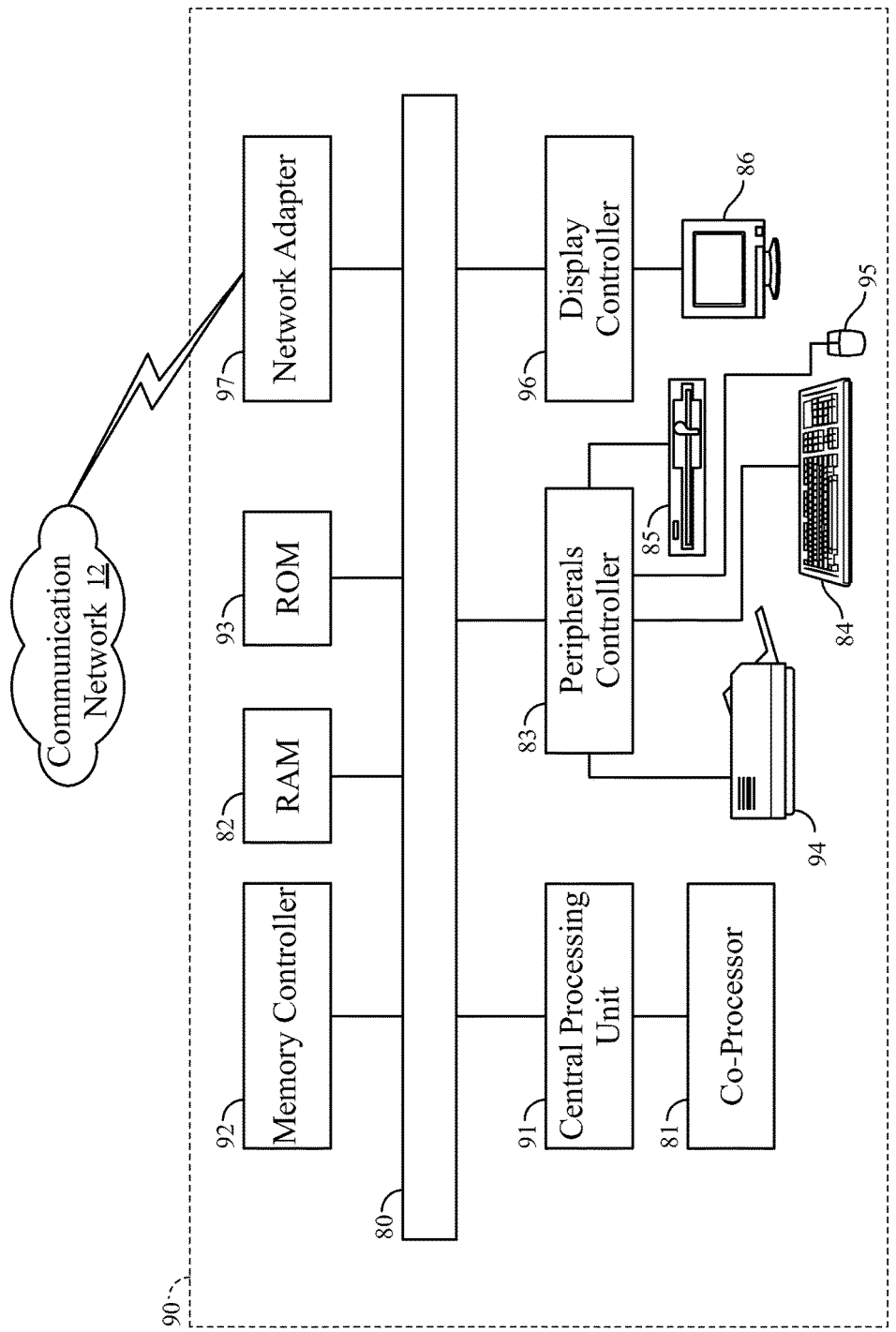
FIG. 20E is a diagram of an exemplary computing system that may be used to implement the systems and methods described herein.

FIG. 20E is a block diagram of an exemplary computing system 90 which may also be used to implement one or more nodes of an M2M network, such as an M2M server, gateway, device, or other node. Computing system 90 may comprise a computer or server and may be controlled primarily by computer readable instructions, which may be in the form of software, wherever, or by whatever means such software is stored or accessed. Computing system 90 can execute or include logical entities such as SCS 212, AS 220, MTC-IWF 210, HSS 116, SMS-SC/GMSC/IWMSC 204, GGSN/PGW 224, RAN 219, SGW 110, SGSN 234, MME 114, MSC 238, and UE 214. Computing system 90 can be an M2M device, user equipment, gateway, UE/GW or any other nodes including nodes of the mobile care network, service layer network application provider, terminal device 18 or an M2M gateway device 14 for example. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M service layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97, that may be used to connect computing system 90 to an external communications network, such as network 12 of FIG. 20A and FIG. 20B, to enable the computing system 90 to communicate with other nodes of the network.

It is understood that any or all of the systems, methods, and processes described herein may be embodied in the form of computer executable instructions (i.e., program code) stored on a computer-readable storage medium which instructions, when executed by a machine, such as a node of an M2M network, including for example an M2M server, gateway, device or the like, perform and/or implement the systems, methods and processes described herein. Specifically, any of the steps, operations or functions described above, including the operations of the gateway, UE, UE/GW, or any of the nodes of the mobile core network, service layer or network application provider, may be implemented in the form of such computer executable instructions. Logical entities such as SCS 212, AS 220, MTC-IWF 210, HSS 116, SMS-SC/GMSC/IWMSC 204, GGSN/PGW 224, RAN 219, SGW 110, SGSN 234, MME 114, MSC 238, and UE 214 may be embodied in the form of the computer executable instructions stored on a computer-readable storage medium. Computer readable storage media include both volatile and nonvolatile, removable and non-removable media implemented in any non-transitory (i.e., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computer.

Accordingly, applicants have disclosed exemplary embodiments of systems and methods for the coordinated grouping of machine devices for receipt of network layer group based services. In the disclosed systems and methods, service layer systems such as, for example, server capability servers (SCS) manage the creation and modification of device groupings and coordinate with network layer systems, i.e., 3GPP systems, to implement the necessary grouping operations at the appropriate UEs. The service layer systems are positioned close to end user applications from a network architecture perspective and, therefore, are well situated to determine which devices should be grouped for purposes of receiving services. The network layer systems, i.e., 3GPP systems, maintain current information regarding the UEs and are able to use this information to determine whether the requested grouping may be made and, if so, the most efficient manner to physically implement the required provisioning in order to implement the desired groupings. Accordingly, the service layer system, i.e., SCS, coordinates group membership with the network layer, i.e., HSS and/or MTC-IWF 210, and the network layer disseminates group information through the network. In several of the disclosed embodiments, existing network layer procedures such as, for example, Attach and TAU have been extended to coordinate with the SCS and enhance group membership control. Moreover, in addition to coordinating the grouping of UEs for receipt of network layer services, applicants disclose systems and methods for the coordinated execution of network layer group based services.

It will be appreciated that while illustrative embodiments have been disclosed, the scope of potential embodiments is not limited to those explicitly set out. For example, while the system has been described with reference to a 3GPP network layer, the envisioned embodiments extend beyond implementations using a particular network layer technology. Likewise, the potential implementations extend to all types of service layer architectures, systems, and embodiments. While the illustrative embodiments refer to particular component types or 3GPP nodes, the processing may be performed by other suitable nodes. For example, where the illustrative embodiments describe processing performed by a MTC-IWF, it will be understood that the processing described as being performed by a MTC-IWF may be performed by a service capability exposure function (SCEF) or other system that is suitable.

It is understood that the entities performing the steps illustrated in FIGS. 2-14 are logical entities that may be implemented in the form of software (i.e., computer-executable instructions) stored in a memory of, and executing on a processor of, a network node or computer system such as those illustrated in FIG. 20D or FIG. 20E. That is, the method(s) illustrated in FIGS. 2-14 may be implemented in the form of software (i.e., computer-executable instructions) stored in a memory of a network node, such as the node or computer system illustrated in FIG. 20D or FIG. 20E, which computer executable instructions, when executed by a processor of the node, perform the steps illustrated in FIGS. 2-14. It is also understood that any transmitting and receiving steps illustrated in FIGS. 2-14 may be performed by communication circuitry of the node under control of the processor of the node and the computer-executable instructions (e.g., software) that it executes.

It should be understood that the various techniques described herein may be implemented in connection with hardware or software or, where appropriate, with a combination of both. Thus, the methods and apparatus of the subject matter described herein, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the subject matter described herein. In the case where program code is stored on media, it may be the case that the program code in question is stored on one or more media that collectively perform the actions in question, which is to say that the one or more media taken together contain code to perform the actions, but that—in the case where there is more than one single medium—there is no requirement that any particular part of the code be stored on any particular medium. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the subject matter described herein, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although example embodiments may refer to utilizing aspects of the subject matter described herein in the context of one or more stand-alone computer systems, the subject matter described herein is not so limited, but rather may be implemented in connection with any computing environment, such as a network or distributed computing environment. Still further, aspects of the subject matter described herein may be implemented in or across a plurality of processing chips or devices, and storage may similarly be affected across a plurality of devices. Such devices might include personal computers, network servers, handheld devices, supercomputers, or computers integrated into other systems such as automobiles and airplanes.

Those skilled in the art will appreciate that the disclosed embodiments may be provided as a subscription web based solution that anyone with an internet connection may log on and begin using the system. The potential embodiments may be developed and programmed in any web based technology platform. Alternatively, a potential embodiment may be implemented as a standalone application.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

The following is a list of acronyms relating to machine to machine communications that may appear in the above description.

3GPP 3rd Generation Partnership Project
AAA Authentication, Authorization and Accounting
AMBR Aggregate Maximum Bit Rate
APSME Application Support Sub-Layer Management Entity
AE Application Entity
AF Application Function
AS Application Server
AVP Attribute Value Pair
BM-SC Broadcast Multicast—Service Center
BSC Base Station Controller
CBC Cell Broadcast Centre
CBE Cell Broadcast Entity
CBS Cell Broadcast Service
CDF Charging Data Function
CDR Charging Data Record
CN Core Network
CRNTI Cell Radio Network Temporary Identifier
CSE Common Services Entity
CSF Common Service Function
CTF Charging Trigger Function
DL Down Link
DNS Domain Name System
EGI External Group Identifier
EMM EPS Mobility Management
eNB Evolved Node B
EPC Evolved Packet Core
EPS Evolved Packet System
ETSI European Telecommunications Standards Institute
GAA Group Action Answer
GAR Group Action Request
GBR Guaranteed Bit Rate
GC Group Control
GCA Group Control Answer
GCR Group Control Request
GEA Group Event Notification Answer
GEN Group Event Notification Request
GGSN Gateway GPRS Support Node
GHA Group Handling Answer
GHR Group Handling Request
GIA Group Information Answer
GIR Group Information Request
GMA Group Management Answer
GMG Group Management
GMN Group Management Notification Answer
GMQ Group Management Notification Request
GMR Group Management Request
GNA Group Notification Answer
GNR Group Notification Request
GPA Group Provisioning Answer
GPR Group Provisioning Request
GPRS General Packet Radio Service
GRA Group Related Event Notification Answer
GRN Group Related Event Notification Request
GSA Group Servicing Answer
GSR Group Servicing Request
GTP-C GTP Control
GTP-U GTP User
GTP GPRS Tunneling Protocol
HLR Home Location Register
HO Handover
HPLMN Home Public Land Mobile Network
HSS Home Subscriber Server
HTTP Hypertext Transfer Protocol
IANA Internet Assigned Numbers Authority
IE Information Element
IETF Internet Engineering Task Force
IMSI International Mobile Subscriber Identity
IP Internet Protocol
IP-CAN IP Connectivity Access Network
ISD Insert Subscriber Data
LS Liaison Statement
LTE Long Term Evolution
M2M Machine to Machine
MBMS Multimedia Broadcast Multicast Service
MME Mobility Management Entity
MNO Mobile Network Operator
MS Mobile Station
MSC Mobile Switching Center
MSISDN Mobile Subscriber Integrated Services Digital Network-Number
MTC Machine Type Communications
MTC-IWF Machine Type Communications—Inter-Working Function
NSE Network Service Entity
NSSE Network Service Exposure, Service Execution and Triggering
PAN Personal Area Network
PCC Policy and Charging Control
PCEF Policy and Charging Enforcement Function
PCRF Policy and Charging Rules Function
PDN Packet Data Network
P-GW PDN Gateway
PLMN Public Land Mobile Network
PWS Public Warning System
QCI QoS Class Identifier
QoS Quality of Service
RFC Request for Comments
RNC Radio Network Controller
SCS Services Capability Server
SDF Service Data Flow
SDO Standards Development Organization
SEES Service Exposure and Enablement Support
SGSN Serving GPRS Support Node
S-GW Serving Gateway
SIA Subscriber Information Answer
SIR Subscriber Information Request
SMS Short Message Service SMS-SC Short Message Service—Service Centre
SPR Subscription Profile Repository
TA Tracking Area
TAI Tracking Area Identity
TAU Tracking Area Update
TMGI Temporary Mobile Group Identity
M-TMSI MME-Temporary Mobile Subscriber Identity
UDR User Data Repository
UE User Equipment
ULA Update Location Answer
URI Uniform Resource Indicator
WAP Wireless Application Protocol
6LoWPAN IPv6 over Low Power Personal Area Networks Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. In a communications network adapted to provide machine to machine communication, a method of accessing group services comprising:
   a services capability server determining, based on at least one of a condition or information at the services capability server, to modify a group of devices for accessing group based network layer services;
   the services capability server transmitting a request to modify the group of devices, the request comprising information specifying a requested service for the group;
   a first network node receiving the request to modify the group of devices;
   the first network node transmitting a request to modify the group of devices to a second network node;
   the second network node identifying devices affected by the request to modify the group of devices; and
   the second network node generating and transmitting a request to a third network node relating to the request to modify the group of devices.

2. The method of claim 1, further comprising the third network node transmitting a response to the second network node.

3. The method of claim 2, further comprising:
   the second network node generating and transmitting a response to the first network node; and
   the first network node generating and transmitting a response to the services capability server.

4. The method of claim 1,
   wherein the first network node is an interworking server or a service capability server, and
   wherein the second network node is a home subscriber server.

5. In a communications network adapted to provide machine to machine communication, a method of accessing group services comprising:
   a services capability server determining, based on at least one of a condition or information at the services capability server, to execute group based network layer services on a group of devices;
   the services capability server transmitting to a first network node a request to execute the group based network layer services on the group of devices, the request identifying one or more events that should be monitored for and comprising information specifying a requested service for the group;
   the first network node receiving the request to execute group based network layer services on the group of devices;
   the first network node transmitting a request for information relating to handling the request to execute group based network layer services to a second network node;
   the second network node identifying devices for implementing the request to execute the group based network layer services on the group of devices; and
   the second network node generating and transmitting to a third network node information specifying the identified devices for implementing the request to execute group based network layer services on the group of devices.

6. The method of claim 5,
   wherein the first network node is an interworking server or a service capability server, and
   wherein the second network node is a home subscriber server, and
   wherein the third network node is a mobility management entity or SGSN.

7. The method of claim 1, wherein the group based network layer service is a group messaging service.

8. The method of claim 1, wherein the request transmitted by the services capability service comprises an external identifier of the group.

9. The method of claim 1, wherein the first network node comprises an MTC-IWF.

10. The method of claim 1, wherein the second network node comprises a BM-SC.

11. The method of claim 5, wherein the group based network layer service is a group messaging service.

12. The method of claim 5, wherein the request transmitted by the services capability service comprises an external identifier of the group.

13. The method of claim 5, wherein the first network node comprises an MTC-IWF.

14. The method of claim 5, wherein the second network node comprises a BM-SC.

* * * * *